(12) United States Patent
Webster

(10) Patent No.: US 11,428,070 B2
(45) Date of Patent: Aug. 30, 2022

(54) ANGLED BLOCK WITH WEAR-REDUCING LINER FOR ONE STRAIGHT-LINE CONNECTION IN HYDRAULIC FRACTURING

(71) Applicant: SPM Oil & Gas PC LLC, Fort Worth, TX (US)

(72) Inventor: Matthew Thomas Robinson Webster, Alberta (CA)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 16/977,461

(22) PCT Filed: Mar. 1, 2019

(86) PCT No.: PCT/US2019/020253
§ 371 (c)(1),
(2) Date: Sep. 1, 2020

(87) PCT Pub. No.: WO2019/169246
PCT Pub. Date: Sep. 6, 2019

(65) Prior Publication Data
US 2020/0399979 A1     Dec. 24, 2020

Related U.S. Application Data

(60) Provisional application No. 62/637,642, filed on Mar. 2, 2018.

(51) Int. Cl.
*E21B 33/03* (2006.01)
*E21B 34/02* (2006.01)
*F16L 27/053* (2006.01)

(52) U.S. Cl.
CPC ............ *E21B 34/025* (2020.05); *E21B 33/03* (2013.01); *F16L 27/053* (2013.01)

(58) Field of Classification Search
CPC ........ E21B 33/03; E21B 34/02; E21B 34/025; E21B 17/1007; F16L 27/053; F16L 57/06
See application file for complete search history.

(56) References Cited

U.S. PATENT DOCUMENTS 4,130,300 A * 12/1978 Sheridan ................. F16L 57/06
285/179
4,684,155 A * 8/1987 Davis ................... B65G 53/523
138/DIG. 6

(Continued)

OTHER PUBLICATIONS

International Search Report and Written Opinion received in Patent Cooperation Treaty Application No. PCT/US2019/020253, dated May 8, 2019.

*Primary Examiner* — Matthew R Buck

(57) ABSTRACT

A frac tree coupled to a wellhead is connected to either flowback equipment or zipper modules using a single straight-line connection of pipes, valves, and/or frac iron that define a straight-line pathway for fluid, gas, or flowback materials. The disclosed single straight-line connections referenced herein may be used in pressure pumping operations to deliver hydraulic fracturing fluid ("frack fluid") to a frac tree for delivery to a wellhead or for carrying flowback from the wellhead to a flowback-collecting equipment. To dramatically reduce the wear-and-tear on the frac tree, blocks at or near the top of the frac trees are strategically lined with a high-strength wear-resistant material internally at points where frack fluid or flowback changes direction to flow toward or away from the single straight-line connections.

18 Claims, 33 Drawing Sheets

(56) References Cited

U.S. PATENT DOCUMENTS

| | | | | |
|---|---|---|---|---|
| 5,634,598 | A * | 6/1997 | Colavito | B05B 1/24 |
| | | | | 138/DIG. 6 |
| 7,621,324 | B2 * | 11/2009 | Atencio | E21B 34/00 |
| | | | | 166/250.15 |
| 9,182,066 | B2 * | 11/2015 | Hemstock | F16L 57/06 |
| 9,506,310 | B2 * | 11/2016 | Hopper | E21B 33/04 |
| 10,323,475 | B2 * | 6/2019 | Christopherson | E21B 33/068 |
| 2003/0155130 | A1 | 8/2003 | Mentesh et al. | |
| 2007/0251578 | A1 | 11/2007 | McGuire | |
| 2014/0216593 | A1 * | 8/2014 | Lenes | F16L 57/06 |
| | | | | 138/141 |
| 2016/0010419 | A1 * | 1/2016 | Shoemaker | E21B 33/03 |
| | | | | 166/90.1 |
| 2016/0168970 | A1 * | 6/2016 | Kajaria | C09D 163/00 |
| | | | | 166/90.1 |
| 2017/0370172 | A1 * | 12/2017 | Tran | E21B 33/068 |
| 2018/0058171 | A1 * | 3/2018 | Roesner | E21B 33/068 |

* cited by examiner

ANGLED BLOCK WITH WEAR-REDUCING LINER FOR ONE STRAIGHT-LINE CONNECTION IN HYDRAULIC FRACTURING

RELATED APPLICATION

This application is a national phase application of Patent Cooperation Treaty Application No. PCT/US2019/020253 filed Mar. 1, 2019, which claims priority to U.S. Provisional Application No. 62/637,642 filed Mar. 2, 2018.

CROSS-REFERENCE TO RELATED APPLICATIONS

This Application claims priority to and the benefit of U.S. Provisional Patent Application Ser. No. 62/637,642, filed on Mar. 2, 2018 and entitled "ANGLED BLOCK WITH WEAR-REDUCING LINER FOR ONE STRAIGHT LINE CONNECTION IN HYDRAULIC FRACTURING," which is incorporated herein by reference in its entirety.

BACKGROUND

Oil and gas exploration requires complex industrial equipment to be interconnected at a well site in a precise manner. Typically, a drilling rig or well head is connected to a pump of some type to drive drilling and mining operations. A particular site may have numerous wells that are drilled. To improve production at these sites, fluids may be pumped down these well holes to fracture subterranean layers and thereby free oil and natural gas. This process is commonly referred to as "hydraulic fracturing" or simply "fracking." Hydraulic fracturing produces fractures in the rock formation that stimulate the flow of natural gas or oil, increasing the volumes that can be recovered. Fractures are created by pumping large quantities of fluids at high pressure down a wellbore and into the target rock formation.

Fracking requires specialized equipment to pump fluids, at varying pressures, to the holes. This is conventionally done by a "frac" pump supplying fluids ("frack fluids") to the well head for selective delivery down the well hole. Frack fluids are conveyed from frac pumps to wellheads using interconnected mechanical networks of piping, commonly referred to in the industry as "flow iron." In essence, the flow iron piping must provide flow paths for varying degrees of pressurized fracking fluids, such as sand, proppant, water, acids, or mixtures thereof Fracking fluid commonly consists of water, proppant, and chemical additives that open and enlarge fractures within the rock formation. These fractures can extend several hundred feet away from the wellbore. The proppants—sand, ceramic pellets, acids, or other small incompressible particles—hold open the newly created fractures.

Once the injection process is completed, the internal pressure of the rock formation causes fluid to return to the surface through the wellbore. This fluid is known as both "flowback" and "produced water" and may contain the injected chemicals plus naturally occurring materials such as brines, metals, radionuclides, and hydrocarbons. The flowback and produced water is typically stored on site in tanks or pits before treatment, disposal or recycling. In many cases, it is injected underground for disposal, or it may be treated and reused or processed by a wastewater treatment facility and then discharged to surface water.

Connecting hydraulic pumps to wellheads and carrying flowback water from a site are complex operations. Frac pumps and flowback collectors are usually placed away from wellheads along outside terrain that is both subject to weather conditions and often at different non-uniform elevations. And frac iron piping typically needs to be rigid to convey the pressurized frack fluids, but the wellhead and frac pumps are usually at different elevations in undeveloped land. Maintaining tight, rigid connections between such complicated piping requires a substantial amount of set up time and can be difficult due to outside terrain varying in elevation. Moreover, outdoor weather presents other difficulties. Flow iron and wellhead equipment is typically exposed to nature, and heavy raining or snow can cause underlying land to sink, run-off, and otherwise move, thereby causing carefully positioned flow iron and wellhead equipment to move as well.

Additionally, frac trees are typically prone to wear over time. They generally sit atop a wellhead in a vertical position, and traditional connections that redirect frack fluid to or flowback from the frac tree can cause problematic wear-and-tear inside the frac tree that can shut down operations if the equipment is not repaired.

SUMMARY

The examples and embodiment disclosed herein are described in detail below with reference to the accompanying drawings. The below Summary is provided to illustrate some examples disclosed herein, and is not meant to necessarily limit all systems, methods, or sequences of operation of the examples and embodiments disclosed herein.

Some embodiments are directed to an apparatus that includes an angled block, made of a first material, for connection to a single straight-line connection between a frac tree and either a flowback container or a zipper module. The angled block includes two ports for fluid to pass and defining an internal cavity having at least one backwall. A liner of wear-resistant material is positioned along the at least one backwall, and the first material and the wear-resistant material and different materials.

In some embodiments, the first material includes steel.

In some embodiments, the wear-resistant material includes at least one member of a group comprising tungsten carbide, tungsten cobalt, tungsten nickel, ceramic, metal-ceramics, or polyurethane.

In some embodiments, the at least one backwall includes two perpendicular backwalls that are both internally lined, at least partially, with the wear-resistant material.

In some embodiments, a first of the at least one backwall faces a first opening of the angled block and a second of the backwalls faces a second opening of the angled block, thereby defining a fluid passageway from the first opening, through the internal cavity, and to the second opening.

In some embodiments, the at least one backwall is angled at an angle of 45 degrees relative to two adjacent sides of the angled block.

In some embodiments, the at least one backwall is at least partially curved in the internal cavity and the liner of wear-resistant material is positioned a curvature of the at least one backwall.

In some embodiments, the at least one backwall includes two angled backwalls that are angled relative to two adjacent sides In some embodiments, the at least one backwall includes two perpendicular backwalls.

Some embodiments are directed to a frac tree that includes: one or more valves or pipes defining a vertical fluid channel for either frack fluid or flowback; an angled block, made of a first material, the angled block comprising two ports for fluid to pass and defining an internal cavity having at least one backwall; and a liner of wear-resistant material positioned along the at least one backwall. In some embodiments, the first material and the wear-resistant material and different materials.

In some embodiments, the wear-resistant material covers a portion of the at least one backwall where frack fluid or flowback changes direction in the frac tree from flowing into the angled block to flowing out of the angled block.

In some embodiments, the wear-resistant material covers a portion of the at least one backwall where frack fluid or flowback changes from flowing along a vertical axis extending up through the vertical fluid channel to a horizontal axis defined by a single straight-line connection attached to the frac tree at the angled block.

In some embodiments, the angled block includes an elbow.

Other embodiments include a single straight-line connection between the frac tree in which the angled block is connected and a flowback container. In some embodiments, the angled block is positioned in the frac tree to redirect flowback received by the frac tree from a wellhead toward the single straight-line connection for delivery to the flowback container.

In some embodiments, the single straight-line connection is connected between the frac tree and the flowback container along a single straight line and at a constant height.

Other embodiments include a single straight-line connection between a frac tree in which the angled block is connected and a zipper module. In some embodiments, the angled block is positioned in the frac tree to redirect frack fluid received from the single straight-line connection, and supplied by the zipper module, toward a wellhead coupled to the frac tree.

In some embodiments, the wear-resistant material includes at least one member of a group comprising tungsten carbide, tungsten cobalt, tungsten nickel, ceramic, metal-ceramics, or polyurethane.

In some embodiments, the at least one backwall is angled at an angle of 45 degrees relative to two adjacent sides of the angled block.

In some embodiments, the at least one backwall includes two angled backwalls that are angled relative to two adjacent sides.

In some embodiments, the at least one backwall includes two perpendicular backwalls.

Some embodiments are directed to a system that includes: a frac tree including one or more valves or pipes defining a vertical fluid channel for either frack fluid or flowback; a single straight-line connection connected to the frac tree, the single straight-line connection defining a pathway for frack fluid or flowback to be respectively communicated toward or away from the frac tree, the single straight-line connection defining the pathway along only a single straight line with a constant height; and an angled block, made of a first material, the angled block including two ports for fluid to pass and defining an internal cavity having at least one backwall; and a liner of wear-resistant material positioned along the at least one backwall.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

FIGS. 20-22 are elevational view of zipper module with a fluid conduit of the zipper module being replaced with another fluid conduit to increase the overall height thereof, according to one example.

DETAILED DESCRIPTION

Figure 1:
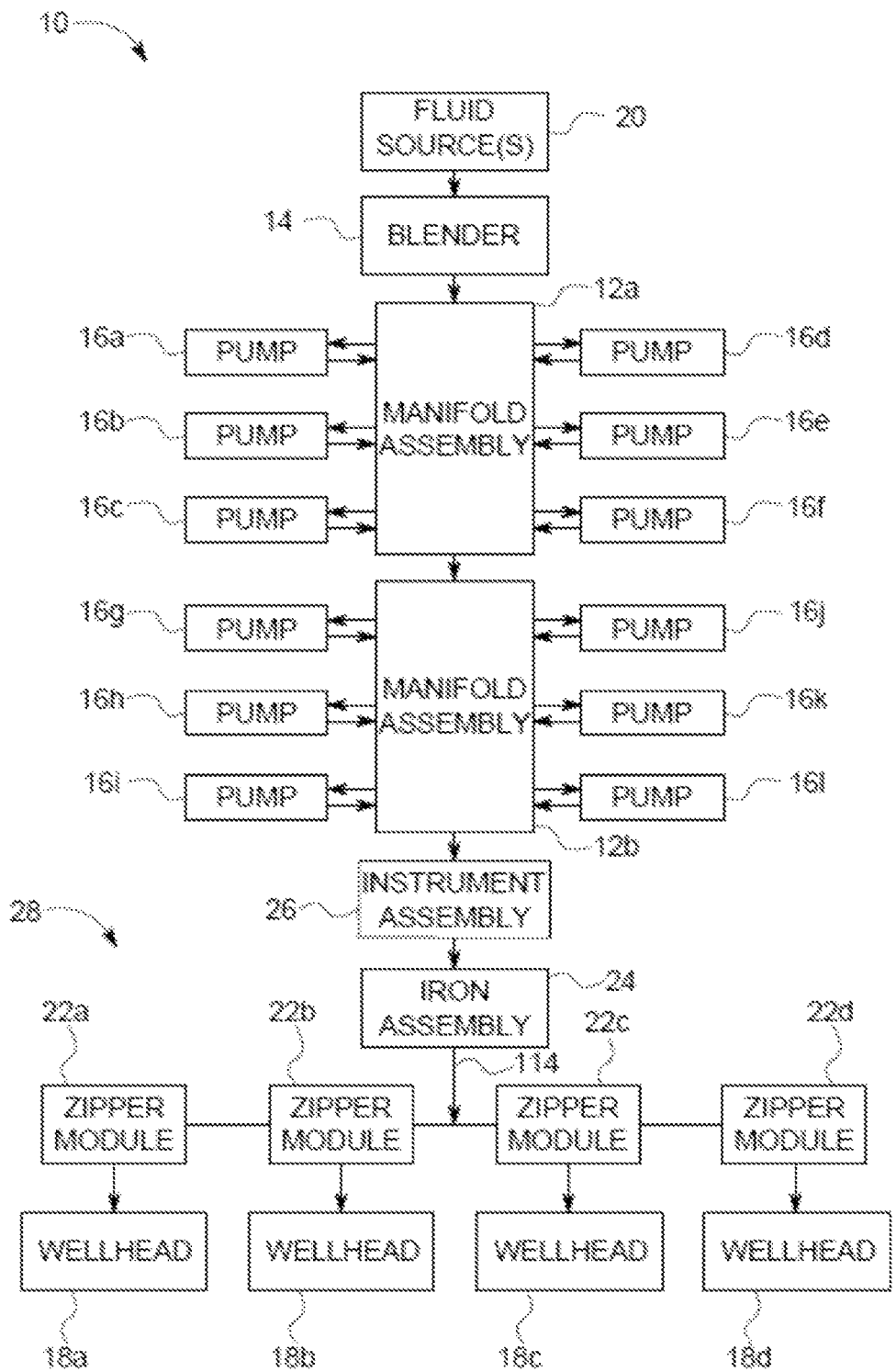
FIG. 1 is a block diagram of a system for supplying fracturing fluid to a wellhead, according to one example.

Embodiments described herein generally refer to single straight-line connections between a fracturing tree (or "frac tree," commonly called a "Christmas tree") and various pressure-pumping or flowback equipment. The disclosed frac tree and pressure-pumping or flowback equipment have strategically placed wear liners that help protect crucial junctures in the equipment prone to wear over time. More specifically, the embodiments disclosed herein describe single straight-line connections to and from frac trees and also the strategic placement of high-strength wear-resistant materials at specific junctions in disclosed pressure-pumping or flowback operations to reduce wear-and-tear and extend the lifespan of the fracking and flowback equipment.

For purposes of this disclosure, a "single straight-line" and "one straight-line" connection refers to a series of pipes (e.g., plug, gate, etc.); valves; or other frac iron connected together to define an internal path, or conduit, for frack fluid or flowback to respectively flow therethrough. As described in more detail below, the single straight-line connections formed from the connected pipes, gates, or other frac iron may connect may be used to provide a fluid path for frack fluid between a zipper module and a frac tree (or Christmas tree) or between the frac tree and flowback equipment. The single straight-line connections described herein are made up of the various piping, vales, and frac iron, span from or two the frac tree in one direction along a straight line.

"Straight line," in reference to the single straight-line connections described herein, means a straight path at a constant height, through a midpoint of a fluid pathway created by the connected pipes, valves, or other frac iron, between a frac tree and zipper module or between two zipper modules. In other words, in some embodiments, the single straight-line connections have no bends, or curves, defining a fluid channel that is a true straight flow path for flowback operations (e.g., frac tree to flowback container) or pressure-pumping operations (e.g., zipper module to zipper module, or zipper module to frac tree). For example, a single straight-line connection may have a straight line between the fluid path within fluid channel of the pipes, valves, or frac iron have an inner midpoint that measures 5, 6, 7, or 10 feet high all the way between a zipper module and a frac tree.

Not all embodiments are limited to a constant height, however. Alternatively, in some embodiments, the single straight-line connections described herein may be angled between the flowback equipment and the frac tree, between the zipper modules described below and the frac tree, or between the zipper modules themselves. For example, in pressure-pumping operations, a single straight-line connection between a zipper module and a frac tree may be angled upward, downward, leftward, or rightward at an angle of 1-15 degrees (e.g., 1, 2, 3, 4, 5, 6, 7, 8, 9, 10, 11, 12, 13, 14, or 15 degrees). Single straight-line connections may be similarly angled between the frac tree and the flowback container, or between two zipper modules.

Generally, the single straight-line connections disclosed herein may be used to either deliver frack fluid to the frac tree or carry flowback away from the frac tree. The single straight-line connections are much less complicated than conventional connections between zipper modules and frac trees or between flowback equipment and frac trees, providing both single-point and straight connections between frac trees and frac-fluid pumping or flowback equipment.

To aid the reader, the description below and accompanying drawings are set out in the following manner: FIGS. 1-36 reference straight-line connections made to facilitate frac-fluid pumping to a frac tree on a wellhead, and FIGS. 37-38 reference straight-line connections between the frac tree and flowback equipment for capturing flowback after frac-fluid pressure pumping. Together, the single straight-line connections disclosed herein may be used in an integrated setup, providing much less complex and safer conduits for supplying frack fluid to a wellhead and collecting flowback from the wellhead. For instance, the single straight-line connections in FIGS. 1-36, and equivalents thereof, may be used to frack a site. Once fracking is complete, the single straight-line connections in FIGS. 37-38 may be used to carry flowback to flowback equipment, such as sand pits, reservoirs, torches, collection tanks, and the like.

Additionally, FIGS. 39-42 illustrates different internal profiles of junctures in particular equipment described herein where strategically placed high-strength wear-resistant materials have been placed. Again, such materials may include, for example but without limitation, tungsten carbide, tungsten cobalt, tungsten nickel, ceramic, metal-ceramics, polyurethane, or the like.

The single straight-line connections disclosed herein may be formed by different combinations of "frac iron." Frac iron, as reference herein, refers to component parts used to frack a well or capture flowback. Frac iron may include, for example, high pressure treating iron, and other pipes, joints, valves, and fittings; swivel joints, pup joints, plug valves, check valves and relief valves; ball injector, crow's foot, air chamber, crossover, hose, pipes/piping, hose loop, ball injector tee body, tee, wye, lateral, ell, check valve, plug valve, wellhead adapter, swivel joint, plug, relief valve; or the like.

The disclosed single straight-line connections referenced herein, while far simpler and safer than traditional pressure-pumping and flowback-capturing setups, sometimes introduce additional pressure points for fluid being delivered or carried away from a well. Specifically, the single straight-line connections include straight horizontal, or near horizontal, channels through pipes, valves, or frac iron either between a zipper module and a frac tree or a between a frac tree and flowback container. In either scenario, pressurized fluid, gas, or debris is directed horizontally for some time and vertically for some time. Where such fluid, gas, or debris changes directions often leads to heavier wear in the frac tree. To reduce this wear, the disclosed embodiments position better wear-resistant material at junctures where the fluid, gas, or debris from the frack fluid or flowback changes directions. This wear-resistant material may include, for example but without limitation, a high-strength material, such as, for example but without limitation, tungsten carbide, tungsten cobalt, tungsten nickel, ceramic, metal-ceramics, polyurethane, or the like.

FIG. 1 illustrates a block diagram of an example setup for hydraulic fracking of a subterranean layer for oil and gas extraction. A system generally referred to by the reference numeral 10 includes manifold assemblies 12a and 12b. The manifold assemblies 12a and 12b are in fluid communication with a blender 14, pumps 16a-1, and wellheads 18a-d. One or more fluid sources 20 are in fluid communication with the blender 14. The wellheads 18a-d are each located at the top or head of an oil and gas wellbore (not shown), which penetrates one or more subterranean formations (not shown), and are used in oil and gas exploration and production operations. The wellheads 18a-d are in fluid communication with the manifold assemblies 12a and 12b via, for example, zipper modules 22a-d, an iron assembly 24, and an instrument assembly 26.

The zipper modules 22a-d are operably coupled to the wellheads 18a-d, respectively, and are interconnected to form a zipper manifold 28 to which the iron assembly 24 is operably coupled. Thus, the fluid conduit 93 of the iron assembly 24 is operably coupled to, and in fluid communication with, the zipper manifold 28. And the instrument assembly 26 is operably coupled to both the iron assembly 24 and the manifold assemblies 12a and 12b. In an exemplary embodiment, the one or more fluid sources 20 include fluid storage tanks, other types of fluid sources, natural water features, or any combination thereof.

The system 10 may be fracking operations used to facilitate oil and gas exploration and production operations. The embodiments provided herein are not limited to a hydraulic fracturing system as the exemplary embodiments may be used with, or adapted to, a mud pump system, a well treatment system, other pumping systems, one or more systems at the wellheads 18a-d, one or more systems in the wellbores of which the wellheads 18a-d are the surface terminations, one or more systems downstream of the wellheads 18a-d, or one or more other systems associated with the wellheads 18a-d.

In several embodiments, the manifold assemblies 12a and 12b are identical to one another and, therefore, in connection with FIGS. 2-4, only the manifold assembly 12a will be described in detail below; however, the description may be applied to every one of the manifold assemblies 12a and 12b. Moreover, in several embodiments, the pumps 16g-1 are connected to the manifold assembly 12b in substantially the same manner that the pumps 16a-f are connected to the manifold assembly 12a and, therefore, in connection with FIGS. 2-4, only the connection of the pumps 16a-f to the manifold assembly 12a will be described in detail below; however, the description below applies equally to the manner in which the pumps 16g-1 are connected to the manifold assembly 12b.

Figure 9A:
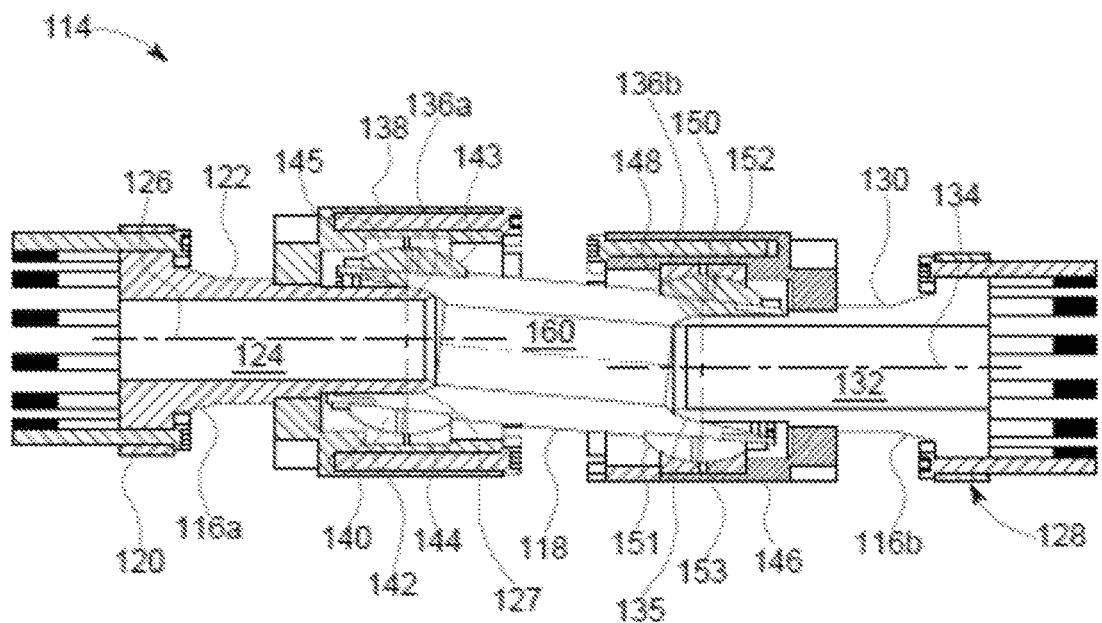
FIG. 9A is a cross-sectional view of a spherical swivel joint, according to one example.
Figure 9B:
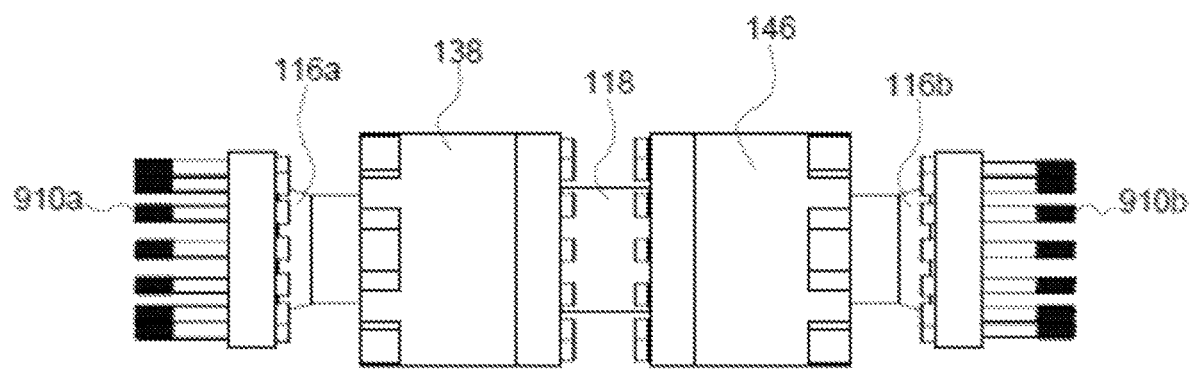
FIG. 9B is a top view of a spherical swivel joint, according to one example.
Figure 9C:
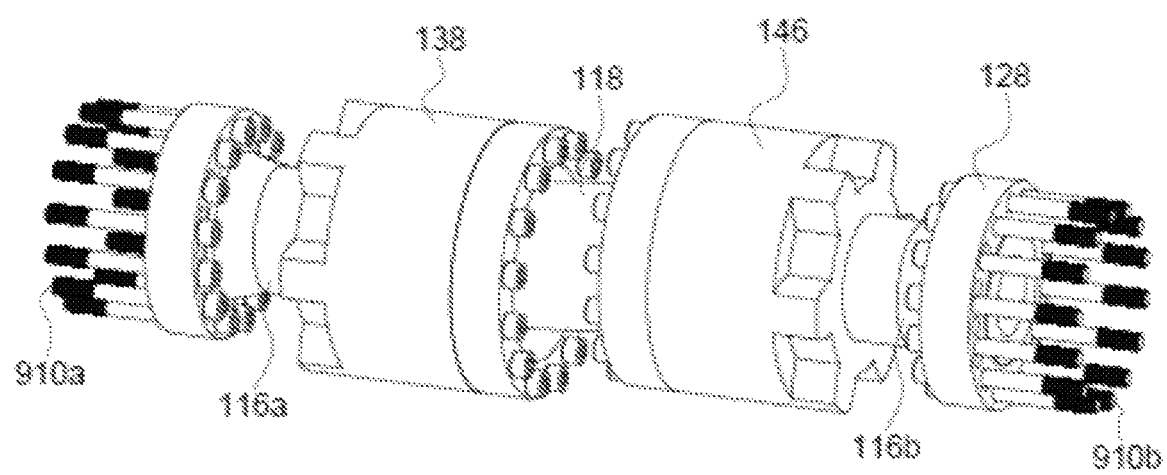
FIG. 9C is a three-dimensional view of a spherical swivel joint, according to one example.

Some examples use "spherical swivel joint" 114, which is described in more detail in reference to FIGS. 9A-9C, to make connections between some of the components in the system 10. Any large-bore (e.g., 5 inches, 6 inches, 7 inches, 8 inches, or the like) connection between the various components may be made using the spherical swivel joint 114. To accommodate such large-bore fluid channels, the spherical swivel joints 114 may have an internal diameter of 3-9 inches. Some specific examples use bore diameters for the spherical swivel joints 114 of 3, 4, 5, 6, 7, 8, or 9 inches, as well as any measurement therebetween (e.g., 7.1, 7.2, 7.3, 7.4, 7.5, 7.6, 7.7, 7.8, or 7.9 inches).

The spherical swivel joint 114 may connect any or all of: the fluid sources 20 to the blender 114, the blender 14 to the manifold assembly 12a, the manifold assembly 12a to the manifold assembly 12b, the manifold assembly 12b to the instrument assembly 26, the instrument assembly 26 to the iron assembly 24, the iron assembly 24 to a zipper module 22b, the zipper modules 22a-d to each other, or any of the zipper modules 22a-d to their respective wellheads 18a-d. Additionally or alternatively, in some examples, the spherical swivel joint 114 is used to connect the manifold assembly 12b directly to one or more of the zipper modules 12a-d.

FIG. 1 illustrates a spherical swivel joint 114 connecting the iron assembly 24 to a middle connection between the zipper module 22b and 22c. This is one example, whereby a tee connection dispels fluid from the spherical swivel connection to each of the zipper modules 22b and 22c. Alternatively, the spherical swivel joint 114 is positioned directly between the iron assembly 24, the instrument assembly 26, or the manifold assembly 12b and one of the zipper modules 22a-d, which in turn distributes fluid to its respective wellhead 18a-c and also at least one other zipper module 22a-d that are connected in series.

Figure 2:
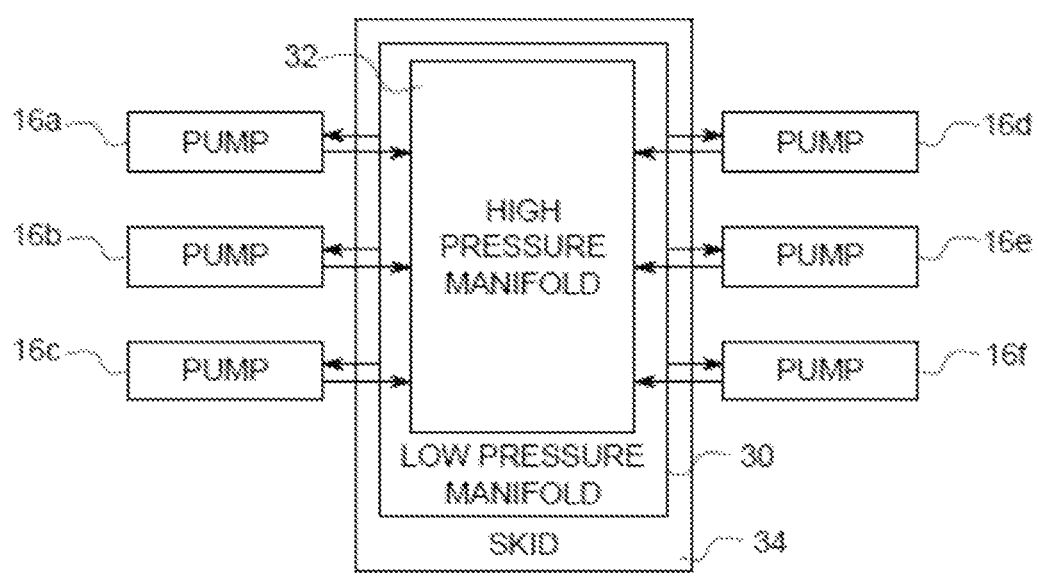
FIG. 2 is a schematic illustration of a manifold assembly including a high-pressure manifold, a low-pressure manifold, and a skid, according to one example.

FIG. 2 is a block illustration of the manifold assembly of FIG. 1, the manifold assemblies 12a or 12b include, in some examples, a high-pressure manifold 32, a low-pressure manifold 30, and a skid. In some examples, the manifold assembly 12a described in FIG. 1 includes a low-pressure manifold 30 and a high-pressure manifold 32, both of which may be mounted on, or connected to, a skid 34. Skid 34 may be equipped with wheels, bearing, or other ways to move independently, thereby enabling the skid 34 to easily be rolled or moved into place. Alternatively or additionally, the skid 34 may be attached to a trailer that is itself moveable or affixed to a truck or railcar. In some examples, the pumps 16a-f are in fluid communication with each of the low-pressure manifold 30 and the high-pressure manifold 32. In some examples, the pumps 16a-f include or are part of a positive displacement pump, a reciprocating pump assembly, a frac pump, a pump truck, a truck, a trailer, or any combination thereof.

Figure 3:
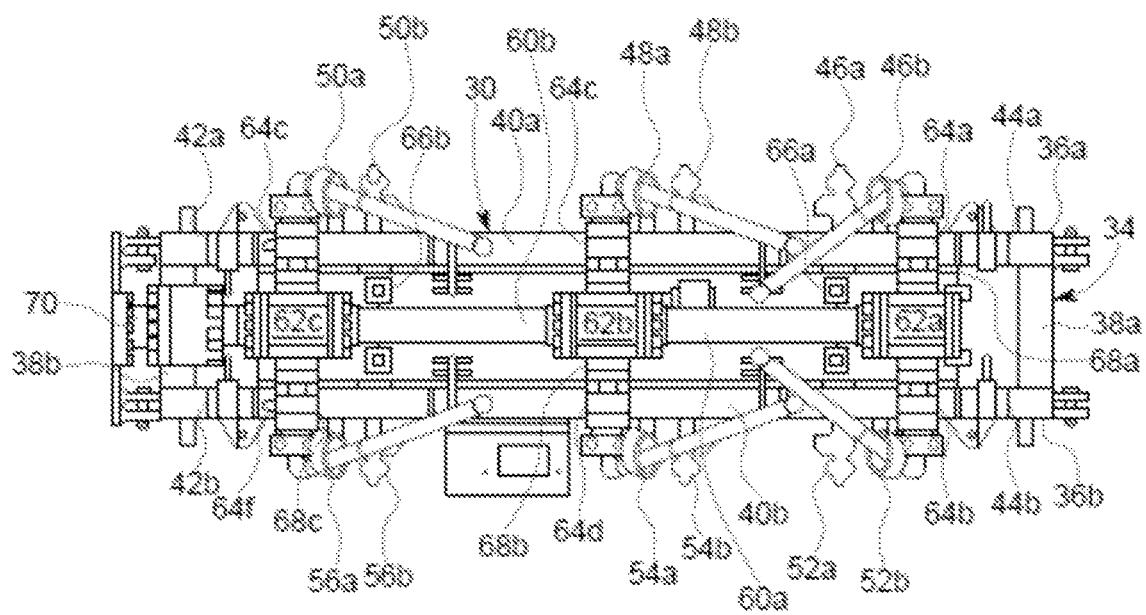
FIGS. 3 and 4 are top and side views, respectively, of a manifold assembly, according to one example.
Figure 4:
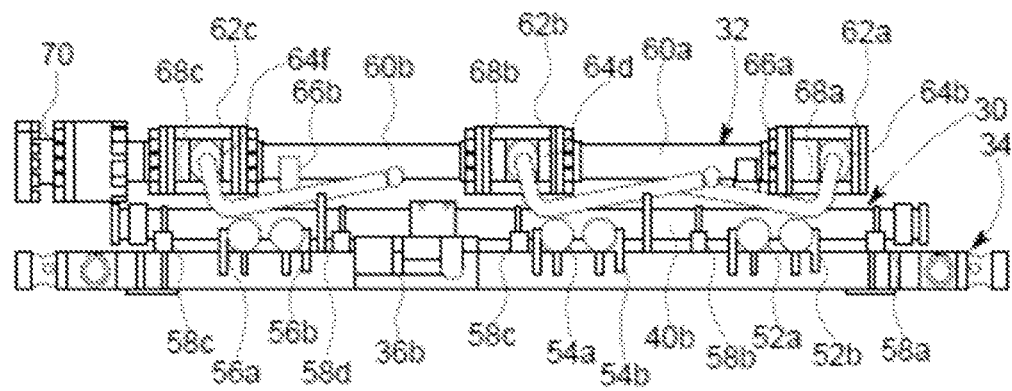

FIGS. 3 and 4 illustrate top and side views of the skid 34 for the manifold assemblies 12a and 12b with the aforementioned low-pressure manifold 30 and high-pressure manifold 32. As shown in FIGS. 3 and 4, the skid 34 includes, among other things, longitudinally-extending structural members 36a and 36b, transversely-extending end members 38a and 38b connected to respective opposing end portions of the longitudinally-extending structural members 36a and 36b, and transversely-extending structural members (not shown in FIGS. 3 and 4) connecting the longitudinally-extending structural members 36a and 36b.

The low-pressure manifold 30 includes longitudinally-extending tubular members, or flow lines 40a and 40b, that are connected to the skid 34 between the transversely-extending end members 38a and 38b thereof. The flow lines 40a and 40b are in fluid communication with the blender 14. In some embodiments, the low-pressure manifold 30 further includes a transversely-extending tubular member, or rear header (not shown), via which the blender 14 is in fluid communication with the flow lines 40a and 40b. The flow lines 40a and 40b are spaced in a parallel relation, and include front end caps 42a and 42b respectively, and, in those embodiments where the rear header is omitted, rear end caps 44a and 44b.

In some examples, the pumps 16a, 16b and 16c shown in FIG. 2 (though, not shown in FIGS. 3 and 4) are in fluid communication with the flow line 40a via one of outlet ports 46a and 46b, one of outlet ports 48a and 48b, and one of outlet ports 50a and 50b, respectively. Connections between the flow line 40a and any of outlet ports 46a and/or 46b, outlet ports 48a and/or 48b, and outlet ports 50a and/or 50b may be made using one or more hoses, piping, swivels, flowline components, other components, or any combination thereof.

In some examples, the outlet ports 46a, 46b, 48a, 48b, 50a, and 50b are connected to the flow line 40a. In an exemplary embodiment, the pumps 16a, 16b, and 16c (not shown in FIGS. 3 and 4) are in fluid communication with the flow line 40a via both of the outlet ports 46a and 46b, both of the outlet ports 48a and 48b, and both of the outlet ports 50a and 50b, respectively. Such fluid communication may be carried out with various piping, flowline components, or other connective components.

Additionally or alternatively, in some examples, the pumps 16d, 16e and 16f of FIG. 2 (though, not shown in FIGS. 3 and 4) are in fluid communication with the flow line 40b via one of outlet ports 52a and 52b, one or outlet ports 54a and 54b, and one of outlet ports 56a and 56b, respectively. Connections between the flow line 40b and any of outlet ports 52a and/or 52b, outlet ports 54a and 54b, and one of outlet ports 56a and 56b, respectively, may be made using various piping, flowline components, or other connective components.

In some examples, the outlet ports 52a, 52b, 54a, 54b, 56a, and 56b are connected to the flow line 40b. In some examples, the pumps 16d, 16e, and 16f of FIG. 2 are in fluid communication with the flow line 40b via both of the outlet ports 52a and 52b, both of the outlet ports 54a and 54b, and both of the outlet ports 56a and 56b, respectively. Such fluid communication may be made with various hoses, piping, flowline components, other components, or any combination thereof.

Looking at FIG. 4, in some examples, the flow line 40a is mounted to the skid 34 via low-pressure mounts 58a, 58b, 58c, 58d, and 58e (visible in FIG. 4). Similarly, the flow line 40b may be mounted to the skid via low-pressure mounts 58f, 58g, 58h, 58i, and 58j (not visible in FIGS. 3 and 4). In some examples, the low-pressure manifold 30 is connected to the skid 34 by lowering the low-pressure manifold 30 down and then ensuring that a respective upside-down-u-shaped or upside-down-v-shaped brackets extend about the flow lines 40a and 40b and engage the low-pressure mounts 58a-j.

In some examples, the high-pressure manifold 32 includes longitudinally-extending tubular members, or flow lines 60a and 60b, and flow fittings 62a-c operably coupled to, and in fluid communication with, the flow lines 60a and 60b. The flow lines 60a and 60b and the flow fittings 62a-c are supported by the skid 34 between the transversely-extending end members 38a and 38b thereof. The flow fittings 62a and 62b are operably coupled to opposing end portions of the flow line 60a, and the flow fittings 62b and 62c are operably coupled to opposing end portions of the flow line 60b. As a result, the flow fitting 62b interconnects the flow lines 60a and 60b, and the flow fittings 62a and 62c are located proximate the transversely-extending end members 38a and 38b, respectively, of the skid 34.

In some examples, the flow lines 60a-b are "large bore" flow iron, meaning the flow lines 60a-b have an inner bore diameter of 4-9 inches. For example, the inner bores may be 4, 4½, 5, 5½, 6, 6½, 7, 7½, 8, 8½ inches, or any measurement in between. The inner bore may be any type of internal geometric shapes, e.g., circular, ellipsoidal, rectangular, square, triangular, or the like.

In some examples, the pumps 16a, 16b, and 16c shown in FIG. 2 (though, not shown in FIGS. 3 and 4) are in fluid communication with the respective flow fittings 62a, 62b, and 62c via isolation valves 64a, 64c, and 64e, respectively. Such fluid communication may be carried out with the spherical swivel joint 114 in FIG. 9, one or more hoses, piping, flowline components, other components, or any combination thereof. Similarly, the pumps 16d, 16e, and 16f shown in FIG. 2 (though, not shown in FIGS. 3 and 4) are in fluid communication with the respective flow fittings 62a, 62b, and 62c via isolation valves 64b, 64d, and 64f, respectively. Such fluid communication may be carried out with the spherical swivel joint 114 in FIG. 9, one or more hoses, piping, flowline components, other components, or any combination thereof.

The flow lines 60a and 60b and the flow fittings 62a, 62b, and 62c are mounted to the skid 34 via a combination of vertically-extending high pressure mounts 66a and 66b and mounting brackets 68a, 68b, and 68c. In some examples, the high-pressure manifold 32 is connected to the skid 34 by lowering the high-pressure manifold 32 down and then ensuring that the flow lines 60a and 60b are supported by the high-pressure mounts 66a and 66b, respectively, and that the flow fittings 62a, 62b, and 62c are supported by the mounting brackets 68a, 68b, and 68c, respectively.

In several examples, with continuing reference to FIGS. 1, 3, and 4, the high-pressure manifold 32 of the manifold assembly 12a is operably coupled to, and in fluid communication with, the high-pressure manifold 32 of the manifold assembly 12b. Specifically, the flow fitting 62c of the manifold assembly 12a may be connected to the flow fitting 62a of the manifold assembly 12b via a universal fitting, such as, for example, a spherical joint 70 (a portion of which is shown in FIGS. 3 and 4). In some examples, the specifically joint 70 takes the form of the spherical swivel joint 114 illustrated in FIGS. 9A-9C. The spherical joint 70, e.g., being the spherical swivel joint 114, is designed to accommodate any vertical and/or horizontal offset between the high-pressure manifold 32 of the manifold assembly 12a and the high-pressure manifold 32 of the manifold assembly 12b.

Figure 5:
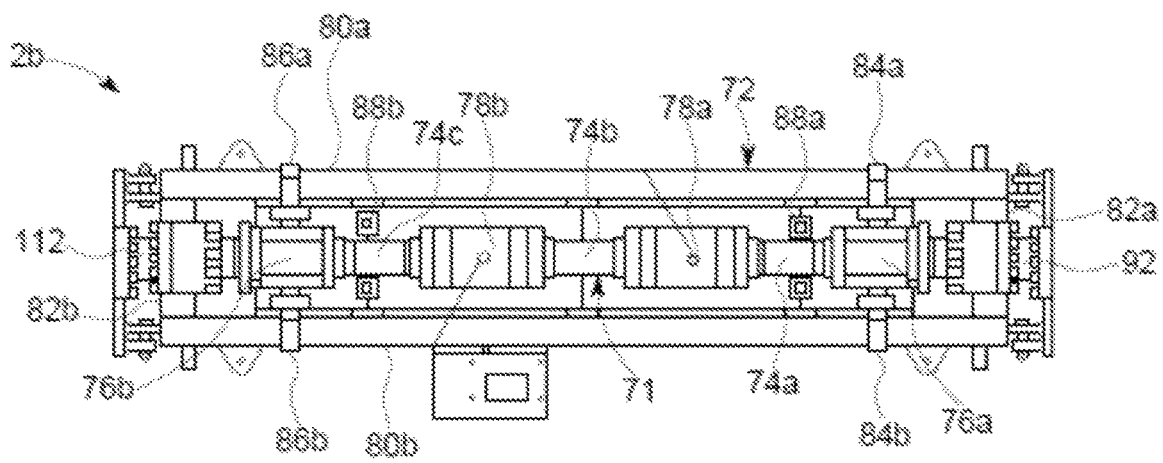
FIGS. 5 and 6 are top and side views, respectively, of an instrument assembly, according to one example.
Figure 6:
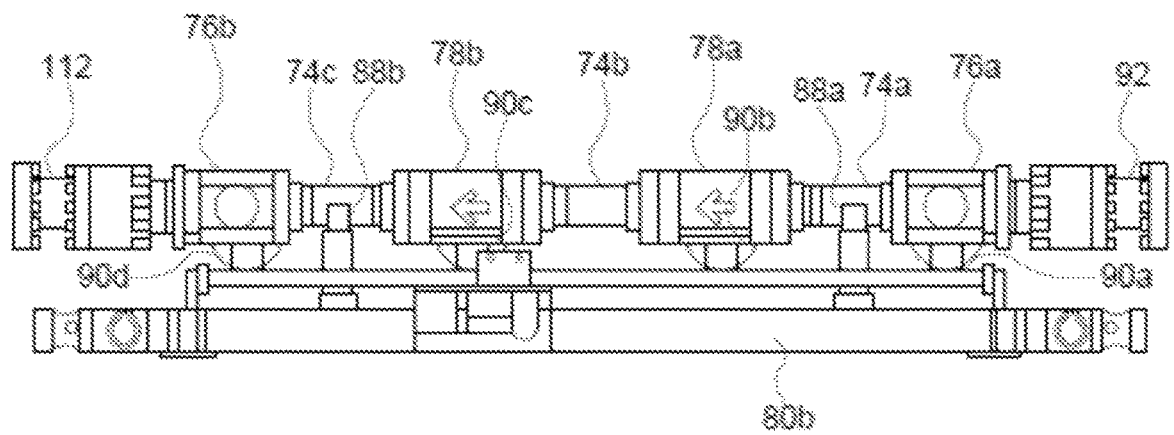

FIGS. 5 and 6 illustrate examples of an instrument assembly, as described above in reference to FIG. 1. In some examples, as illustrated in FIGS. 5 and 6 with continuing reference to FIG. 1, the instrument assembly 26 includes a fluid conduit 71 that is mounted on, and connected to, a skid 72. The fluid conduit 71 includes longitudinally-extending tubular members, or flow lines 74a, 74b, and 74c, flow fittings 76a and 76b, and valves 78a and 78b. The skid 72 includes, among other things, longitudinally-extending structural members 80a and 80b, transversely-extending end members 82a and 82b connected to respective opposing end portions of the longitudinally-extending structural members 80a and 80b, and transversely-extending structural members (not shown in FIGS. 5 and 6) connecting the longitudinally-extending structural members 80a and 80b. The flow lines 74a, 74b, and 74c, the flow fittings 76a and 76b, and the valves 78a and 78b are connected in series and supported by the skid 72 between the transversely-extending end members 82a and 82b thereof.

The flow fittings 76a and 76b and the valves 78a and 78b are operably coupled to, and in fluid communication with, the flow lines 74a, 74b, and 74c. Specifically, respective opposing end portions of the flow lines 74a, 74b, and 74c are operably coupled to the flow fitting 76a and the valve 78a, the valves 78a and 78b, and the valve 78b and the flow fitting 76b, respectively. As a result, the valve 78a interconnects the flow lines 74a and 74b, the valve 78b interconnects the flow lines 74b and 74c, the flow fitting 76a is operably coupled to the flow line 74a proximate (e.g., within 1, 2, 3, or 4 feet, in some examples) the transversely-extending end member 82a of the skid 72, and the flow fitting 76b is operably coupled to the flow line 74b proximate the transversely-extending end member 82b of the skid 72.

Valves 78a and 78b may be plug valves and/or check valves in different examples. In some examples, the valve 78a is a plug valve and the valve 78b is a check valve.

In an exemplary embodiment, ports 84a and 84b of the flow fitting 76a and/or ports 86a and 86b of the flow fitting 76b may be used to establish fluid communication with the fluid conduit 71. Such fluid communication may be done with the spherical swivel joint 114 in FIG. 9, one or more hoses, piping, flowline components, other components, or any combination thereof. Additionally, such fluid communication may be used, for example, to support instrumentation (not shown in FIGS. 5 and 6) for measuring certain characteristics of fluid exiting the respective high-pressure manifolds 32 of the manifold assemblies 12a and 12b.

The flow lines 74a, 74b, and 74c, the flow fittings 76a and 76b, and the valves 78a and 78b are mounted to the skid 72 via a combination of vertically-extending high pressure mounts 88a and 88b and mounting brackets 90a, 90b, 90c, and 90d. In some examples, the fluid conduit 71 is connected to the skid 72 by lowering the fluid conduit 71 down and then ensuring that the flow lines 74a and 74c are supported by the high-pressure mounts 88a and 88b, respectively, that the flow fittings 76a and 76b are supported by the mounting brackets 90a and 90d, and that the valves 78a and 78b are supported by the mounting brackets 90b and 90c.

In several exemplary embodiments, with continuing reference to FIGS. 1, 5, and 6, the high-pressure manifold 32 of the manifold assembly 12b is operably coupled to, and in fluid communication with, the fluid conduit 71 of the instrument assembly 26. More particularly, the flow fitting 62c of the manifold assembly 12b is connected to the flow fitting 76a of the instrument assembly 26 via a universal fitting, such as, for example, the spherical swivel joint 114 in FIG. 9, which includes two rotatable ball bearings 143 and 151 that provide flexibility to the connection, or a spherical joint 92 (a portion of which is shown in FIGS. 5 and 6). The spherical joint 92 accommodates any vertical and/or horizontal offset between the high-pressure manifold 32 of the manifold assembly 12b and the fluid conduit 71 of the instrument assembly 26.

Figure 7:
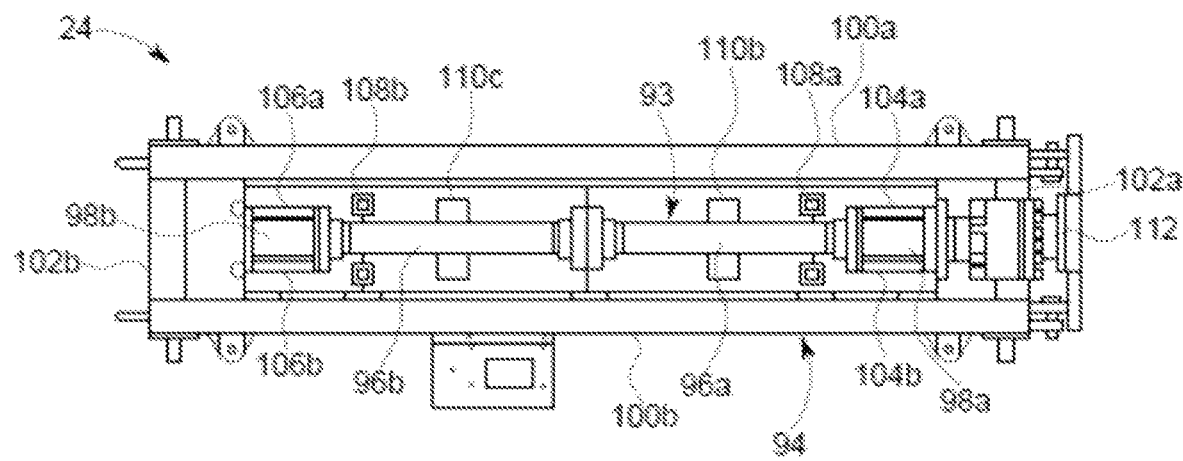
FIGS. 7 and 8 are top and side views, respectively, of an iron assembly, according to one example.
Figure 8:
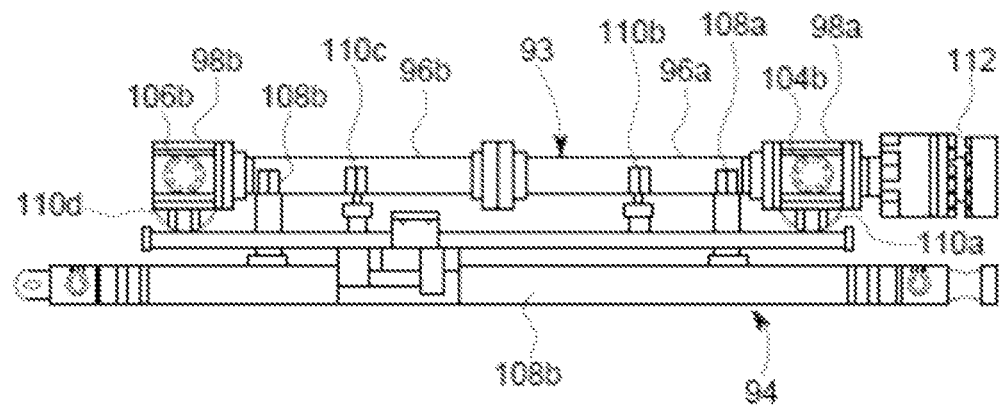

In some examples, as illustrated in FIGS. 7 and 8 with continuing reference to FIG. 1, the iron assembly 24 includes a fluid conduit 93 that is mounted on, and connected to, a skid 94. The fluid conduit 93 includes longitudinally-extending tubular members, or flow lines 96a and 96b, and flow fittings 98a and 98b. The skid 94 includes, inter alia, longitudinally-extending structural members 100a and 100b, transversely-extending end members 102a and 102b connected to respective opposing end portions of the longitudinally-extending structural members 100a and 100b, and transversely-extending structural members (not shown in FIGS. 7 and 8) connecting the longitudinally-extending structural members 100a and 100b. The flow lines 96a and 96b and the flow fittings 98a and 98b are connected in series and supported by the skid 94 between the transversely-extending end members 102a and 102b thereof.

The flow fittings 98a and 98b are operably coupled to, and in fluid communication with, the flow lines 96a and 96b. Specifically, the flow fittings 98a and 98b are operably coupled to the flow lines 96a and 96b, respectively, and the flow lines 96a and 96b are operably coupled to each other. As a result, the flow fitting 98a is operably coupled to the flow line 96a proximate the transversely-extending end member 102a of the skid 94, and the flow fitting 98b is operably coupled to the flow line 96b proximate the transversely-extending end member 102b of the skid 94. In some examples, ports 104a and 104b of the flow fitting 98a and/or ports 106a and 106b of the flow fitting 98b may be used to establish fluid communication with the fluid conduit 93. Such fluid communication may be done with the spherical swivel joint 114 in FIG. 9, one or more hoses, piping, flowline components, other components, or any combination thereof.

In some examples, the flow lines 96a and 96b and the flow fittings 98a and 98b are mounted to the skid 94 via a combination of vertically-extending high pressure mounts 108a and 108b and mounting brackets 110a, 110b, 110c, and 110d. The fluid conduit 93 may be connected to the skid 94 by lowering the fluid conduit 93 down and then ensuring that the flow lines 96a and 96b are supported by the high-pressure mounts 108a and 108b and the mounting brackets 110b and 110c, respectively, and that the flow fittings 98a and 98b are supported by the mounting brackets 110a and 110d, respectively.

In several examples, with continuing reference to FIGS. 1 and 5-8, the fluid conduit 71 of the instrument assembly 26 is operably coupled to, and in fluid communication with, the fluid conduit 93 of the iron assembly 24. More particularly, the flow fitting 76b of the instrument assembly 26 may be connected to the flow fitting 98a of the iron assembly 24 via a spherical joint 112 (respective portions of which are shown in FIGS. 5-8). In some examples, the spherical joint 112 takes the form of the spherical swivel joint 114 in FIGS. 9A-C to accommodate vertical and/or horizontal offset between the fluid conduit 71 of the instrument assembly 26 and the fluid conduit 93 of the iron assembly 24.

As previously mentioned in reference to FIG. 1, the fluid conduit 93 of the iron assembly 24 is operably coupled to, and in fluid communication with, the zipper manifold 28. FIGS. 9A-9C illustrates a spherical swivel joint 114 for use making virtually any of the previously discussed fluid-communication connections, including, without limitation, connecting the flow fitting 98b of the iron assembly 24 to the zipper manifold 28. For the sake of clarity, examples are discussed below using the spherical swivel joint 114 to connect the fluid conduit 93 of the iron assembly 24 to the zipper manifold 28. The spherical swivel joint 114 is flexible to accommodate vertical and/or horizontal differences—or offsets—experienced by connecting the fluid conduit 93 of the iron assembly 24 and the zipper manifold 28 across outdoor terrain, to accommodate for varying grades and elevations of outdoor terrain.

In some examples, the spherical swivel joint 114 includes a pair of yokes 116a and 116b operably coupled to each other via a crossover spool 118. In an example, the yoke 116a is connected to the flow fitting 98b of the iron assembly 24. In an example, the yoke 116b is connected to the zipper manifold 28. In several examples, the yoke 116a is connected to the flow fitting 98b of the iron assembly 24, and the yoke 116b is connected to the zipper manifold 28. In several examples, the yoke 116a and the yoke 116b are substantially identical to each other. Alternatively, yoke 116a may be circumferentially larger than yoke 116b by 5%, 10%, 15%, 20%, 25%, 30%, 35%, 40%, 45%, 50%, or the like.

The yoke 116a includes a flange 120 and a spool 122, the flange 120 and the spool 122 being connected to each other and together defining an internal flow passage 124 extending along a longitudinal axis 126. The spool 122 defines an external convex annular surface 127 at an end portion thereof opposite the flange 120. Similarly, the yoke 116b includes a flange 128 and a spool 130, the flange 128 and the spool 130 being connected to each other and together defining an internal flow passage 132 extending along a longitudinal axis 134. In this example, the flange 128 is a male-end flange that is configured to reciprocally fit (e.g., through a threaded connection) female flanges on external components that may include, for example but with limitation, the zipper modules; zipper manifolds; flow iron; flow lines; manifold assemblies, instrument assembly; iron assembly; fluid sources, blenders; or the like.

The spherical swivel joint 114 may be used to connect the manifold assemblies in FIGS. 3 and 4 to each other, or one of the manifold assemblies to any of the zipper modules, iron assemblies, instrument assemblies, blenders, and/or fluid sources described herein. In some examples, the manifold assembly 12a in FIG. 3 is connected with a seven inch bore spherical swivel joint 114 to any of the zipper modules in FIGS. 11-22. In other examples, the zipper modules of FIGS. 11-22 are connected a spherical swivel joint 114 to any of the frac stacks in FIGS. 10-22.

Moreover, the crossover spool 118 defines an external convex annular surface 135 at an end portion thereof opposite the flange 128. In some examples, the crossover spool 118 is generally tubular and includes internal concave annular surfaces 136a and 136b at opposing end portions thereof. Crossover spool 118 defines an internal flow passage 160 that is in fluid communication with flow passages 132 and 124. Alternative embodiments may include other internal iron geometries (e.g., triangular, rectangular, octagonal, and the like), and annular surfaces 136a and 136b may instead be convex in shape.

A bearing housing 138 is connected to, and extends about, the spool 122 of the yoke 116a, thus defining an annular space within which a spherical bearing 140 is positioned. The spherical bearing 140 includes an inner ring 142 defining a convex surface 143 on the exterior thereof, and an outer ring 144 defining a concave surface 145 on the interior thereof. The inner ring 142 is connected exteriorly about the spool 122 of the yoke 116a and the outer ring 144 is connected interiorly about the bearing housing 138. The convex surface 143 of the inner ring 142 and the concave surface 145 of the outer ring 144 engage one another to pivotably connect the crossover spool 118 to the yoke 116a; pivoting of the crossover spool 118 relative to the yoke 116a is accommodated by the engagement of the external convex annular surface 127 of the spool 122 with the internal concave annular surface 136a of the crossover spool 118.

Similarly, a bearing housing 146 is connected to, and extends about, the spool 130 of the yoke 116b, thus defining an annular space within which a spherical bearing 148 is positioned. The spherical bearing 148 includes an inner ring 150 defining a convex surface 151 on the exterior thereof, and an outer ring 152 defining a concave surface 153 on the interior thereof. The inner ring 150 is connected exteriorly about the spool 130 of the yoke 116b and the outer ring 152 is connected interiorly about the bearing housing 146. The convex surface 151 of the inner ring 150 and the concave surface 153 of the outer ring 152 engage one another to pivotably connect the crossover spool 118 to the yoke 116b; pivoting of the crossover spool 118 relative to the yoke 116b is accommodated by the engagement of the external convex annular surface 135 of the spool 130 with the internal concave annular surface 136b of the crossover spool 118.

In some examples, the spherical ball bearing 151 is an inner-raised plain spherical bearing that is free to rotate in the x, y, or z directions, and the outer ring 152 is an outer-raised plain spherical portion of a bearing that is fixed to the bearing housing 146. Similarly, in some examples, the spherical ball bearing 143 is an inner-raised plain spherical portion of a bearing that is free to rotate in the x-, y-, or z-directions, and the spherical bearing 144 is an outer-raised plain spherical portion of a bearing that is fixed to the bearing housing 146.

The two spherical bearings 151 and 143 create two separate three-dimensional points of rotation that provide much needed flexibility that allows the spherical swivel joint 114 to connect external flanges, ports, fittings, and the like of separate components that are not exactly lined up. This particular design of the spherical swivel joint 114 provides, in one specific example, up to seven degrees of flexibility in the x-, y-, and z-directions for the spool 118 between the yokes 116a and 116b, as measured along the longitudinal axis 134. In other examples, the spherical swivel joint 114 creates 0-15 degrees of x-, y-, and z-flexibility for the crossover spool 118.

Additionally, the spherical swivel joint 114, with its pair of ball bearings 143 and 151, has shown to provide, in some particular embodiments, up to the five inches of movement in the x-, y-, or z-directions. For example, the spool 118 may move yoke 116b horizontally by 1, 2, 3, 4, or 5 inches. The same flexible movement may be experienced in the y- and z-directions as well.

Examples disclosed herein show and reference the spherical swivel joint 114 as only having two spherical bearings 143 and 151 and respective bearing housings 138 and 146. The spherical swivel joint 114 may include additional bearings and bearing housings (3, 4, 5, 6, 7, 8, and so on) connected various crossover spools 118. Adding additional bearings provides added flexibility for the spherical swivel joint 114 in the x-, y-, and/or z-directions.

This flexibility of the spherical swivel joint 114 enables the various disclosed interconnected components to be quickly set up without having to find or level outdoor terrain. Put another way, flanges that provide fluid communication through the spherical swivel joint 114 can be connected much faster and, once connected, can adjust to movement of the flow iron caused by workers, weather, or movement of their supportive manifolds or trailers. For example, pipes of disclosed flow iron may be connected via the spherical swivel joint 114, and such connection may be maintained through rain that perhaps causing sinking of one of the flow iron's trailers into wet ground. Myriad other examples exist and need not be discussed at length herein. But it should be noted that the spherical swivel joint 114, with its pair of rotatable spherical ball bearings 143 and 151 provide substantial flexibility and simplicity of alignment for connecting flow iron to itself, to external pressure lines, to zipper modules that integrate with wellheads, and to the wellheads themselves. Setup of the disclosed flow iron and interconnection with the zipper manifolds and modules becomes substantially easier and less time consuming using the spherical swivel joint 114.

In several examples, when the yoke 116a is connected to the flow fitting 98b of the iron assembly 24 and the yoke 116b is connected to the zipper manifold 28, any vertical and/or horizontal offset between the fluid conduit 93 of the iron assembly 24 and the zipper manifold 28 is accommodated by the combination of pivoting of the crossover spool 118 relative to the yoke 116a and pivoting of the crossover spool 118 relative to the yoke 116b. Such vertical and/or horizontal offset is shown in FIGS. 9A-9C by the offset between the longitudinal axes 126 and 134 of the yokes 116a and 116b, respectively. In several exemplary embodiments, the length of the crossover spool 118 is selected to accommodate at least one of, the spacing, the vertical offset, and the horizontal offset between the fluid conduit 93 of the iron assembly 24 and the zipper manifold 28.

In several embodiments, the axial or longitudinal length of the crossover spool 118 may be varied to accommodate the distance between the iron assembly 24 and the zipper manifold 28. For example, the axial length of the crossover spool 118 may range from about 5 feet to about 30 feet. The axial or longitudinal length of the crossover spool 118 may range from about 5 feet to about 25 feet. For example, the axial or longitudinal length of the crossover spool 118 may be 5, 6, 7, 8, 9, 10, 11, 12, 13, 14, 15, 16, 17, 18, 19, 20, 21, 22, 23, 24, 25 feet, or any length between such measurements.

In several embodiments, at least the following combination of components together form a single fluid passageway adapted to accommodate high-pressure fluid flow from the pumps 16a-1 to the zipper manifold 28: the high pressure manifold 32 of the manifold assembly 12a; the high pressure manifold 32 of the manifold assembly 12b; the fluid conduit 71 of the instrument assembly 26; and the fluid conduit 93 of the iron assembly 24.

As indicated above, with continuing reference to FIG. 1, the wellheads 18a-d are each located at the top or head of an oil and gas wellbore, which penetrates one or more subterranean formations, and are used in oil and gas exploration and production operations. In several exemplary embodiments, fracturing (or "frac") stacks 158a-d are operably coupled to the wellheads 18a-d, respectively. The frac stacks 158a-d may be substantially identical to each other (as may the wellheads 18a-d). Therefore, in connection with FIG. 10, only the frac stack 158a will be described in detail below. Though, the description below applies to every one of the frac stacks 158a-d.

Again, to accommodate large-bore fluid channels, the spherical swivel joints 114 may have an internal diameter of 3-9 inches. Some specific examples use bore diameters for the spherical swivel joints 114 of 3, 4, 5, 6, 7, 8, or 9 inches, as well as any measurement therebetween (e.g., 7.1, 7.2, 7.3, 7.4, 7.5, 7.6, 7.7, 7.8, or 7.9 inches.

FIGS. 9B and 9C are top and three-dimensional views of the spherical swivel joint 114 of FIG. 9A. FIGS. 9B and 9C show different perspectives of one particular example of the spherical swivel joint 114, depicting the exteriors and dimensions of yokes 116a and 116b, bearing housings 138 and 16, and spool 118 being cylindrical or tubular in dimension. Additionally, some examples use longitudinally-extending flange connectors 910a and 910b that are positioned around a circumferential edge of the flanges 120 and 128, spaced equidistant from each other. Other examples may use fewer or more flange connectors 910a and 910b. Still other examples position the flange connectors 910a and 910b in different patterns or non-equidistant from each other. The extending flange connectors 910a and 910b have be shown to create tight and rigid connections with flow iron components while the spool 118 is allowed to flexibly move because of the internal ball bearings 143 and 151.

Reciprocal female flange slots may be used on the various flow iron disclosed herein to connect to the ends of the spherical swivel joint 114. Alternative connective techniques may be used. For example, the spherical swivel joint 114 may include receptacle female slots in flanges 120 and 128 that receive similar flange connectors 910a and 910b that are part of the flow iron ends. Still other examples may use various locks, magnets, or other connective mechanisms to connect to the spherical swivel joint 114.

Figure 10:
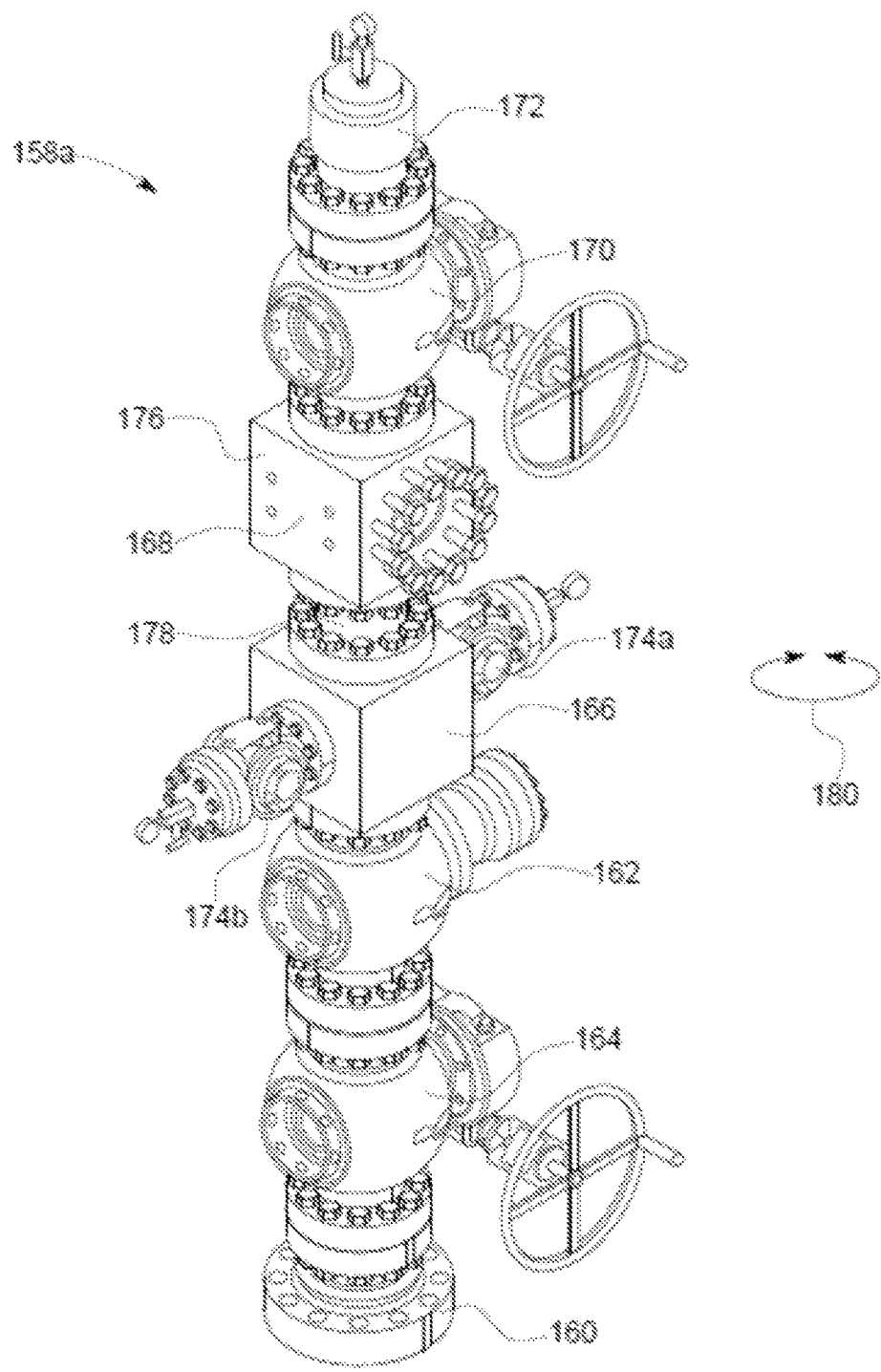
FIG. 10 is a perspective view of a fracturing stack operably coupled to a wellhead, the fracturing stack including a pair of plug valves, according to one example.

In an exemplary embodiment, as illustrated in FIG. 10 with continuing reference to FIG. 1, the frac stack 158a includes an adapter spool 160, a pair of master valves, such as, for example, upper and lower plug valves 162 and 164, a production tee 166, a swivel assembly 168, a swab valve, such as, for example, a plug valve 170, and a tree adapter 172. The upper and lower plug valves 162 and 164 are operably coupled in series to one another above the adapter spool 160. In several exemplary embodiments, the upper plug valve 162 of the frac stack 158a is an automatic plug valve, and the lower plug valve 164 is a manual plug valve. The adapter spool 160 facilitates the connection between different sized flanges of the wellhead 18a (not shown in FIG. 10) and the lower plug valve 164. The production tee 166 is operably coupled to the upper plug valve 162 and includes a production wing valve 174a and a kill wing valve 174b connected thereto. The swivel assembly 168 is operably coupled to the production tee 166, opposite the upper plug valve 162, and includes a swivel tee 176 rotatably connected to a swivel spool 178. The swivel tee 176 of the frac stack 158a is configured to rotate about a vertical axis and relative to the swivel spool 178, the production tee 166, the upper and lower plug valves 162 and 164, and the adapter spool 160, as indicated by the curvilinear arrow 180 in FIG. 10. The tree adapter 172 is operably coupled to the plug valve 170 opposite the swivel assembly 168, and includes a cap and gauge connected thereto to verify closure of the plug valve 170.

Figure 11:
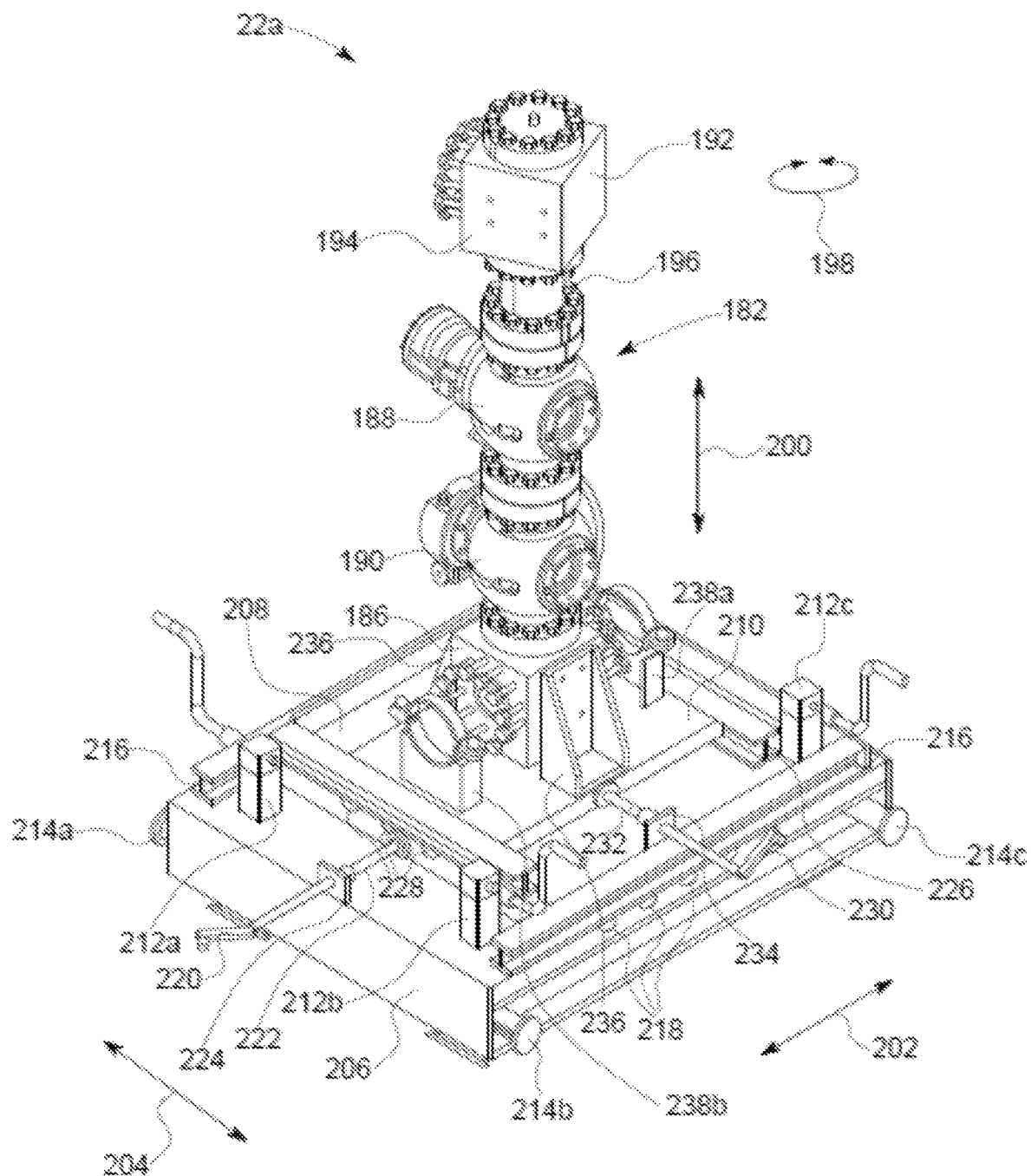
FIG. 11 is a perspective view of a zipper module, according to one example.

As indicated above, with continuing reference to FIG. 1, the zipper manifold 28 is formed by the interconnection of the zipper modules 22a-d, which zipper modules, in turn, are operably coupled to the wellheads 18a-d, respectively. Referring additionally to FIG. 11, an example of one of the zipper modules 22a-d is illustrated. In several exemplary embodiments, the zipper modules 22a-d are substantially identical to each other, and, therefore, in connection with FIG. 11, only the zipper module 22a will be described in detail below; however, the description below applies to every one of the zipper modules 22a-d. The zipper module 22a includes a vertical zipper stack 182 supported by an adjustable zipper skid 184.

In an example, as illustrated in FIG. 11 with continuing reference to FIG. 1, the vertical zipper stack 182 includes a connection tee 186, a pair of valves, such as, for example, upper and lower plug valves 188 and 190, and a swivel assembly 192. The upper and lower plug valves 188 and 190 are operably coupled in series to one another, the lower plug valve 190 being operably coupled to the connection tee 186. In several exemplary embodiments, the upper plug valve 188 of the vertical zipper stack 182 is an automatic plug valve, and the lower plug valve 190 is a manual plug valve. The swivel assembly 192 is operably coupled to the upper plug valve 188, opposite the lower plug valve 190 and the connection tee 186, and includes a swivel tee 194 rotatably connected to a swivel spool 196. The swivel tee 194 of the vertical zipper stack 182 is configured to rotate about a vertical axis and relative to the swivel spool 196, the upper and lower plug valves 188 and 190, and the connection tee 186, as indicated by the curvilinear arrow 198 in FIG. 11.

In some examples, the adjustable zipper skid 184 is configured to displace the zipper stack 182 to align the swivel tee 194 of the zipper module 22a with the corresponding swivel tee 176 of the frac stack 158a, as will be described in further detail below. More particularly, the adjustable zipper skid 184 is configured to displace the zipper stack 182 up and down in the vertical direction, and back and forth in at least two horizontal directions, as indicated by the linear arrows 200, 202, and 204, respectively, in FIG. 11. In several examples, the vertical direction 200 and the at least two horizontal directions 202 and 204 are orthogonal.

In an exemplary embodiment, with continuing reference to FIG. 11, the adjustable zipper skid 184 includes a generally rectangular base 206, a lower carriage plate 208 supported on the base 206, and an upper carriage plate 210 supported on the lower carriage plate 208. The base 206 includes vertical jacks 212a-d (the jack 212d is not visible in FIG. 11) and lifting pegs 214a-d (the lifting peg 214d is not visible in FIG. 11). The lifting pegs 214a-d are configured to facilitate placement of the adjustable zipper skid 184 on a generally horizontal surface proximate one of the frac stacks 158a-d via, for example, a crane, a forklift, a front-end loader, or another lifting mechanism. The vertical jacks 212a-d are operably coupled to respective corners of the base 206 so that, when the adjustable zipper skid 184 is positioned on the generally horizontal surface proximate one of the frac stacks 158a-d, the jacks 212a-d are operable to level, and to adjust the height of, the base 206 relative to the corresponding frac stack 158a-d, as will be described in further detail below.

The lower carriage plate 208 is operably coupled to the base 206 via, for example, a pair of alignment rails 216 and a plurality of rollers 218 disposed between the base 206 and the lower carriage plate 208. The rotation of a handcrank 220 displaces the lower carriage plate 208 in the horizontal direction 202 and relative to the base 206. More particularly, the handcrank 220 is connected to a threaded shaft 222 that is threadably engaged with a stationary mount 224 on the base 206, an end portion of the threaded shaft 222 opposite the handcrank 220 being operably coupled to the lower carriage plate 208. During the displacement of the lower carriage plate 208 in the horizontal direction 202 and relative to the base 206, the alignment rails 216 engage the lower carriage plate 208, thus constraining the movement of the lower carriage plate 208 to the horizontal direction 202 only.

Similarly, the upper carriage plate 210 is operably coupled to the lower carriage plate 208 via, for example, a pair of alignment rails 226 and a plurality of rollers 228 disposed between the lower carriage plate 208 and the upper carriage plate 210. The rotation of a handcrank 230 displaces the upper carriage plate 210 in the horizontal direction 204 and relative to both the lower carriage plate 208 and the base 206. More particularly, the handcrank 230 is connected to a threaded shaft 232 that is threadably engaged with a stationary mount 234 operably coupled to the base 206 via, for example, one of the alignment rails 216 of the lower carriage plate 208, an end portion of the threaded shaft 232 opposite the handcrank 230 being operably coupled to the upper carriage plate 210. During the displacement of the upper carriage plate 210 in the horizontal direction 204 and relative to both the lower carriage plate 208 and the base 206, the alignment rails 226 engage the upper carriage plate 210, thus constraining the movement of the upper carriage plate 210 to the horizontal direction 204 only.

In several embodiments, instead of, or in addition to the use of handcranks, relative movement between the upper carriage plate 210 and the lower carriage plate 208 may be done by sliding the plate 210 relative to the plate 208, and vice versa, with a lubricant being disposed between the plates 210 and 208 to facilitate the relative sliding movement. Alternatively or additionally, the plates 208 and 210 may also be displaced by the application of external forces by way of a crane or forklift, for example A pair of mounting brackets 236 operably couples the connection tee 186 of the vertical zipper stack 182 to the upper carriage plate 210, opposite the rollers 228. Additionally, a pair of support brackets 238a and 238b are also coupled to the upper carriage plate 210 on opposing sides of the connection tee 186, the support brackets 238a and 238b being configured to facilitate the interconnection of the zipper modules 22a-d to from the zipper manifold 28, as will be described in further detail below.

As indicated above, with continuing reference to FIGS. 1, 10, and 11, the zipper modules 22a-d are operably coupled to the wellheads 18a-d, respectively, and are interconnected to form the zipper manifold 28. In several exemplary embodiments, the zipper modules 22c and 22d are incorporated into the zipper manifold 28 and operably coupled to the wellheads 18c and 18d, respectively, in substantially the same manner that the zipper modules 22a and 22b are incorporated into the zipper manifold 28 and operably coupled to the wellheads 18a and 18b, respectively. Therefore, in connection with FIGS. 12-16, only the incorporation of the zipper modules 22a and 22b into the zipper manifold 28 via, inter alia, the connection of the zipper modules 22a and 22b to the wellheads 18a and 18b, respectively, will be described in detail below; however, the description below applies equally to the manner in which the zipper modules 22c and 22d are incorporated into the zipper manifold 28 and operably coupled to the wellheads 18c and 18d, respectively.

Figure 12:
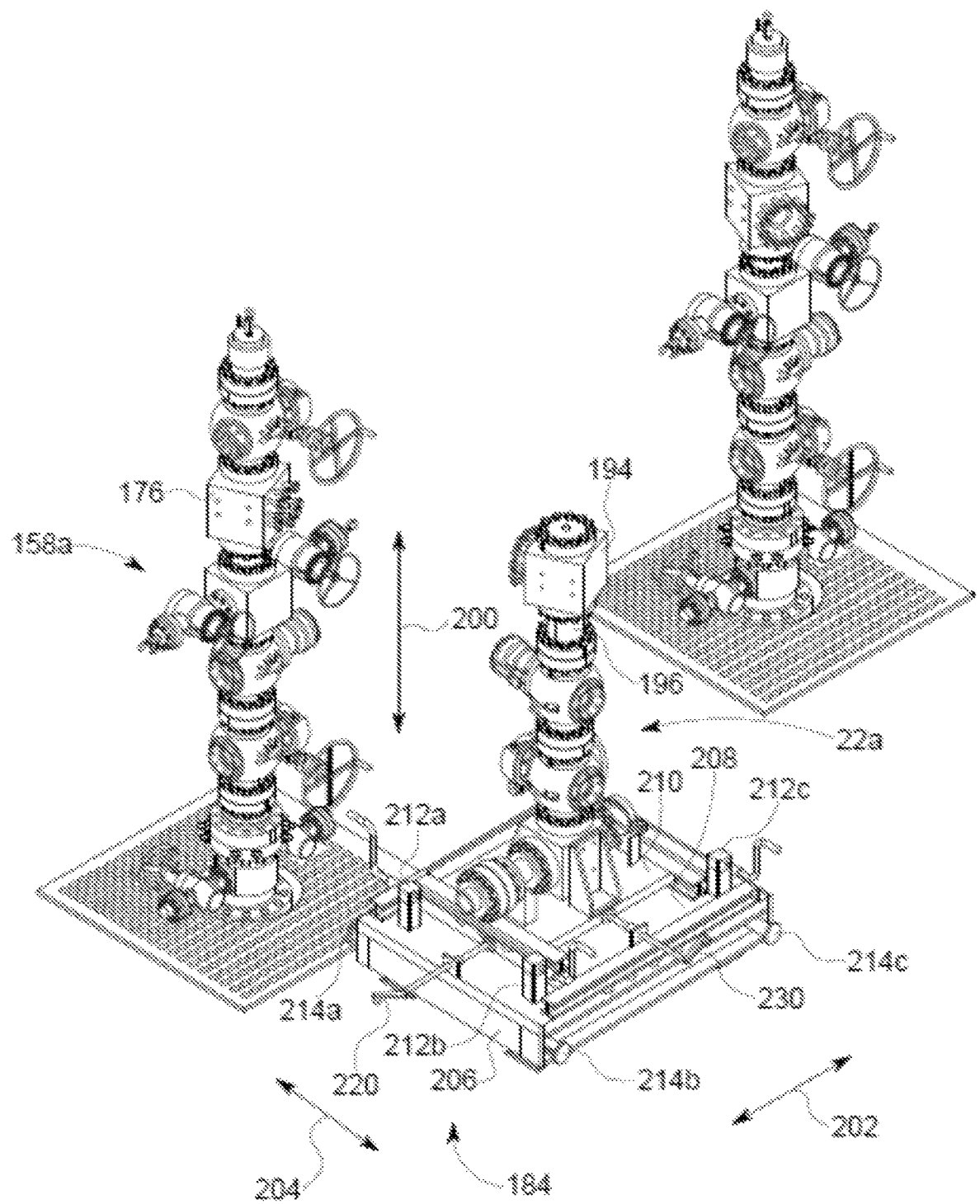
FIGS. 12-16 are perspective views illustrating first, second, third, fourth, and fifth stages, respectively, for interconnecting two of zipper modules and operably coupling the zipper modules with fracturing stacks, according to one example.

In operation, as illustrated in FIGS. 12-19 with continuing reference to FIGS. 1, 10, and 11, a lifting mechanism (not shown), such as, for example, a crane, a forklift, a front-end loader, or the like, engages the lifting pegs 214a-d of the adjustable zipper skid 184 to place the zipper module 22a on the generally horizontal surface proximate the wellhead 18a (to which the frac stack 158a is operably coupled), as shown in FIG. 12. The vertical jacks 212a-d are then adjusted to vertically align the swivel tee 194 of the zipper module 22a with the swivel tee 176 of the frac stack 158a, and to level the base 206 of the zipper module 22a. Should the travel of the vertical jacks 212a-d be inadequate to substantially vertically align the swivel tee 194 of the zipper module 22a with the swivel tee 176 of the frac stack 158a, the swivel spool 196 of the vertical zipper stack 182 may be omitted in favor of another fixed-length fluid conduit, as will be discussed in further detail below.

Figure 13:
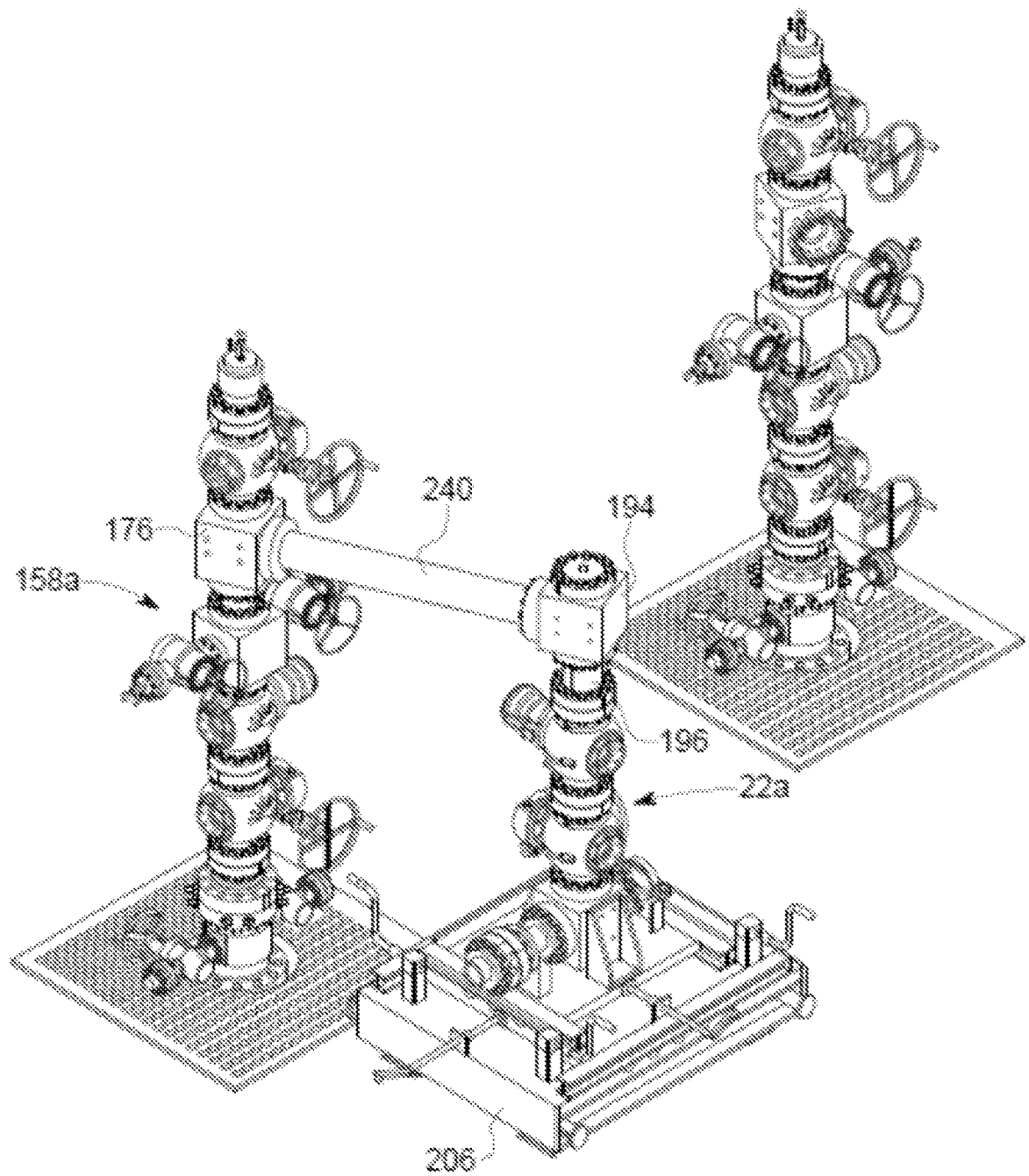

The handcranks 220 and 230 of the zipper module 22a are used to move the carriage plates 208 and 210, respectively, and thus the vertical zipper stack 182, in the at least two horizontal directions 202 and 204, respectively; such horizontal movement of the zipper module 22a adjusts the horizontal spacing between the swivel tees 176 and 194. As shown in FIG. 13, once the appropriate vertical alignment and horizontal spacing between the swivel tees 176 and 194 has been achieved through the use of the vertical jacks 212a-d and the handcranks 220 and 230, the swivel tees 176 and 194 are each rotated to face each other, thus facilitating their interconnection via a fluid conduit, such as, for example, a straight pipe 240 with flanged end portions.

In several exemplary embodiments, the straight pipe 240 may be omitted in favor of a spherical joint (not shown) or the spherical swivel joint 114 in FIG. 9A-9C that is substantially similar to the spherical joint 114 and includes all of the components of the spherical joint 114, except that the crossover spool of the spherical joint has a longitudinal or axial length that is less than the axial or longitudinal length of the crossover spool 118 of the spherical swivel joint 114. In several examples, the straight pipe 240 may be omitted in favor of a spherical swivel joint 114 that all of the previously mentioned components of the spherical swivel joint 114, except that the crossover spool has a longitudinal or axial length that is greater than the axial or longitudinal length of the crossover spool 118 of the spherical swivel joint 114.

Figure 14:
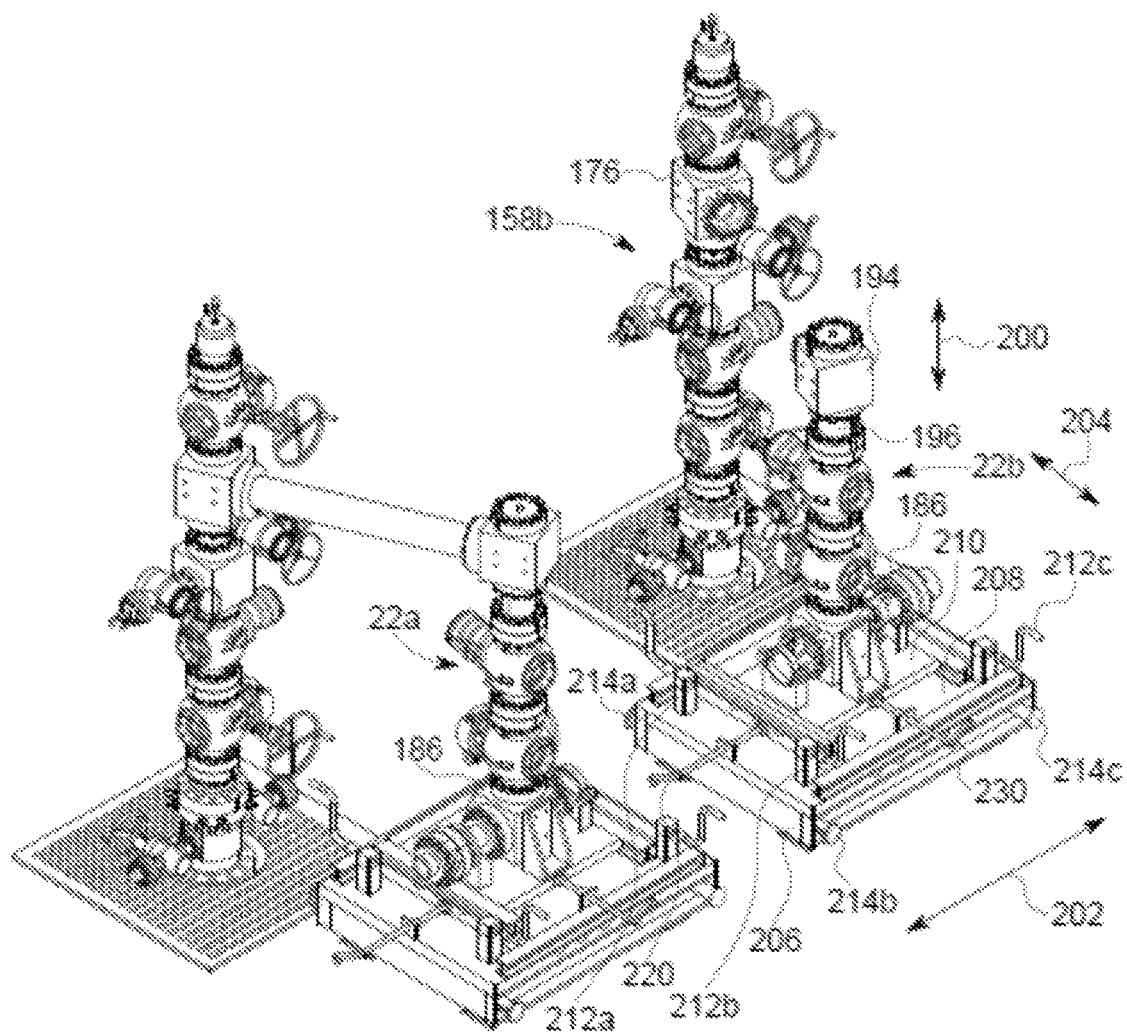
Figure 15:
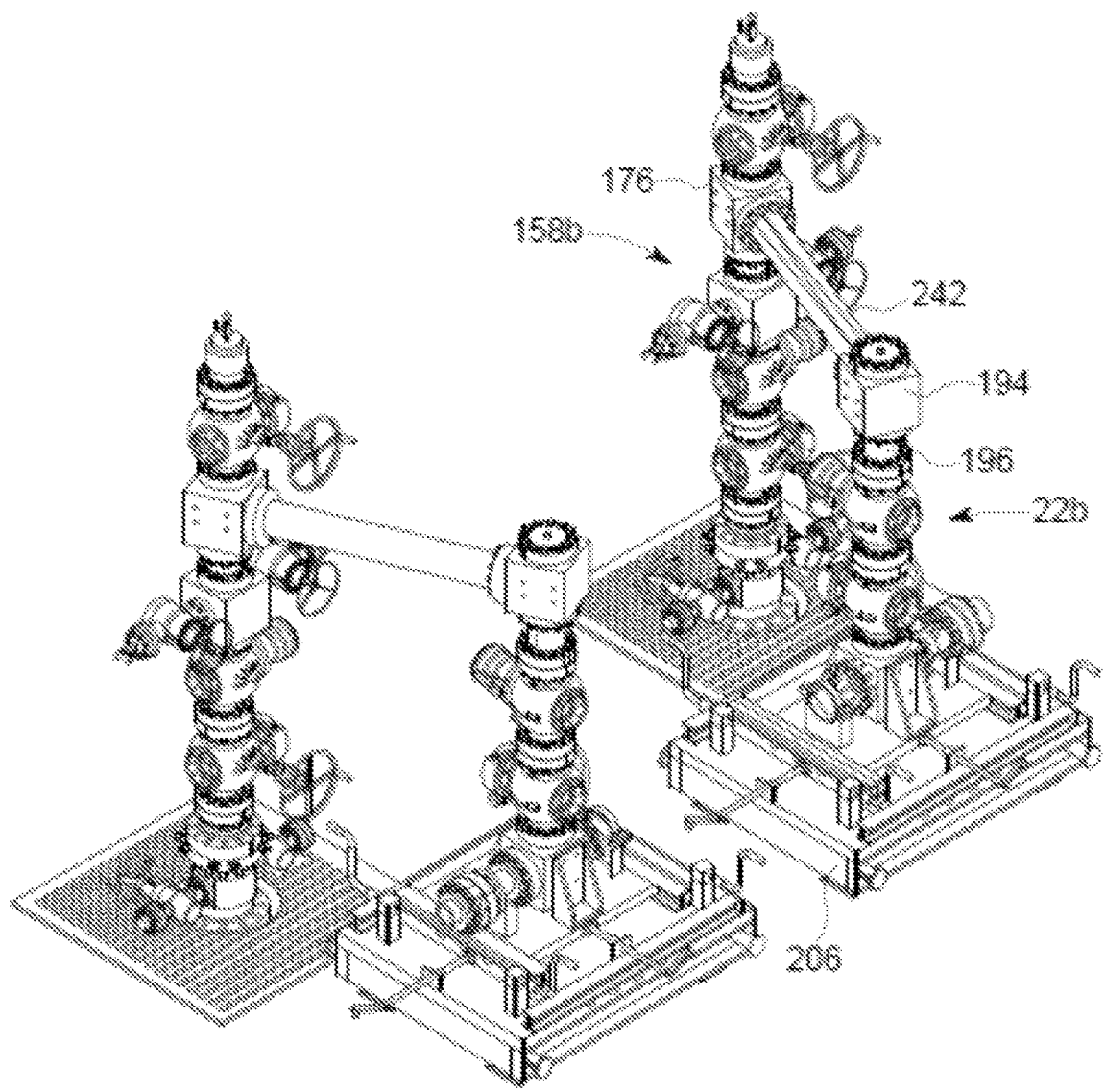
Figure 16:
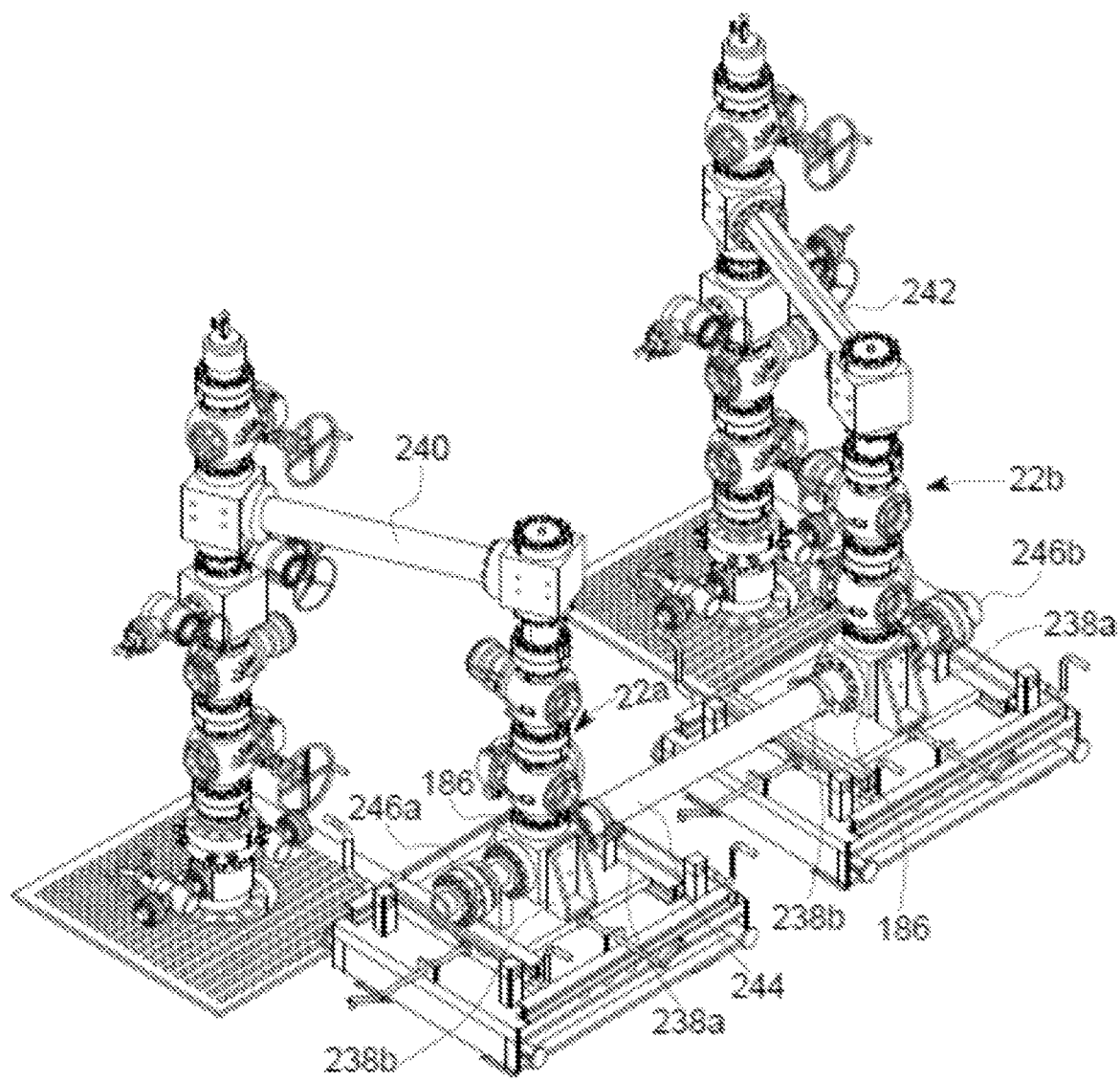
Figure 17:
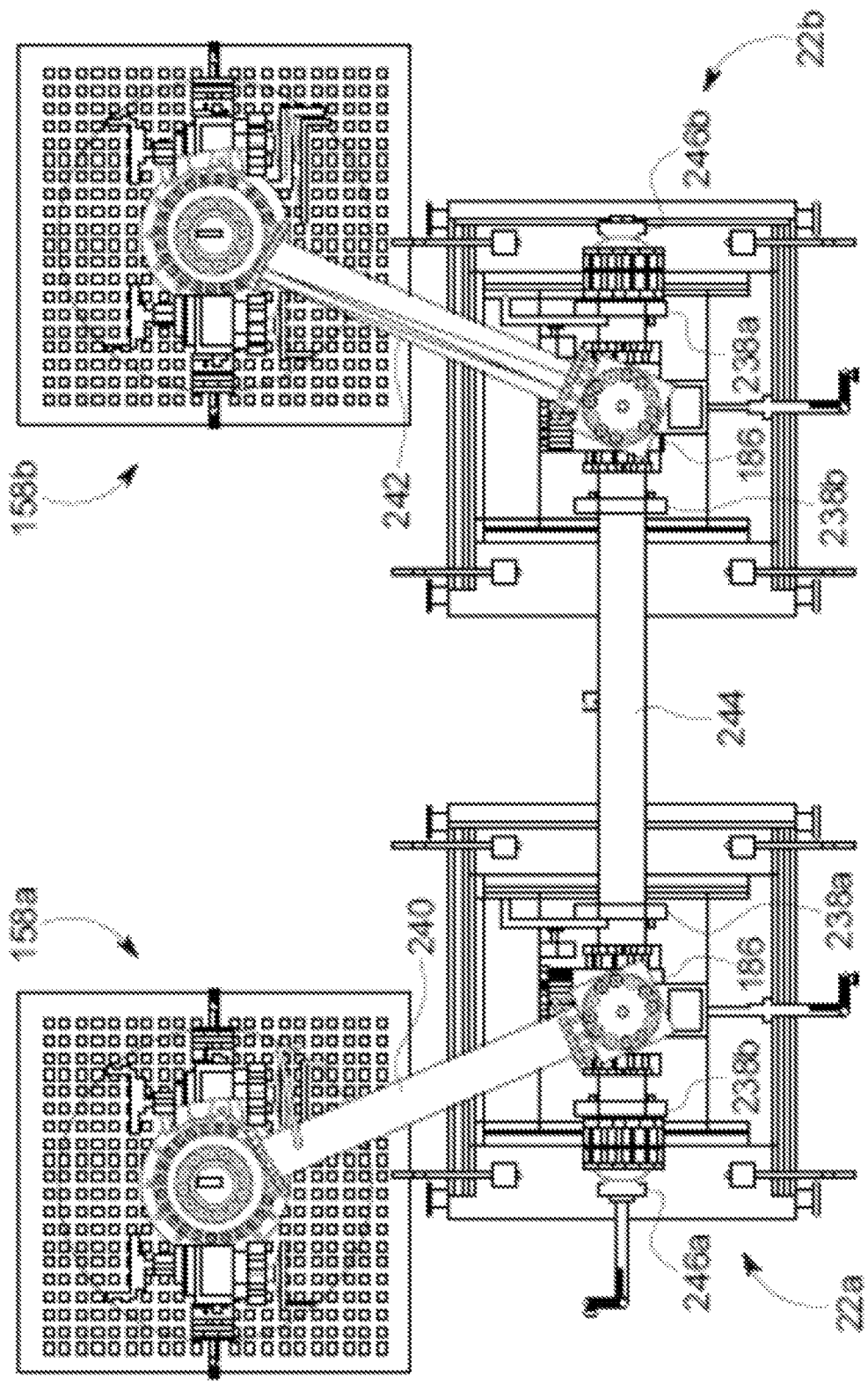
FIGS. 17-19 are top, elevational, and side views, respectively, of the fifth stage for interconnecting two of the zipper modules of FIGS. 1 and 11, and operably coupling the zipper modules with fracturing stacks, according to one example.
Figure 18:
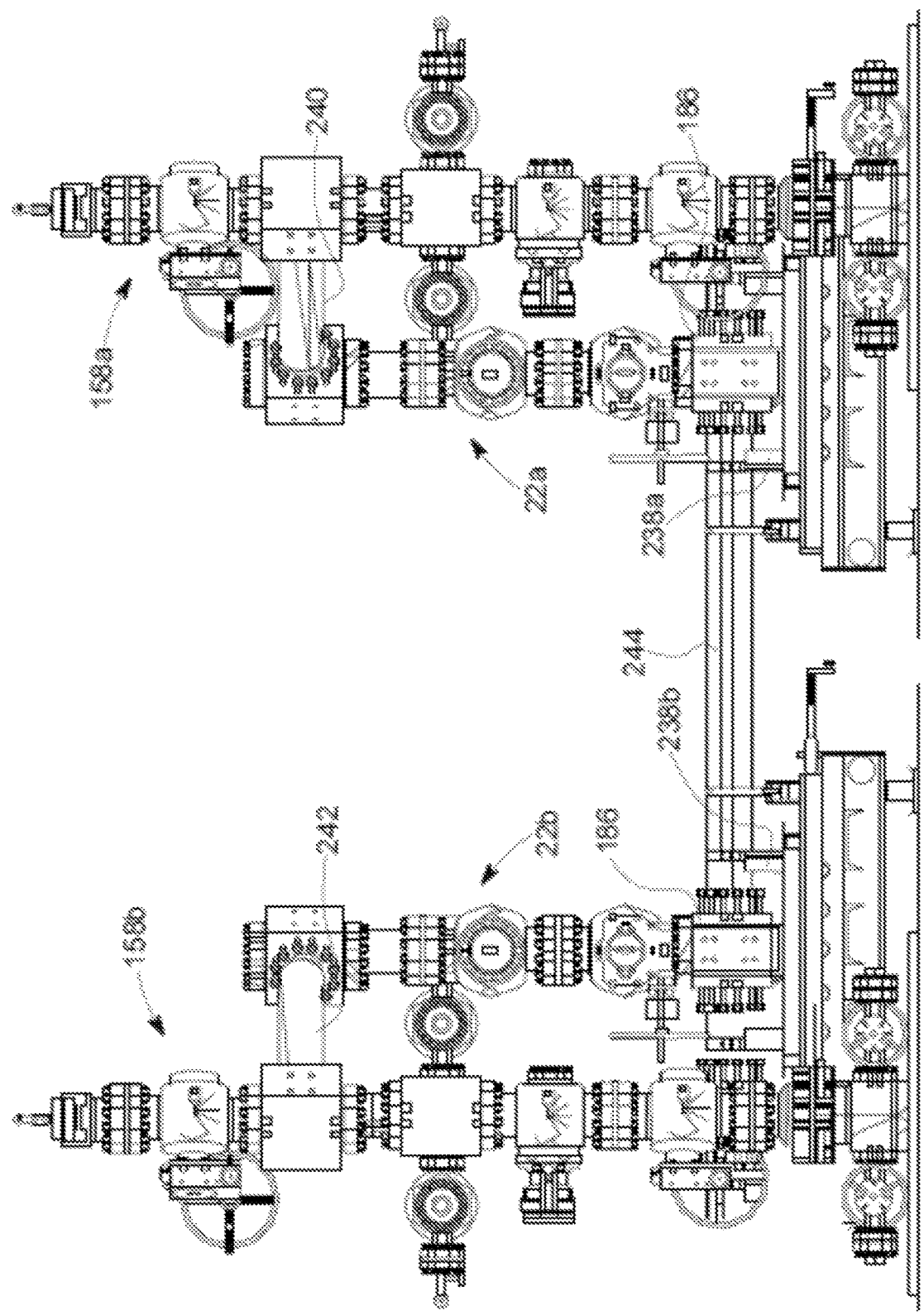
Figure 19:
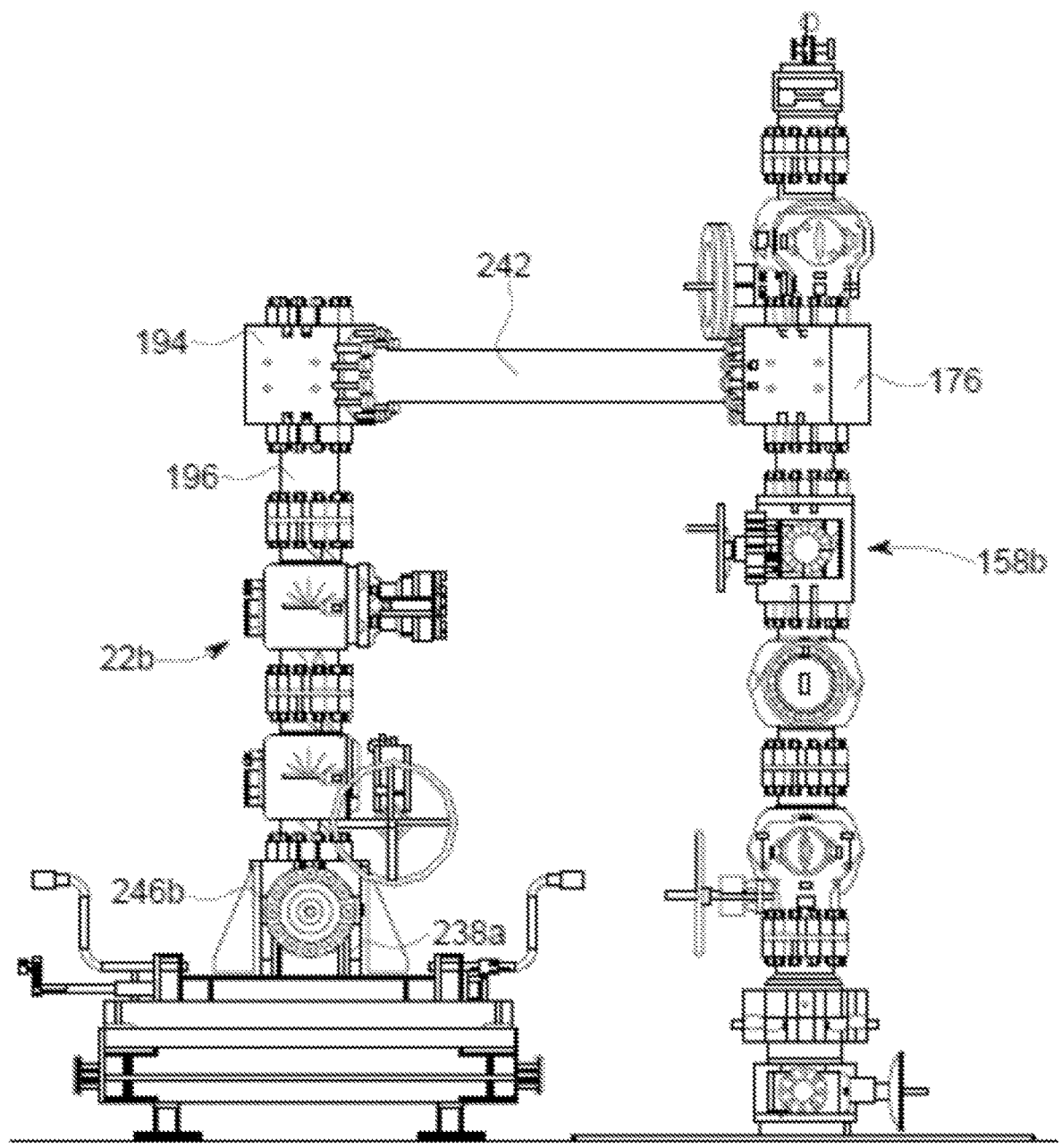

In a similar manner, the lifting mechanism (not shown) engages the lifting pegs 214*a-d* of the adjustable zipper skid 184 to place the zipper module 22*b* on the generally horizontal surface proximate the wellhead 18*b* (to which the frac stack 158*b* is operably coupled), as shown in FIG. 14. The vertical jacks 212*a-d* are then adjusted to vertically align the swivel tee 194 of the zipper module 22*b* with the swivel tee 176 of the frac stack 158*b*, to level the base 206 of the zipper module 22*b*, and to vertically align the connection tee 186 of the zipper module 22*b* with the connection tee 186 of the zipper module 22*a*. Should the travel of the vertical jacks 212*a-d* be inadequate to substantially vertically align the swivel tee 194 of the zipper module 22*b* with the swivel tee 176 of the frac stack 158*b*, and to substantially vertically align the connection tee 186 of the zipper module 22*b* with the connection tee 186 of the zipper module 22*a*, the swivel spool 196 of the vertical zipper stack 182 may be omitted in favor of another fixed-length fluid conduit, as will be discussed in further detail below. The handcranks 220 and 230 of the zipper module 22*b* are used to move the carriage plates 208 and 210, respectively, and thus the vertical zipper stack 182, in the at least two horizontal directions 202 and 204, respectively. Such horizontal movement of the zipper module 22*b* adjusts the horizontal spacing between the swivel tees 176 and 194 and the horizontal spacing between the connection tees 186 of the zipper modules 22*a* and 22*b*, respectively. As shown in FIG. 15, once the appropriate vertical alignment and horizontal spacing between the swivel tees 176 and 194, and between the connection tees 186 of the zipper modules 22*a* and 22*b*, respectively, has been achieved through the use of the vertical jacks 212*a-d* and the handcranks 220 and 230, the swivel tees 176 and 194 are each rotated to face each other, thus facilitating their interconnection via a fluid conduit, such as, for example, a straight pipe 242 with flanged end portions.

In several examples, the straight pipe 242 may be omitted in favor of a spherical swivel joint 114 that all of the previously mentioned components of the spherical swivel joint 114, except that the crossover spool has a longitudinal or axial length that is less than the axial or longitudinal length of the crossover spool 118 of the spherical swivel joint 114. In several examples, the straight pipe 242 may be omitted in favor of a spherical swivel joint 114 that all of the previously mentioned components of the spherical swivel joint 114, except that the crossover spool has a longitudinal or axial length that is greater than the axial or longitudinal length of the crossover spool 118 of the spherical swivel joint 114.

Finally, as shown in FIGS. 16-19, the connection tees 186 of the zipper modules 22*a* and 22*b*, respectively, are interconnected via a fluid conduit, such as, for example, a straight pipe 244 with flanged end portions. Respective opposing end portions of the straight pipe 244 are supported by the support bracket 238*a* of the zipper module 22*a* and the support bracket 238*b* of the zipper module 22*b*. In some embodiments, the zipper manifold 28 includes only the zipper modules 22*a* and 22*b*; such embodiments include at least one of: a pipe-and-cap 246*a* supported by the support bracket 238*b* of the zipper module 22*a* and operably coupled to the connection tee 186, opposite the straight pipe 244, and a pipe-and-cap 246*b* supported by the support bracket 238*a* of the zipper module 22*b* and operably coupled to the connection tee 186, opposite the straight pipe 244. In other examples, the zipper manifold 28 further includes the zipper modules 22*c* and 22*d*, which are incorporated into the zipper manifold 28 and operably coupled to the wellheads 18*c* and 18*d*, respectively, in substantially the same manner as described above with respect to the zipper module 22*b* and the wellhead 18*b*; in such embodiments, the pipe-and-cap 246*a* is supported by the support bracket 238*b* of the zipper module 22*a* and operably coupled to the connection tee 186, opposite the straight pipe 244, and the pipe-and-cap 246*b* is supported by the support bracket 238*a* of the zipper module 22*d* and operably coupled to the connection tee 186, opposite a fluid conduit, such as, for example, a straight pipe that is substantially identical to the straight pipe 244.

In several examples, the above-described connections between each of the frac tree 158*a* and the zipper module 22*a*, the frac tree 158*b* and the zipper module 22*b*, and the zipper modules 22*a* and 22*b*, are made in whole or in part using automatic controls. In several exemplary embodiments, one or more sensors on the frac trees 158*a* and 158*b* and/or the zipper modules 22*a* and 22*b* are employed to determine necessary physical adjustments, and sensor data is transmitted to an automatic controller which, in turn, automatically effects physical adjustments in the system. In several examples, one or more electronic devices (such as position sensors and/or transponders) on the frac trees 158*a-d* ultimately communicate to one or more automatic controllers signals or data indicating the respective positions of the frac trees 158*a-d*, and the automatic controller(s) automatically effect physical adjustments to the system such as, for example, adjustments to the relative positions between the zipper modules 22*a-d*.

Figure 21:
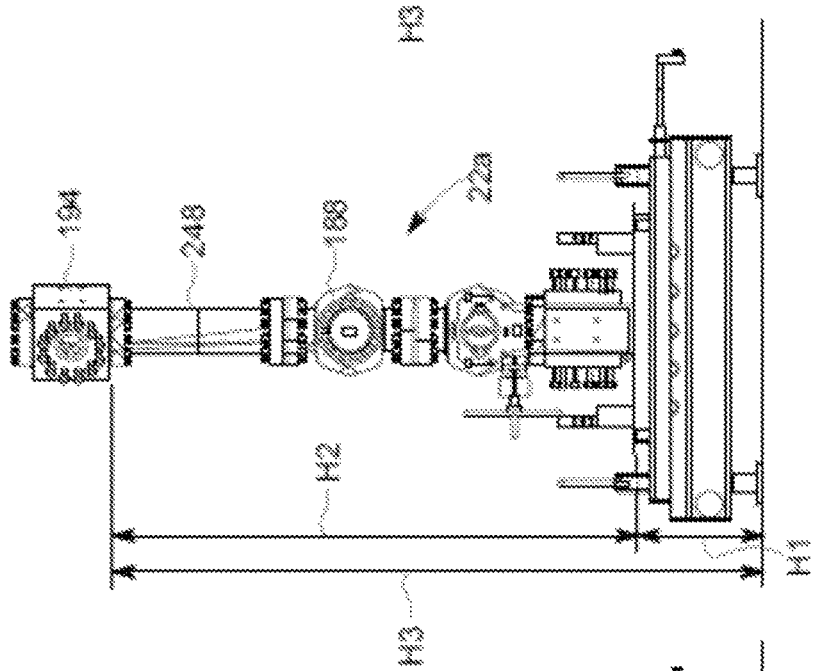
FIG. 21 is an elevational view of a zipper module of FIG. 11, in which the fluid conduit of FIG. 20 is replaced with another fluid conduit to thereby change the overall height of the zipper module, according to one example.
Figure 20:
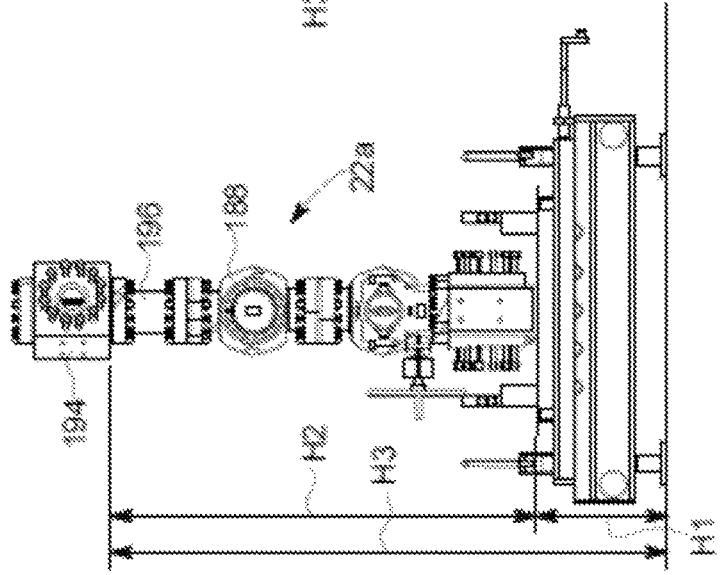
FIG. 20 is an elevational view of a zipper module having a fluid conduit operably coupled to a swivel tee, according to one example.

In examples, as illustrated in FIG. 20 with continuing reference to FIGS. 12-19, a first height H1 is defined between the generally horizontal surface proximate the wellhead 18*a* (to which the frac stack 158*a* is operably coupled, as shown in FIG. 12) and a top surface of the upper carriage plate 210 (i.e., opposite the rollers 228). As indicated above, the height H1 is adjustable via the vertical jacks 212*a-d* of the zipper module 22*a*. A second height H2 is defined between the top surface of the upper carriage plate 210 and the swivel tee 194 of the zipper module 22*a*. The height H2 is the aggregate of the respective heights of the connection tee 186, the upper and lower plug valves 188 and 190, the swivel spool 196, and the swivel tee 194. In aggregate, the first and second heights H1 and H2 together equal an overall height H3 of the swivel tee 194. In several examples, as illustrated in FIG. 21 with continuing reference to FIG. 20, the height H2 of the swivel tee 194 above top surface of the upper carriage plate 210 may be changed by omitting the swivel spool 196 of the vertical zipper stack 182 in favor of another fixed-length fluid conduit, such as, for example, a swivel spool 248 that is longer than the swivel spool 196. Although the swivel spool 248 in FIG. 21 is depicted as being longer than the swivel spool 196 in FIG. 20 to increase the height H2 and, thus, the overall height H3, the swivel spool 248 may be omitted in favor of another fluid conduit (not shown) that is shorter than the swivel spool 196 to decrease the height H2 and, thus, the overall height H3. Additionally, although described in relation to the zipper module 22a, the swivel spool 248 may be used in connection with any one of the zipper modules 22a-d.

Figure 22:
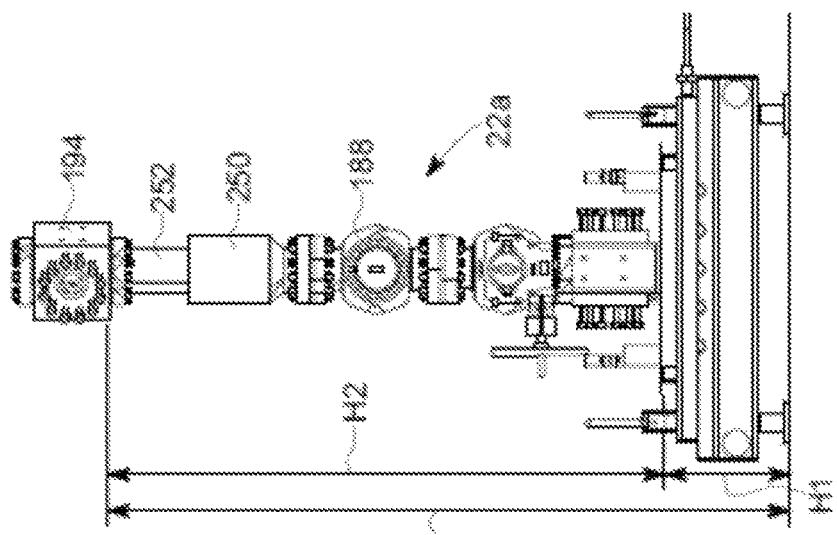
FIG. 22 is an elevational view of a zipper module in which the fluid conduit of FIG. 20 and/or another fluid conduit of FIG. 21 is replaced with yet another fluid conduit to thereby change the overall height of the zipper module, according to one example.

In several examples, as illustrated in FIG. 22 with continuing reference to FIG. 20, the height H2 of the swivel tee 194 above top surface of the upper carriage plate 210 may be changed by omitting the swivel spool 196 in favor of another fixed-length fluid conduit, such as, for example, the combination of a spool base 250 and a movable internal piston 252 that is movable in and out (longitudinally) of the spool base 250, making the combination of the spool base 250 and the movable internal piston 252 adjustable to reach the height of a wellhead inlet. With the movable internal piston 252 being adjustable vertically, in some examples, fluid conduits of the zipper module may then reach the wellhead with a single straight line of piping. As shown in FIG. 22, the spool base 250 is operably coupled to the upper plug valve 188 and sealingly retains the movable internal piston 252, which is operably coupled to the swivel tee 194. Although the combination of the spool base 250 and the movable internal piston 252 in FIG. 22 is depicted as being longer than the swivel spool 196 in FIG. 20 to increase the height H2 and, thus, the overall height H3, the movable internal piston 252 may be omitted in favor of another fluid conduit (not shown) so that the combined length of spool base 250 and the another fluid conduit is shorter than the swivel spool 196 to decrease the height H2 and, thus, the overall height H3. Additionally, although described in relation to the zipper module 22a, the combination of the spool base 250 and the movable internal piston 252 may be used in connection with any one of the zipper modules 22a-d.

Any combination of the swivel spool 196 (as shown in FIG. 20), the swivel spool 246 (as shown in FIG. 21), the spool base 250 together with the movable internal piston 252 (as shown in FIG. 22), and/or another fluid conduit(s), may be used to change the respective heights H2 of the zipper modules 22a-d to achieve vertical alignment between the respective swivel tees 176 and 194 of the frac stacks 158a-d and the zipper modules 22a-d. Thus, the respective heights H1 and H2 of the zipper modules 22a-d are adjustable to facilitate contemporaneous vertical alignment between each of the connection tees 186 of the respective zipper modules 22a-d; and the swivel tees 176 and 194 of the frac stacks 158a-d and the zipper modules 22a-d, respectively.

Figure 23:
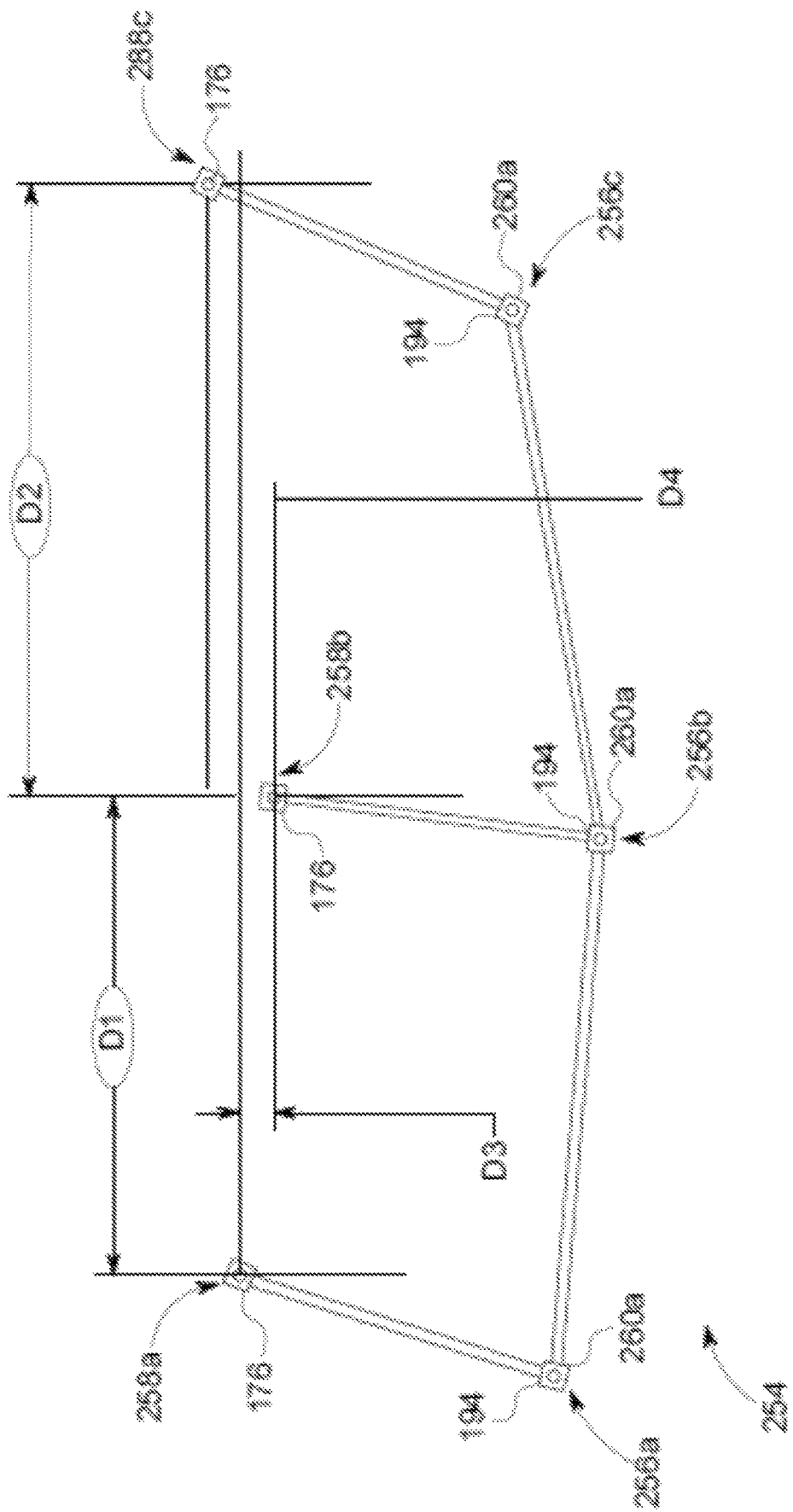
FIGS. 23 and 24 are top and perspective views, respectively, of another embodiment of a zipper manifold having zipper modules each having upper and lower connection tees that are circumferentially offset from each other, according to one example.
Figure 24:
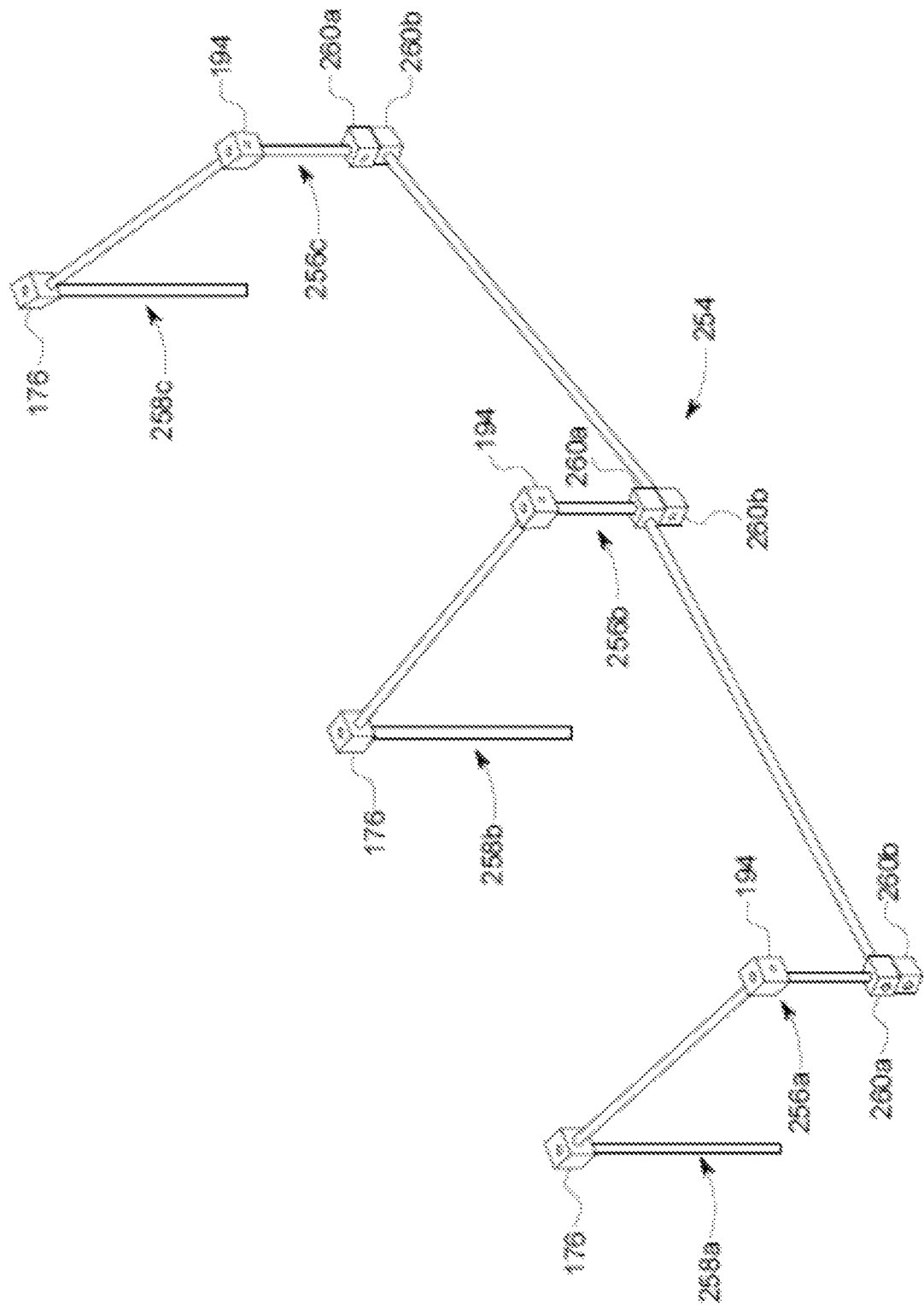

In examples, as illustrated in FIGS. 23 and 24 with continuing reference to FIGS. 10-19, a zipper manifold is schematically shown and generally referred to by the reference numeral 254. The zipper manifold 254 is configured to be operably coupled to the iron assembly 24 in a manner similar to that described above in connection with the zipper manifold 28. The zipper manifold 254 includes zipper modules 256a-c, each including several parts that are identical to the corresponding parts of the zipper module 22a as shown in FIG. 11, which identical parts are given the same reference numerals. The zipper modules 256a-c are operably coupled to wellheads (not shown) via fracturing (or "frac") stacks 258a-c, respectively, the frac stacks 258a-c each including several parts that are identical to the corresponding parts of the frac stacks 158a-d, which identical parts are given the same reference numerals. Certain components of the zipper modules 256a-c are omitted from view in FIGS. 23 and 24; these omitted components are represented by blank vertical pipes below the respective swivel tees 194 of the zipper modules 256a-c. Additionally, certain components of the frac stacks 258a-c are omitted from view in FIGS. 23 and 24; these omitted components are represented by blank vertical pipes below the respective swivel tees 176 of the frac stacks 258a-c.

The frac stack 258b may be spaced apart from the frac stack 258a by a distance D1 (measured from left to right as viewed in FIG. 23), and the frac stack 258c may be spaced apart from the frac stack 258b by a distance D2 (measured from left to right as viewed in FIG. 23). In several examples, the distance D1 is different than the distance D2.

Additionally, the frac stacks 258a and 258c are offset from the frac stack 258b by distances D3 and D4, respectively (measured from bottom to top as viewed in FIG. 23). The zipper modules 256a-c each include upper and lower connection tees 260a and 260b, respectively, rather than the connection tees 186, as shown most clearly in FIG. 24. The upper and lower connection tees 260a and 260b are configured to accommodate the different spacings and offsets between the frac stacks 258a-c, as represented in FIG. 23 by the distances D1, D2, D3, and D4. In several exemplary embodiments, the respective combinations of the upper and lower connection tees 260a and 260b of the zipper modules 256a-c are substantially identical to each other; therefore, in connection with FIGS. 23 and 24, only the combination of the upper and lower connection tees 260a and 260b associated with the zipper module 256b will be described in detail below; however, the description below applies to the respective combinations of the connection tees 260a and 260b associated with every one of the zipper modules 256a-c.

The upper connection tee 260a is operably coupled to those components of the zipper module 256b that are omitted from view in FIGS. 23 and 24. As indicated above, these omitted components are represented by the blank vertical pipe below the swivel tee 194 of the zipper module 256b. In some examples, the circumferential orientation of the upper connection tee 260a can be changed by, for example, disconnecting the upper connection tee 260a from the components of the zipper module 256b omitted from view in FIGS. 23 and 24, and, subsequently, re-connecting the upper connection tee 260b to said components of the zipper module 256b with a different circumferential orientation relative thereto. In some examples, the upper connection tee 260a may be connected to the components of the zipper module 256b omitted from view in FIGS. 23 and 24 via a flange fixedly connected to the upper side of the upper connection tee 260a, the flange having a plurality of circumferentially-spaced flange bolt holes; therefore, the circumferential orientation of the upper connection tee 260a, relative to the components of the zipper module 256b omitted from view in FIGS. 23 and 24, may be adjusted in increments equaling circumferential spacings between respective pairs of flange bolt holes.

Alternatively, a change in the circumferential orientation of the upper connection tee 260a may be facilitated by a swivel connection (not shown) provided between the upper connection tee 260a and those components of the zipper module 256b that are omitted from view in FIGS. 23 and 24. Such changes in the circumferential orientation of the upper connection tee 260a effect a circumferential offset between the upper connection tee 260a and the components of the zipper module 256b omitted from view in FIGS. 23 and 24.

Similarly, the lower connection tee 260b is operably coupled to the upper connection tee 260a via a fluid conduit, such as, for example, a straight pipe (not shown). In some examples, the circumferential orientation of the lower connection tee 260b can be changed by, for example, decoupling the lower connection tee 260b from the upper connection tee 260a, and, subsequently, re-coupling the lower connection tee 260b to the upper connection tee 260a (via the straight pipe between the upper and lower connection tees 260a and 260b) with a different circumferential orientation relative thereto. In an exemplary embodiment, the straight pipe extending between the tees 260a and 260b may be connected to the tees 260a and 260b via respective fixed flange connections, each of which has at least one plurality of circumferentially-spaced flange bolt holes; therefore, the relative circumferential orientation between the tees 260a and 260b may be modified by disconnecting one of the flange connections between the straight pipe and one of the tees 260a and 260b, and then adjusting the relative circumferential orientation between the tees 260a and 260b by rotating the plurality of circumferentially-spaced flange bolt holes of the disconnected flange connection; in this manner, the relative circumferential orientation between the tees 260a and 260b may be adjusted in an increment equaling a circumferential spacing between a pair of flange bolt holes.

Alternatively, a change in the circumferential orientation of the lower connection tee 260b may be facilitated by a swivel connection (not shown) provided between the lower connection tee 260b and the upper connection tee 260a. For example, the swivel connection may be incorporated into the fluid conduit (not shown) between the upper and lower connection tees 260a and 260b. Such changes in the circumferential orientation of the lower connection tee 260b effect a circumferential offset between the lower connection tee 260b and the upper connection tee 260a.

In several exemplary embodiments, the different spacings and offsets between the frac stacks 258a-c, as represented by the distances D1, D2, D3, and D4, are at least partially accommodated by the circumferential offsets of the respective upper connection tees 260a relative to the respective components of the zipper modules 256a-c that are omitted from view in FIGS. 23 and 24. In several examples, the different spacings and offsets between the frac stacks 258a-c, as represented by the distances D1, D2, D3, and D4, are at least partially accommodated by the circumferential offsets of the respective lower connection tees 260b relative to the respective upper connection tees 260a. In several examples, the different spacings and offsets between the frac stacks 258a-c, as represented by the distances D1, D2, D3, and D4, are at least partially accommodated by at least one of: the circumferential offsets of the respective upper connection tees 260a relative to the respective components of the zipper modules 256a-c that are omitted from view in FIGS. 23 and 24; and the circumferential offsets of the respective lower connection tees 260b relative to the respective upper connection tees 260a.

In operation, with continuing reference to FIGS. 23 and 24, the manner in which the zipper modules 256a-c are operably coupled to the frac stacks 258a-c, respectively, and interconnected to form the zipper manifold 254, is substantially identical to the manner in which the zipper modules 22a and 22b are operably coupled to the frac stacks 158a and 158b, respectively, and interconnected to form the zipper manifold 28 (as described above in connection with FIGS. 12-19), with certain exceptions. These exceptions involve the circumferential offsets of the respective upper connection tees 260a relative to the respective components of the zipper modules 256a-c that are omitted from view in FIGS. 23 and 24, and the circumferential offsets of the respective lower connection tees 260b relative to the respective upper connection tees 260a. Therefore, the manner in which the zipper modules 256a-c are operably coupled to the frac stacks 258a-c, respectively, and interconnected to form the zipper manifold 254, will not be described in further detail below.

Figure 25:
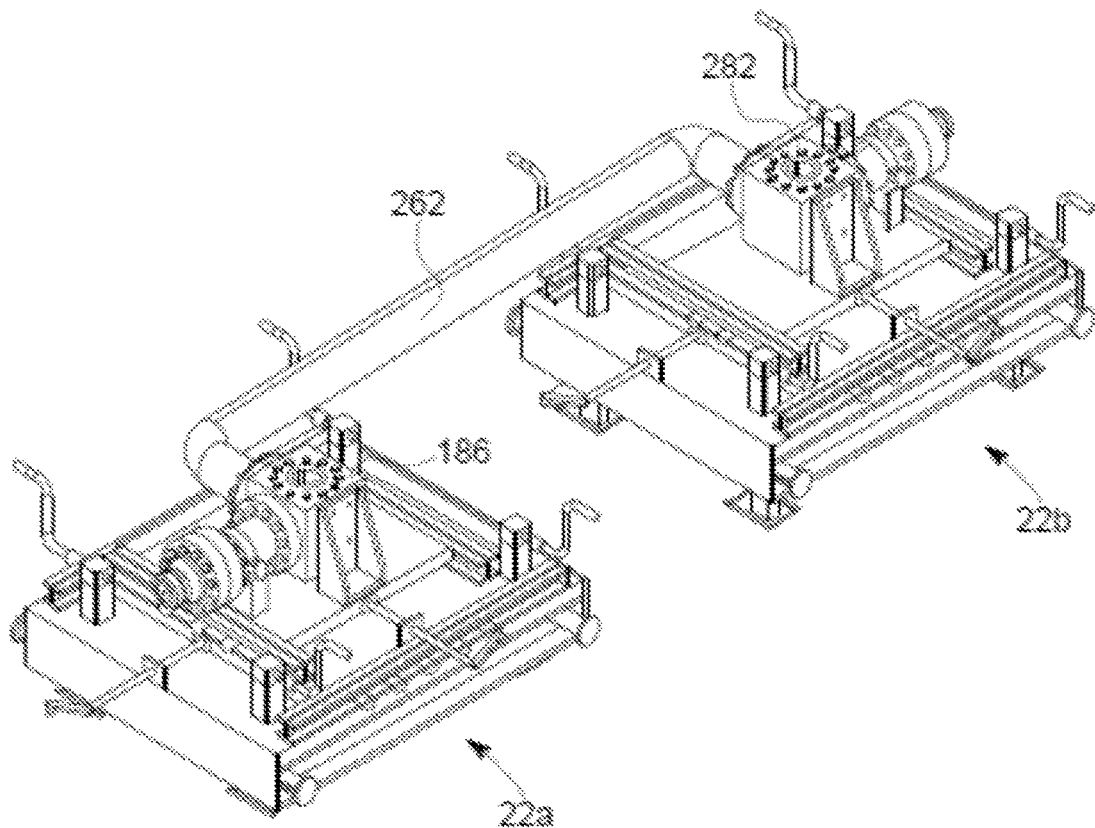
FIGS. 25 and 26 are perspective and elevational views, respectively, of a fluid conduit for interconnecting zipper modules while accommodating a vertical misalignment therebetween, according to one example.
Figure 26:
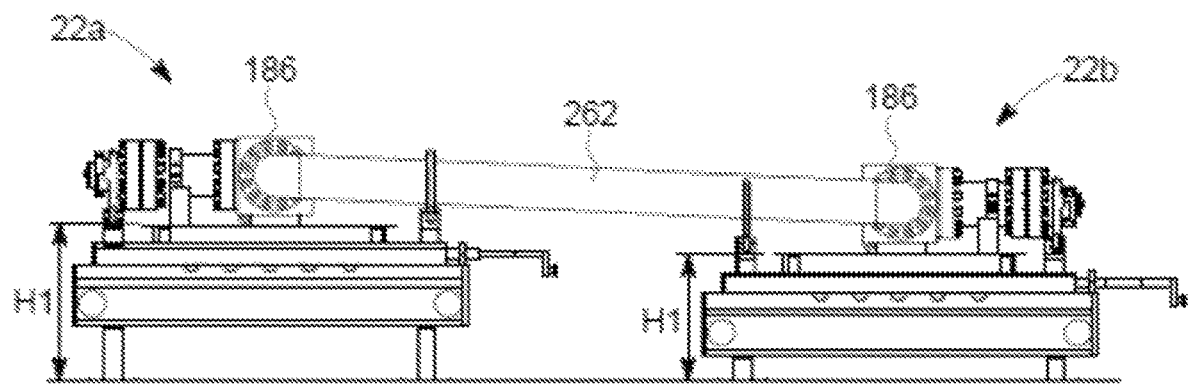

In the examples illustrated in FIGS. 25 and 26, the straight pipe 254 that interconnects the connection tees 186 of the zipper modules 22a and 22b, respectively (as shown in FIGS. 16-19), is substituted with another fluid conduit such as, for example, a U-shaped pipe joint 262. Certain components of the zipper modules 22a and 22b are omitted from view in FIGS. 25 and 26 to more clearly show the U-shaped pipe joint 262. The U-shaped pipe joint 262 allows for the connection tees 186 of the zipper modules 22a and 22b, respectively, to be operably coupled to, and in fluid communication with, one another, even when the respective heights H1 of the zipper modules 22a and 22b are different, as shown in FIGS. 25 and 26.

Figure 27:
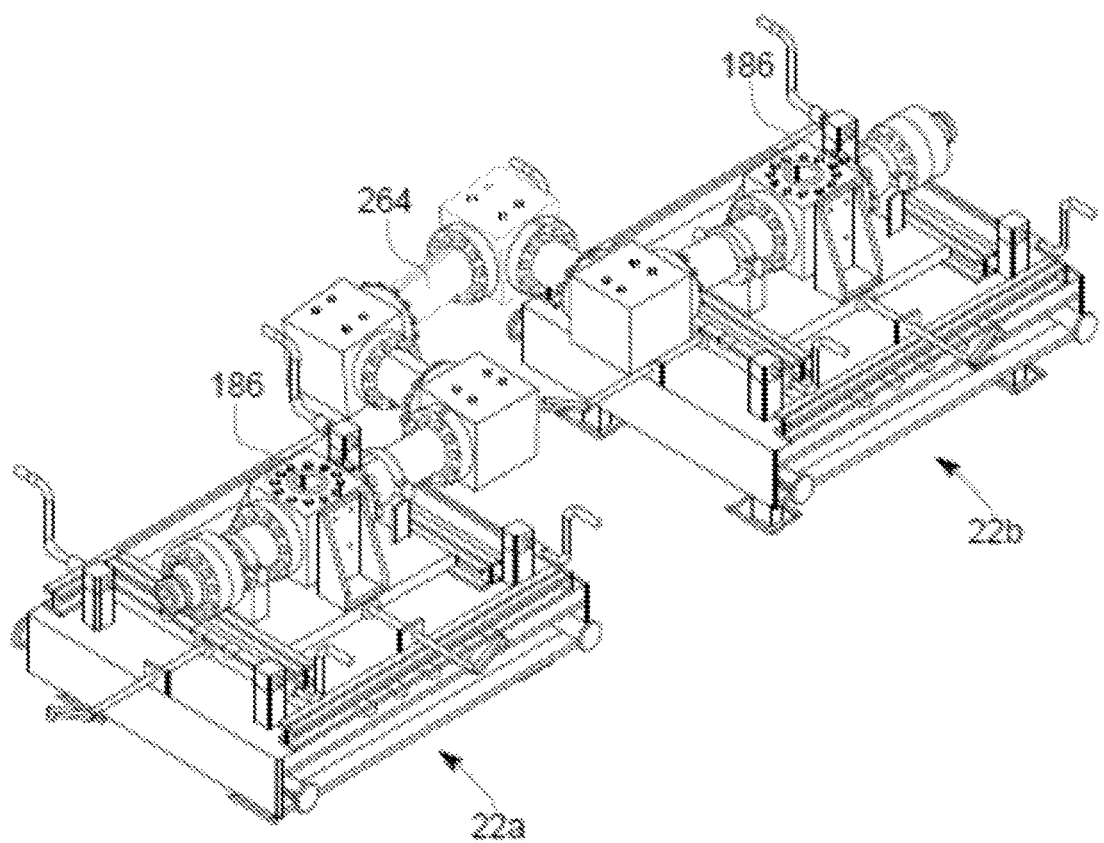
FIGS. 27 and 28 are perspective and elevational views, respectively, of another fluid conduit for interconnecting zipper modules while accommodating a vertical misalignment therebetween, according to one example.
Figure 28:
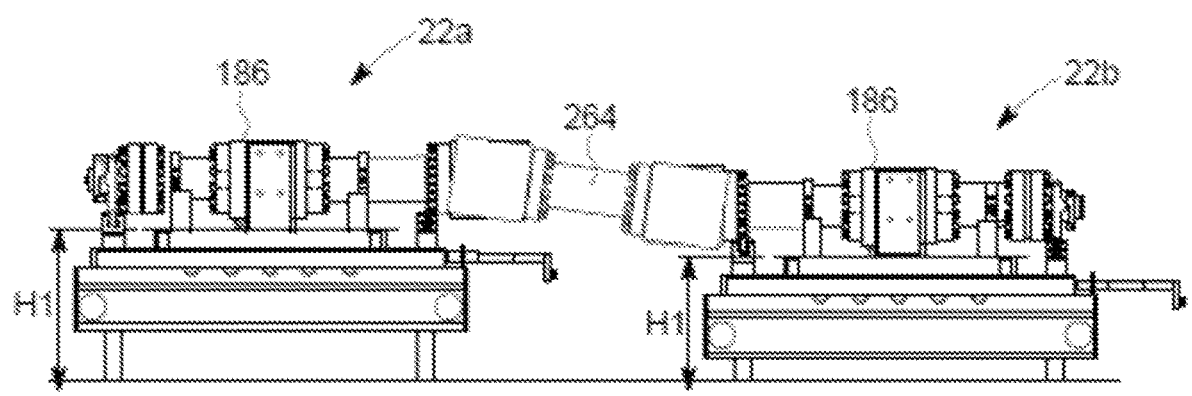

In the examples illustrated in FIGS. 27 and 28, the straight pipe 254 and/or the U-shaped pipe joint 262 that interconnects the connection tees 186 of the zipper modules 22a and 22b, respectively (as shown in FIGS. 16-19, 25, and 26), is substituted with another fluid conduit such as, for example, a swivel block assembly 264. Certain components of the zipper modules 22a and 22b are omitted from view in FIGS. 27 and 28 to more clearly show the swivel block assembly 264. The swivel block assembly 264 allows for the connection tees 186 of the zipper modules 22a and 22b, respectively, to be operably coupled to, and in fluid communication with, one another, even when the respective heights H1 of the zipper modules 22a and 22b are different, as shown in FIGS. 27 and 28.

Figure 29:
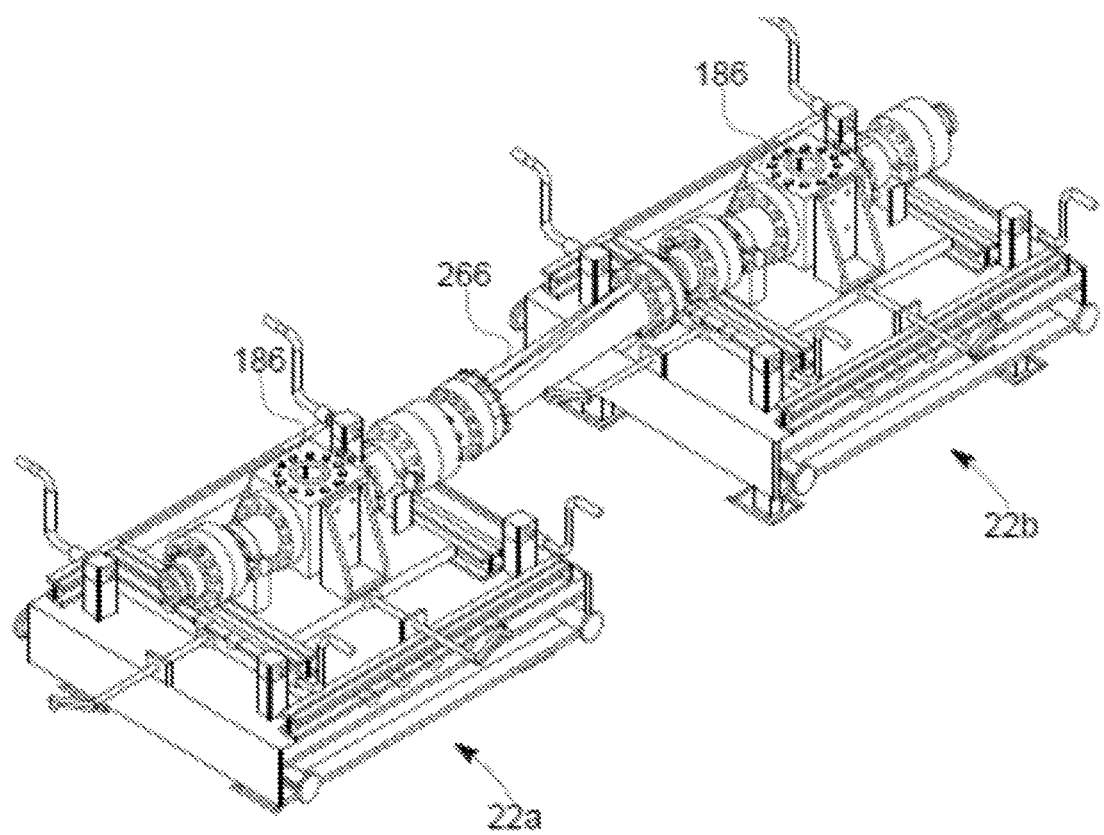
FIGS. 29 and 30 are perspective and elevational views, respectively, of a fluid conduit for interconnecting zipper modules while accommodating a vertical misalignment therebetween, according to one example.
Figure 30:
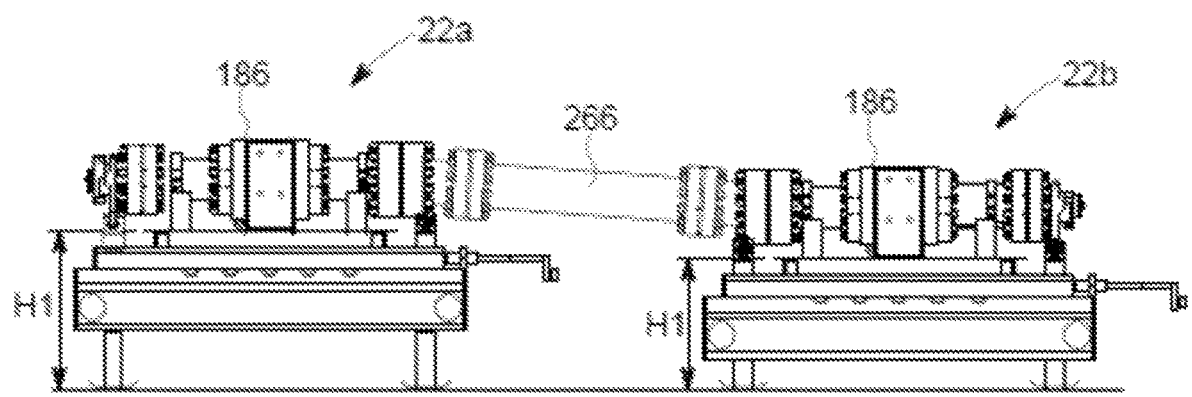

In the examples illustrated in FIGS. 29 and 30, the straight pipe 254, the U-shaped pipe joint 262, and/or the swivel block assembly 264 that interconnects the connection tees 186 of the zipper modules 22a and 22b, respectively (as shown in FIGS. 16-19 and 25-28), is substituted with another fluid conduit such as, for example, a pivot joint 266. Certain components of the zipper modules 22a and 22b are omitted from view in FIGS. 29 and 30 to more clearly show the pivot joint 266. The pivot joint 266 allows for the connection tees 186 of the zipper modules 22a and 22b, respectively, to be operably coupled to, and in fluid communication with, one another, even when the respective heights H1 of the zipper modules 22a and 22b are different, as shown in FIGS. 29 and 30.

Figure 31:
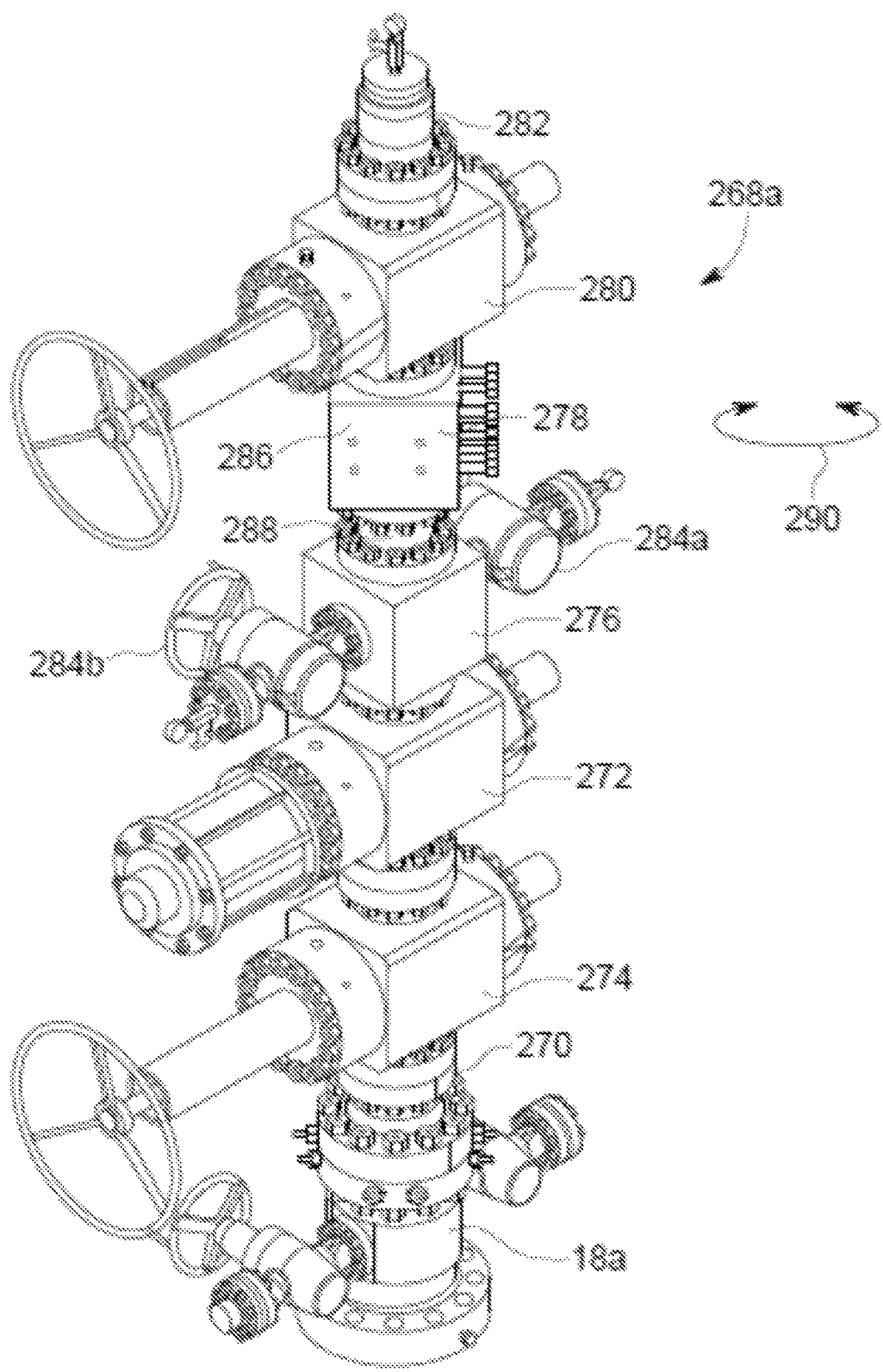
FIG. 31 is a perspective view of another fracturing stack having a pair of gate valves configured to be operably coupled to a wellhead, according to one example.

In several examples, as illustrated in FIG. 31 with continuing reference to FIG. 1, frac stacks 268a-d are operably coupled to the wellheads 18a-d, respectively. The frac stacks 268a-d are substantially identical to each other (as are the wellheads 18a-d), and, therefore, in connection with FIG. 31, only the frac stack 268a will be described in detail below; however, the description below applies to every one of the frac stacks 268a-d. As shown in FIG. 31, the frac stack 268a includes an adapter spool 270, a pair of master valves, such as, for example, upper and lower gate valves 272 and 274, a production tee 276, a swivel assembly 278, a swab valve, such as, for example, a gate valve 280, and a tree adapter 282. The upper and lower gate valves 272 and 274 are operably coupled in series to one another above the adapter spool 270. In several examples, the upper gate valve 272 of the frac stack 268a is an automatic gate valve, and the lower gate valve 274 is a manual gate valve. The adapter spool 270 facilitates the connection between different sized flanges of the wellhead 18a and the lower gate valve 274. The production tee 276 is operably coupled to the upper gate valve 272 and includes a production wing valve 284a and a kill wing valve 284b connected thereto. The swivel assembly 278 is operably coupled to the production tee 276, opposite the upper gate valve 272, and includes a swivel tee 286 rotatably connected to a swivel spool 288. The swivel tee 286 of the frac stack 268a is configured to rotate about a vertical axis and relative to the swivel spool 288, the production tee 276, the upper and lower gate valves 272 and 274, and the adapter spool 270, as indicated by the curvilinear arrow 290 in FIG. 31. The tree adapter 282 is operably coupled to the gate valve 280 opposite the swivel assembly 278, and includes a cap and gauge connected thereto to verify closure of the gate valve 280.

Figure 32:
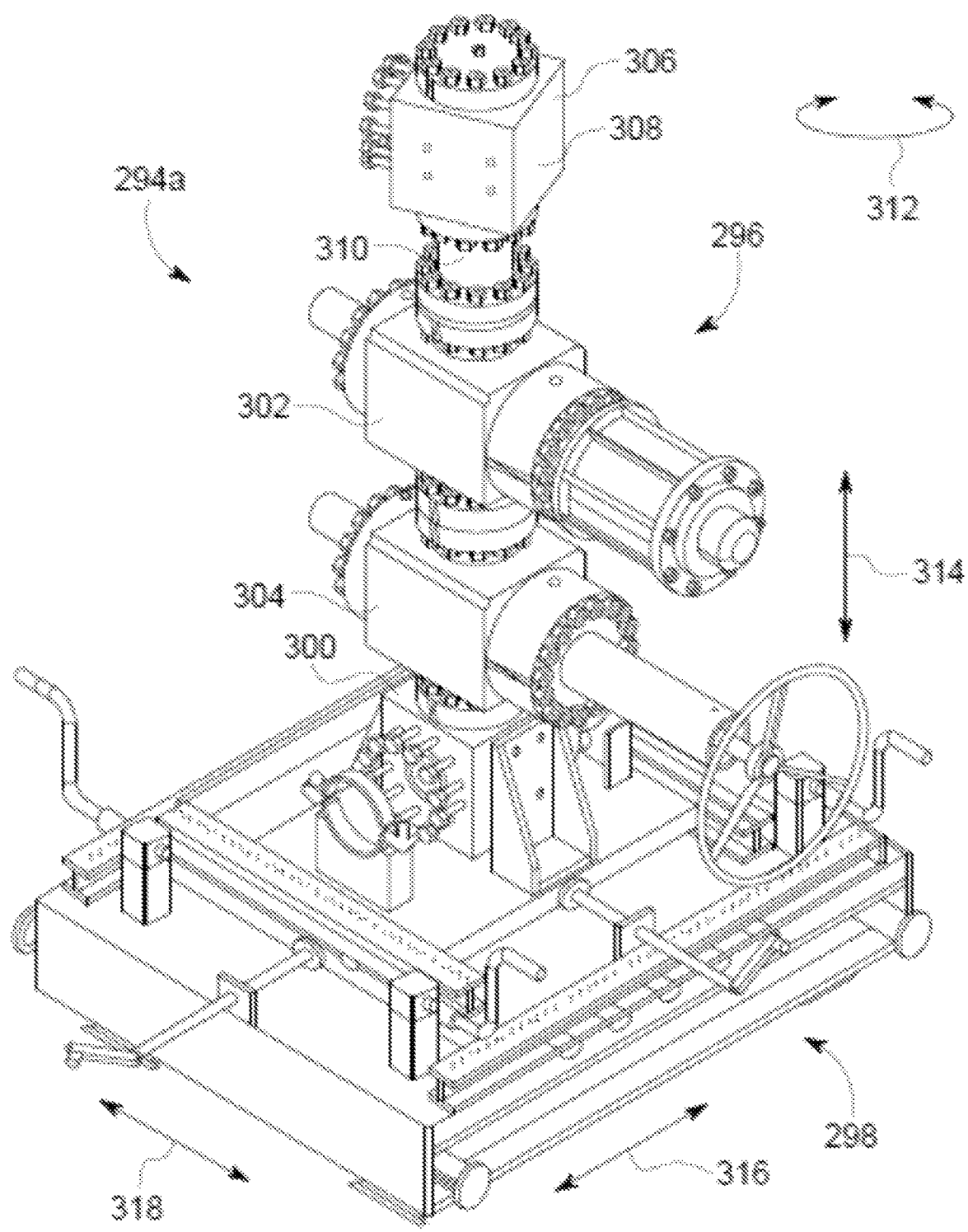
FIG. 32 is a perspective view of another a zipper module, the zipper module including a pair of gate valves, according to one example.
Figure 33:
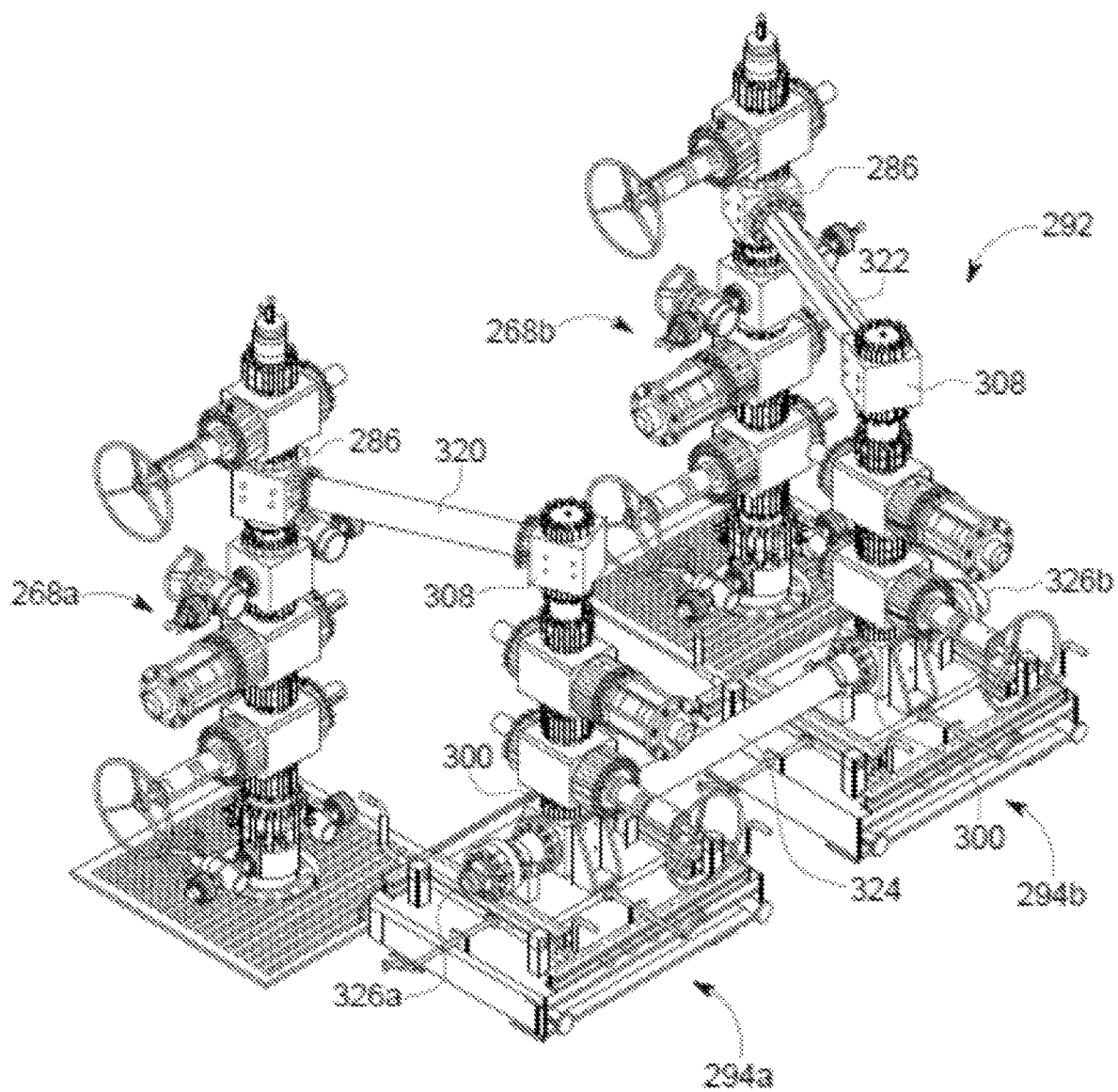
FIGS. 33-36 are perspective, top, elevational, and side views, respectively, of a stage for interconnecting two zipper modules and operably coupling two zipper modules with two fracturing stacks, according to one example.
Figure 34:
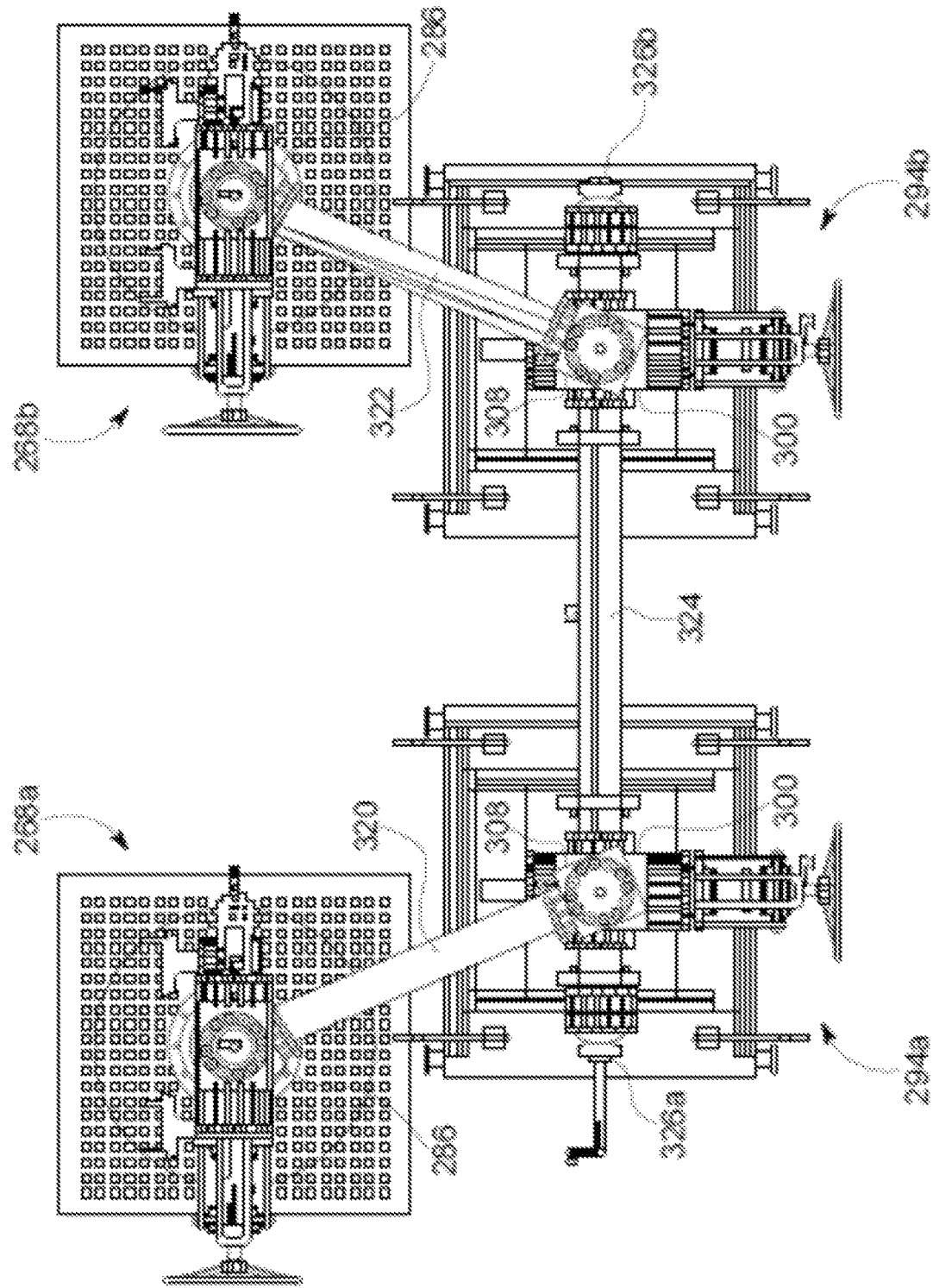
Figure 35:
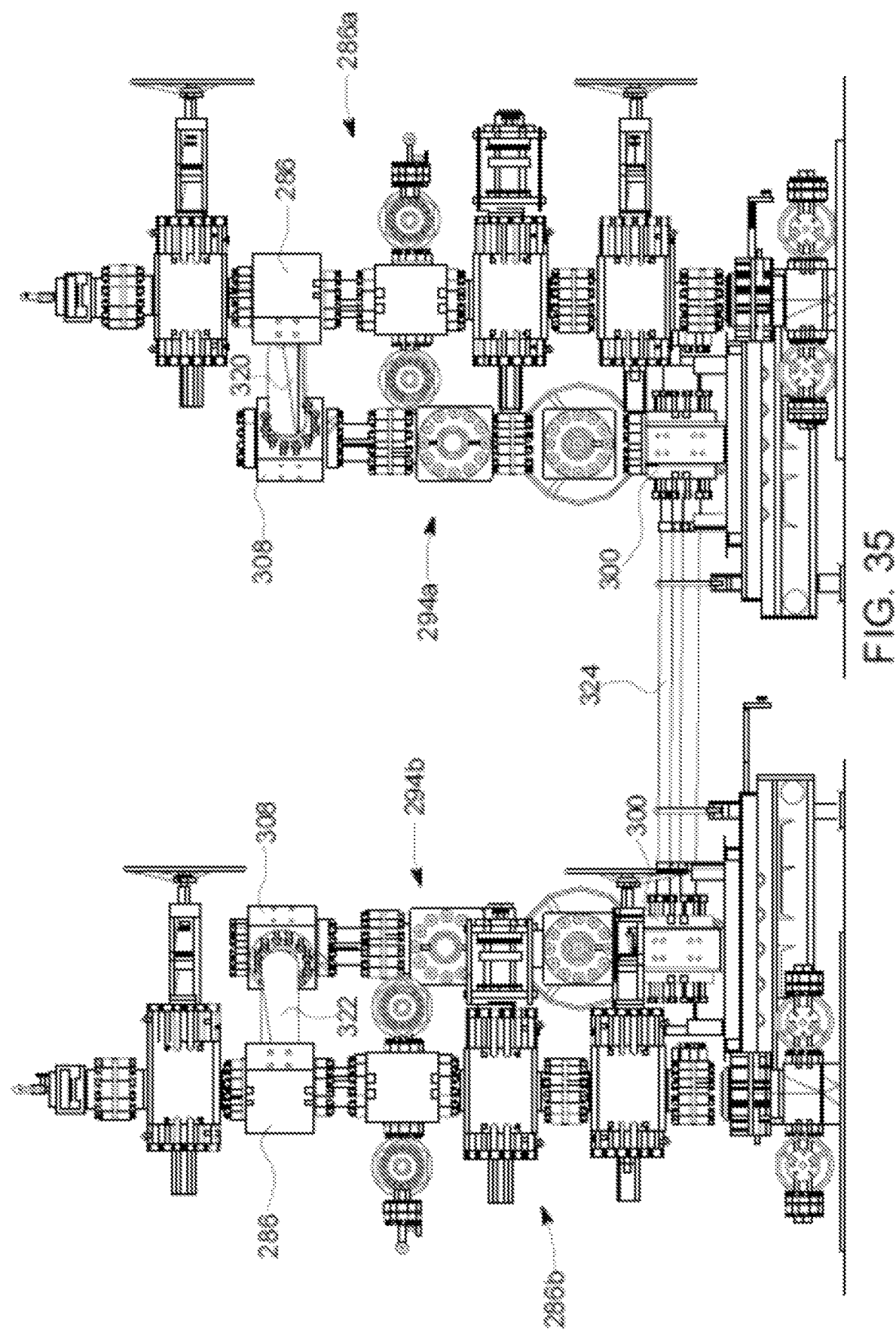
Figure 36:
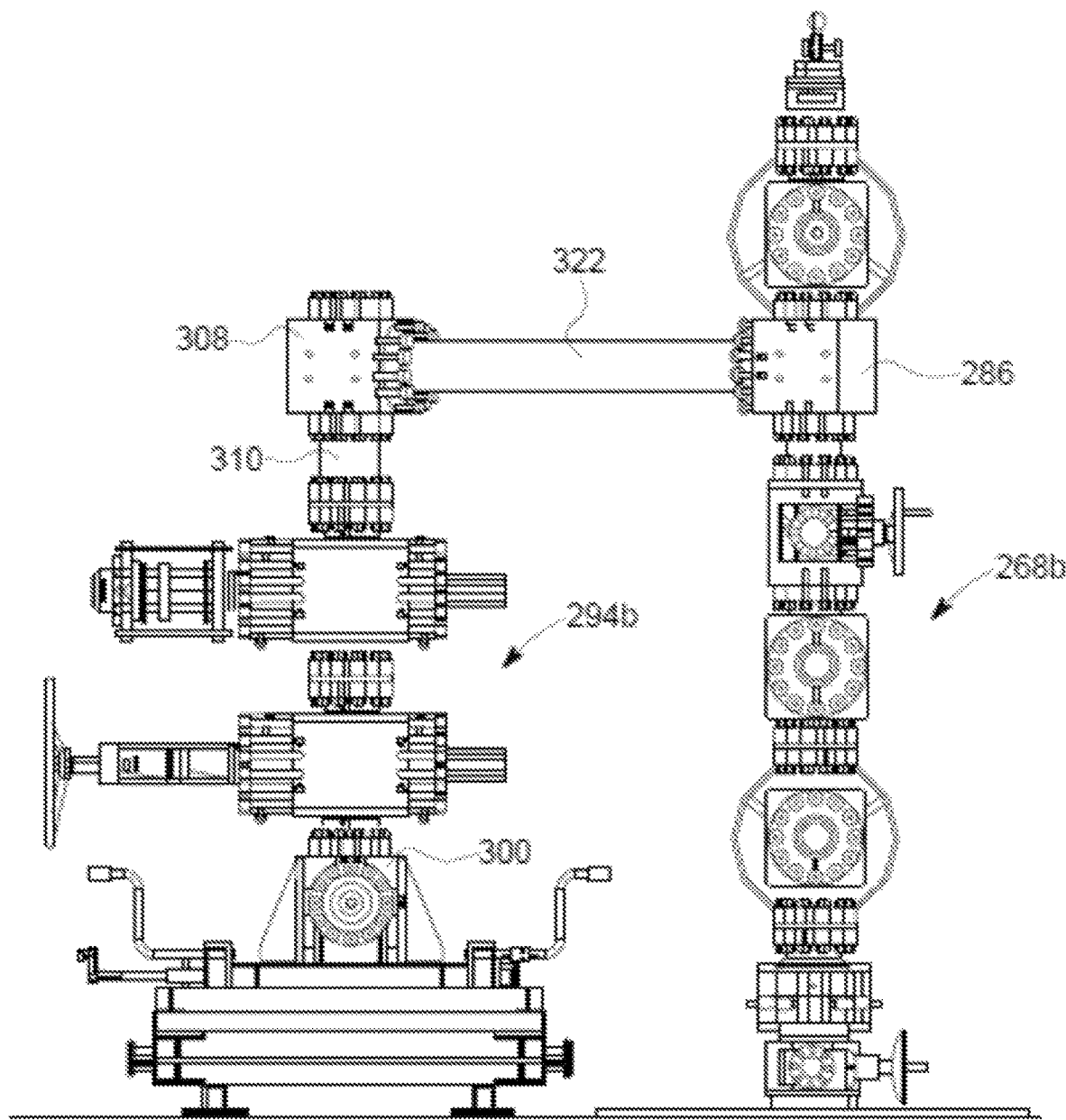

In several examples, as illustrated in FIG. 32 with continuing reference to FIG. 1, the zipper manifold 28 is omitted in favor of a zipper manifold 292 that is formed by the interconnection of zipper modules 294a-d, which zipper modules, in turn, are operably coupled to the wellheads 18a-d, respectively. In several exemplary embodiments, the zipper modules 294a-d are substantially identical to each other, and, therefore, in connection with FIG. 32, only the zipper module 294a will be described in detail below; however, the description below applies to every one of the zipper modules 294a-d. The zipper module 294a includes a vertical zipper stack 296 supported by an adjustable zipper skid 298.

In some examples, as illustrated in FIG. 32 with continuing reference to FIG. 1, the vertical zipper stack 296 includes a connection tee 300, a pair of valves, such as, for example, upper and lower gate valves 302 and 304, and a swivel assembly 306. The upper and lower gate valves 302 and 304 are operably coupled in series to one another, the lower gate valve 304 being operably coupled to the connection tee 300. In several examples, the upper gate valve 302 of the vertical zipper stack 296 is an automatic gate valve, and the lower gate valve 304 is a manual gate valve. The swivel assembly 306 is operably coupled to the upper gate valve 302, opposite the lower gate valve 304 and the connection tee 300, and includes a swivel tee 308 rotatably connected to a swivel spool 310. The swivel tee 308 of the vertical zipper stack 296 may be configured to rotate about a vertical axis and relative to the swivel spool 310, the upper and lower gate valves 302 and 304, and the connection tee 300, as indicated by the curvilinear arrow 312 in FIG. 32.

The adjustable zipper skid 298 is configured to displace the zipper stack 296 to align the swivel tee 308 of the zipper module 294a with the corresponding swivel tee 286 of the frac stack 268a. More particularly, the adjustable zipper skid 298 is configured to displace the zipper stack 296 up and down in the vertical direction, and back and forth in at least two horizontal directions, as indicated by the linear arrows 314, 316, and 318, respectively, in FIG. 32. In several exemplary embodiments, the vertical direction 314 and the at least two horizontal directions 316 and 318 are orthogonal. The adjustable zipper skid 298 is substantially identical to the adjustable zipper skid 184 described above in connection with FIG. 11. Therefore, the adjustable zipper skid 298 will not be described in further detail. Additionally, the parts of the adjustable zipper skid 298 are given the same reference numerals as the corresponding parts of the adjustable zipper skid 184.

As indicated above, with continuing reference to FIGS. 1, 31, and 32, the zipper modules 294a-d are operably coupled to the wellheads 18a-d, respectively, and are interconnected to form the zipper manifold 292. In several examples, the zipper modules 294c and 294d are incorporated into the zipper manifold 292 and operably coupled to the wellheads 18c and 18d, respectively, in substantially the same manner that the zipper modules 294a and 294b are incorporated into the zipper manifold 292 and operably coupled to the wellheads 18a and 18b, respectively. Thus, in connection with FIGS. 33-36, the incorporation of the zipper modules 294c and 294d into the zipper manifold will not be described in further detail below.

Moreover, the zipper modules 294a and 294b are incorporated into the zipper manifold 292 and operably coupled to the wellheads 18a and 18b, respectively, in substantially the same manner as that described above in relation to the zipper modules 22a and 22b (as shown in FIGS. 12-16). Therefore, the incorporation of the zipper modules 294a and 294b into the zipper manifold 292 via the connection of the zipper modules 294a and 294b to the wellheads 18a and 18b, respectively, will not be described in detail below.

In an exemplary embodiment, as illustrated in FIGS. 33-36 with continuing reference to FIGS. 1, 31, and 32, the swivel tee 308 of the zipper module 294a and the swivel tee 286 of the frac stack 268a are interconnected via a fluid conduit, such as, for example, a straight pipe 320 with flanged end portions. In a similar manner, the swivel tee 308 of the zipper module 294b and the swivel tee 286 of the frac stack 268b are interconnected via a fluid conduit, such as, for example, a straight pipe 322 with flanged end portions. Finally, the connection tees 300 of the zipper modules 294a and 294b, respectively, are interconnected via a fluid conduit, such as, for example, a straight pipe 324 with flanged end portions. Respective opposing end portions of the straight pipe 324 are supported by the support bracket 238a of the zipper module 294a and the support bracket 238b of the zipper module 294b. In some embodiments, the zipper manifold 292 includes only the zipper modules 294a and 294b; such embodiments include at least one of: a pipe-and-cap 326a supported by the support bracket 238b of the zipper module 294a and operably coupled to the connection tee 300, opposite the straight pipe 324, and a pipe-and-cap 326b supported by the support bracket 238a of the zipper module 294b and operably coupled to the connection tee 300, opposite the straight pipe 324. In other examples, the zipper manifold 292 further includes the zipper modules 294c and 294d, which are incorporated into the zipper manifold 292 and operably coupled to the wellheads 18c and 18d, respectively, in substantially the same manner as described above with respect to the zipper module 294b and the wellhead 18b. In such examples, the pipe-and-cap 326a is supported by the support bracket 238b of the zipper module 294a and operably coupled to the connection tee 300, opposite the straight pipe 324, and the pipe-and-cap 326b is supported by the support bracket 238a of the zipper module 294d and operably coupled to the connection tee 300, opposite a fluid conduit, such as, for example, a straight pipe that is substantially identical to the straight pipe 324.

To this point, embodiments disclosed herein generally reference components and single straight-line connections between zipper modules and wellheads, delivering fracturing fluid to the wellhead. The disclosed straight-line connections may also be positioned on the flowback portion of a wellsite. In this vein, the same straight-line configurations shown in FIGS. 33-36, and discussed elsewhere in this disclosure, may be applied to carry flowback fluids and aggregate materials (e.g., sand, rock, etc.) from wellheads to various containers, traps, separators, pits, pipelines or other containment solutions (collectively "flowback containers") for flowback slurries. Key to some embodiments is the fact that a single straight-line connection is made between the wellhead and the flowback containers.

Figure 37:
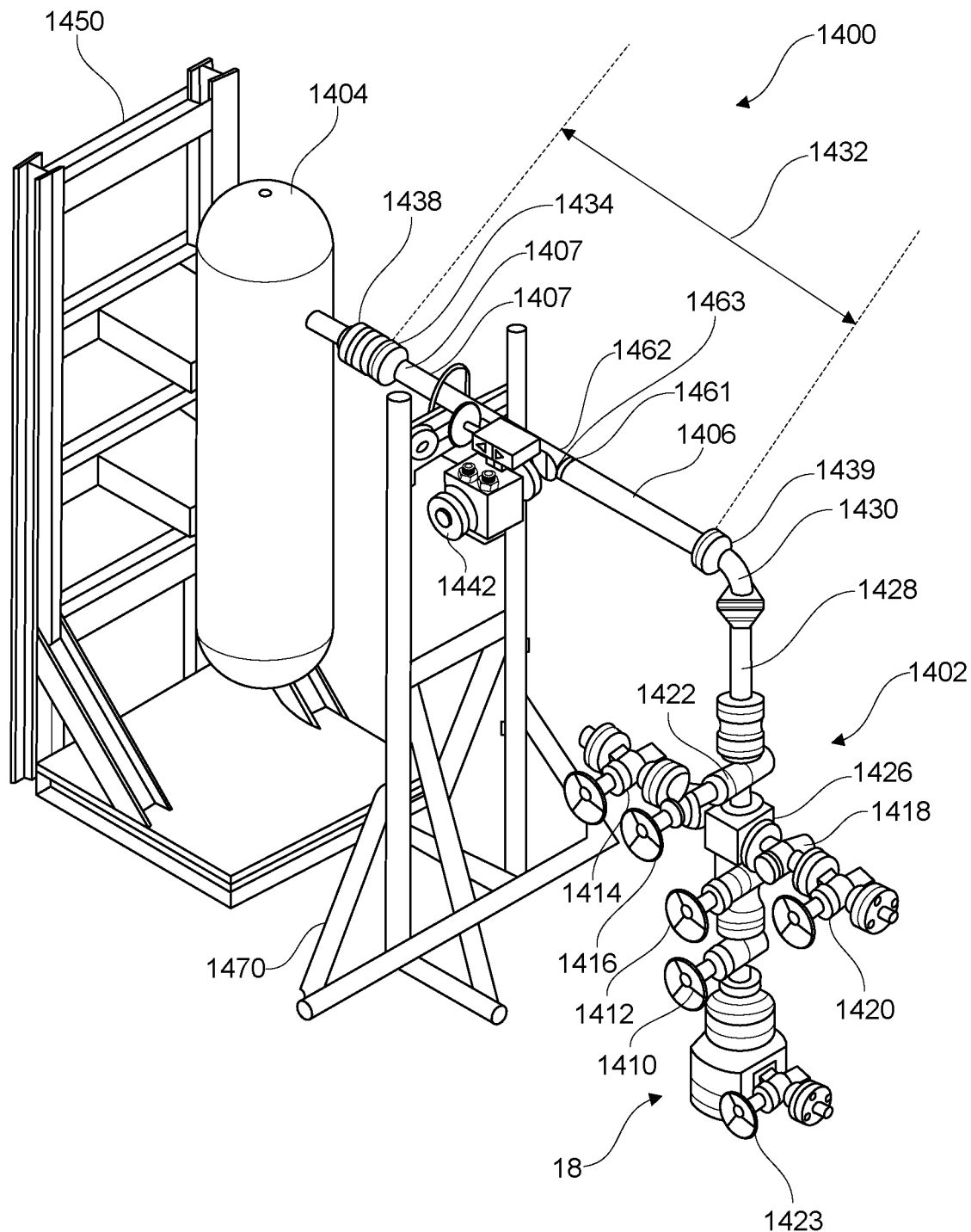
FIG. 37 is a perspective view of a frac tree being connected to a flowback container using a single straight-line connection, according to one example.

FIG. 37 illustrates a perspective view of a flowback setup 1400 using a single straight-line connection 1432, according to one embodiment. The flowback setup 1400 includes a frac tree 1402, which sits atop a wellhead 18, and a flowback container 1404 configured to receive flowback fluid, cuttings, or materials coming up from the wellhead 18. Frac tree 1402 may take the form of any other frac tree 158 described herein instead of the depicted setup. A single straight-line connection 1432 is positioned between the frac tree 1402 and the flowback container 1404 to allow flowback fluid, gasses, and solids out of the wellhead 18 and through the frac tree 1402 to be captured by the flowback container 1404.

The depicted frac tree 1402, which is but one embodiment, includes valves 1410-1424; a centralized tee block 1426; a spool 1428; and an elbow 1430, arranged in the illustrated manner. Other types of frac tree 158 configurations may alternatively be used. Valves 1410-1423 are shown as manually actuated gate valves. Alternative types of valves may be used, such as, for example with limitation, electronically or hydraulically actuated gate valves; manually, electronically, or hydraulically controlled plug valves; or the like.

Flowback container 1404 is a tank for collecting flowback from frac tree 1402. In some embodiments, a scaffolding 1450 is used to hold the flowback container upright, allowing received flowback to enter the flowback container 1404 at or near its top. Other types of flowback containers or equipment may be coupled to the frac tree using the single straight-line connections described herein. In some embodiments, the flowback container 1404 operates as a gas and/or liquid separator, whereby flowback that enters the flowback container 1404 is separated into gas (e.g., natural gas) that rises to the top of the flowback container 1404 and fluid and debris (e.g., frack fluid with cuttings or shale) that is collected in the bottom of the flowback container 1404. Though not shown, corresponding exit terminals or ports may be positioned at or near the top of the flowback container 1404 for separated gas to exit and at or near the bottom of the flowback container 1404 for fluid to exit at or near the bottom. Separated gas and fluid may then be piped to other containers, reservoirs, torches, or other treatment equipment.

The frac tree 1402 in FIG. 13 defines an internal through valves 1410, 1410; tee block 1426; valve 1422; spool 1428 and elbow 1430 for flowback to flow up out of the wellhead 18. One end of elbow 1430 is connected to the spool 1428, and the other end, which is shown as end 1439 and is positioned at a 90-degree angle relative to the end connected to the spool 1428, includes an exit port of the swivel (for the flowback to exit) that is connected to a single straight-line connection 1432. The other end of the single straight-line connection 1432 is connected to end 1438, or inlet port, of the flowback container 1404. The inlet port 1438 of the flowback container 1404 is, in some embodiments, positioned at an upper side of the flowback container 1404, with "upper side" being defined as being in the top third of the flowback container 1404, when oriented vertically as shown in FIG. 14.

Moreover, the flowback container 1404, in some embodiments, has a body that is rounded, or barrel-shaped, to enhance the separation process of flowback captured in the flowback container 1404. In operation, flowback (which may include gas, shale, oil, frack fluid, cuttings, and/or other flowback materials) may be injected—through the inlet port—into the flowback container 1404, and the rounded body may then provide a centrifugal effect on the receive flowback, which in turn enhances the separation of the gas from the liquids and solids in the flowback.

In some embodiments, single straight-line connection 1432 comprises two pipes 1406 and 1407 and a (gate, plug, or other) valve 1442 therebetween. Together, the pipes 1406 and 1407 and valve 1442 define a straight-line fluid channel having an internal midpoint that is the same (or near the same) height between the frac tree 1402 and the flowback container 1404. As shown, flanged end 1440 of the pipe 1406 is connected to end 1439 of the elbow 1430 of the frac tree 1402, and flanged end 1434 of the pipe 1407 is attached to the inlet port, or end 1438, of the flowback container 1404. Respective internal ends 1461 and 1460 of the pipes 1406 and 1407 are connected to gate 1442 at coupling 1463. In operation, flowback flowing up through spool 1428 is angled by elbow 1430 toward and through the single straight-line connection 1432—pipes 1406, gate 1442, and pipe 1407—and into the flowback container 1404.

Alternative embodiments may include additional or alternative piping, gates, or frac iron in the single straight-line connection 1432 to define the channel from the frac tree 158 to the flowback container 1404. For example, only the two pipes 1406 and 1407 may be used, connected together at internal ends 1460 and 1461. Alternatively, the valve 1442 may be positioned between end 1440 of pipe 1406 and end 1438 of elbow 1430, or between end 1434 of pipe 1407 and end 1438 of the flowback container 1404.

Additionally, some embodiments include a support 1470 that buttresses the single straight-line connection 1432. The support 1470 may be take the form of a wooden, metal, plastic, or other type of material used to support the single straight-line connection. Moreover, in some embodiments, the support 1470 may include or be shaped as a ladder enabling servicepeople to reach the single straight-line connection 1432, or specifically the valve 1442 in the single straight-line connection 1432.

The elbow 1430 is shown as having a 90-degree bend. Other embodiments may use different numbers of elbow components combined to together to create a 90-degree angle for flowback to pass through toward the flowback container 1404. For example, two 45-degree elbows or swivels or three 30-degree elbows or swivels may be used. Further still, some embodiments may use various swivels or elbows to create different angles than 90-degrees. Virtually any angle may be created to properly align the single straight-line connection from the wellhead to the flowback container.

Additionally or alternatively, the elbow 1430 may be used as an input for pressure-pumping to frack a well. In this vein, the previously discussed zipper modules in FIGS. 1-13 may be connected to end 1438 to supply frack fluid to the frac tree 1402 using a single straight-line connection (e.g., pipes, valves, and/or other frac iron), as opposed to the embodiment of FIG. 14 where flowback is carried away from the frac tree 1402.

Figure 38:
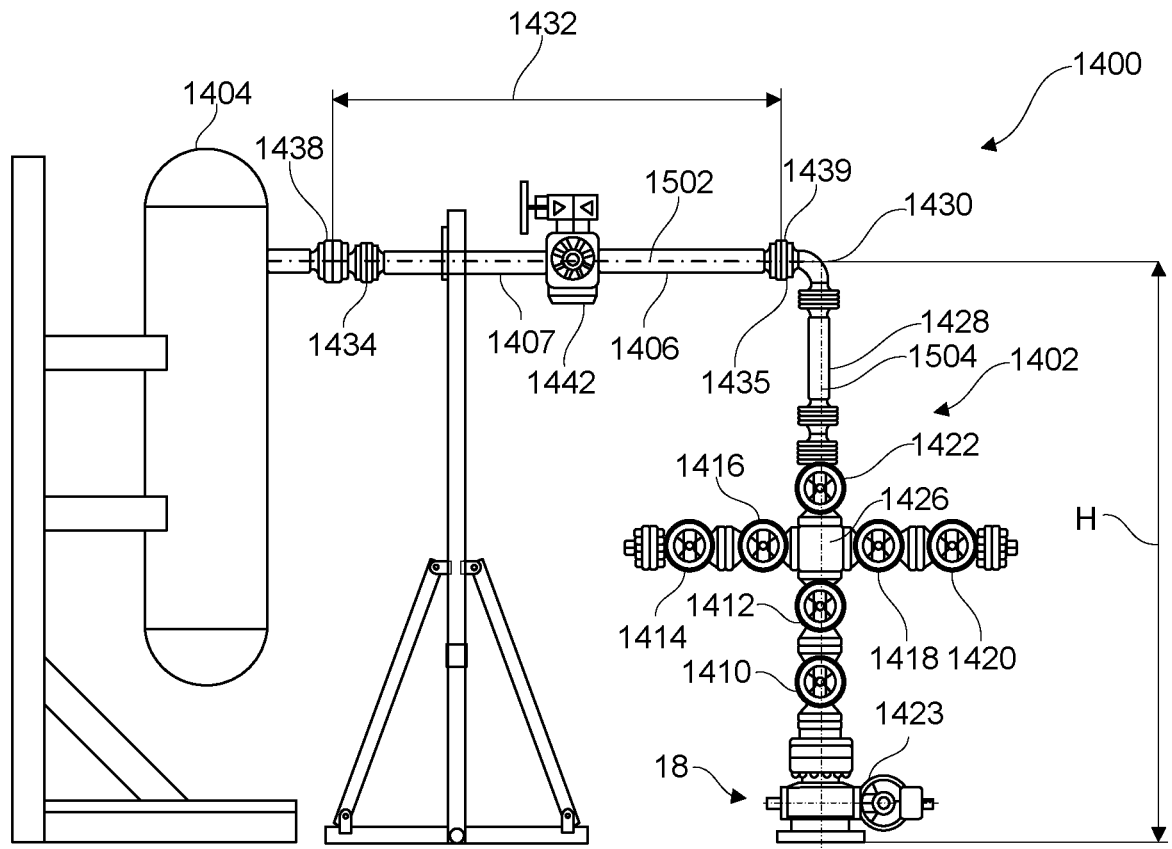
FIG. 38 is a side view of a frac tree being connected to a flowback container using a single straight-line connection, according to one example.

FIG. 38 illustrates a side view of the flowback setup 1400, along with several example measurements (in inches) that provide additional details. Additionally, FIG. 38 shows three axes of flow pathways that are defined within the flowback setup 1400. These illustrated axes show the traversing midpoints of fluid and gas channels defined within the flowback setup 1400.

Specifically, the frac tree defines vertical axis 1502 from wellhead 18 up through gates 1410, 1410; tee block 1426; gate 1422; spool 1428; and part of elbow 1430. Axis 1504 is perpendicular to axis 1502, running through midpoints of gates 1414, 1416, 1418, and 1420. Axis 1506 is defined horizontally, perpendicular to axis 1502, through a part of elbow 1430 and pipe 1406; gate 1442 (e.g., through coupling 1463 shown in FIG. 14); pipe 1407 and end 1436 of the flowback container 1404. In some embodiments, the single straight-line connection 1432 maintains a constant height (H) between the frac tree 1402 and the connected end 1436 of the flowback container 1404. Put another way, the internal channel created by the single-straight-line connection 1432, as well as any others described herein (e.g., pipes 240, 242, and 244 in FIG. 13), do not have any bends or turns off of the depicted horizontal axis 1506.

Moreover, the flowback container 1404 may be placed on a skid that can be raised and lowered in order to better facilitate the single straight-line connections described herein. Alternatively, the flowback container 1404 may be placed on a trailer or the scaffold 1450 or flowback container 1404 itself may be equipped with wheels for mobility.

The depicted swivel tees 176, 194 in FIGS. 10-11 or swivel tee 308 in FIGS. 32-36 used for pressure pumping or elbow 1430 used for flowback operations may be lined partially or wholly lined with a liner of high-strength wear-resistant material, such as, for example but without limitation, tungsten carbide, tungsten cobalt, tungsten nickel, ceramic, metal-ceramics, polyurethane, or the like. Lining portions of the elbow swivel tees 176, 194 and/or elbow 1430 leads to improved wear resistance in such components.

Additionally or alternatively, the elbow 1430 is shown as having a 90-degree bend. Other embodiments may use different numbers of elbow components combined to together to create a 90° angle for flowback fluid to pass through toward the flowback container. For example, two 45° elbows or swivels or three 30° elbows or swivels may be used. Further still, some embodiments may use various swivels or elbows to create different angles than 90'. Virtually any angle may be created to properly align the single straight-line connection from the wellhead to the flowback container.

Moreover, the flowback container may be placed on a skid that can be raised and lowered in order to better facilitate the single straight-line connections described herein.

The various single straight-line line connections to and from the frac trees provide right-angled passageways for fracturing or flowback fluids to pass. For example, elbow 1430 in FIG. 37 and tee block 308 shown in numerous FIGS. 32-36 connect the single straight-line connections from or two the wellheads, respectively. These elbows 6 and tee blocks 308 are, in some embodiments, internally lined (either wholly or partially) with any of the aforementioned high-strength materials (e.g., tungsten carbide, tungsten nickel, tungsten cobalt, ceramic, or the like). Such liners dramatically reduce wear and corrosion within the elbows 6 and tee blocks 308.

Additionally or alternatively, the internal passageways within the elbow 6 and tee blocks 308 may be form a right angle, may be angled, may be curved, or a combination thereof. Example internal geometries of the tee blocks 176, 194, 308 are shown in the FIGS. 38-42. For the sake of clarity, FIGS. 38-42 illustrate strategically reinforced instances of tee block 308 with different geometries and with strategically placed high-strength wear-resistant materials. The same geometries and internal lining of high-strength material may be used in swivel tees 176, 194 in FIGS. 10-11 or elbow 1430 used for flowback operations. While elbow 1430 is shown in FIGS. 10-11 as having an external curvilinear profile, and may include the illustrated reinforced internal profiles of FIGS. 38-42, swivel 1430 may be replaced by a tee block similar to tee block 308, with the internal profiles shown in FIGS. 38-42. That said, the different reinforced internal profiles in FIGS. 39-42 will now be discussed.

Attention is now drawn to FIGS. 39-42, which illustrate different geometries of wear-s resistant internally lined blocks used in the frac trees described herein to direct frac fluid and/or flowback to or away from the single straight-lined connections. Reference is made in FIGS. 39-42 to tee blocks 308A-D, but embodiments are not limited to applying the illustrated wear-resistant linings to tee blocks 308. Any of the swivels, blocks, elbows, or other equipment may be lined in the manner depicted in FIGS. 39-42, or equivalents thereof. For clarity, these swivels, blocks, elbows, or other equipment may be referred to herein generally as an "angled" block, implying that the so-lined blocks angle frack fluid or flowback from one direction (axis 1504) to another (axis 1502).

Figure 39:
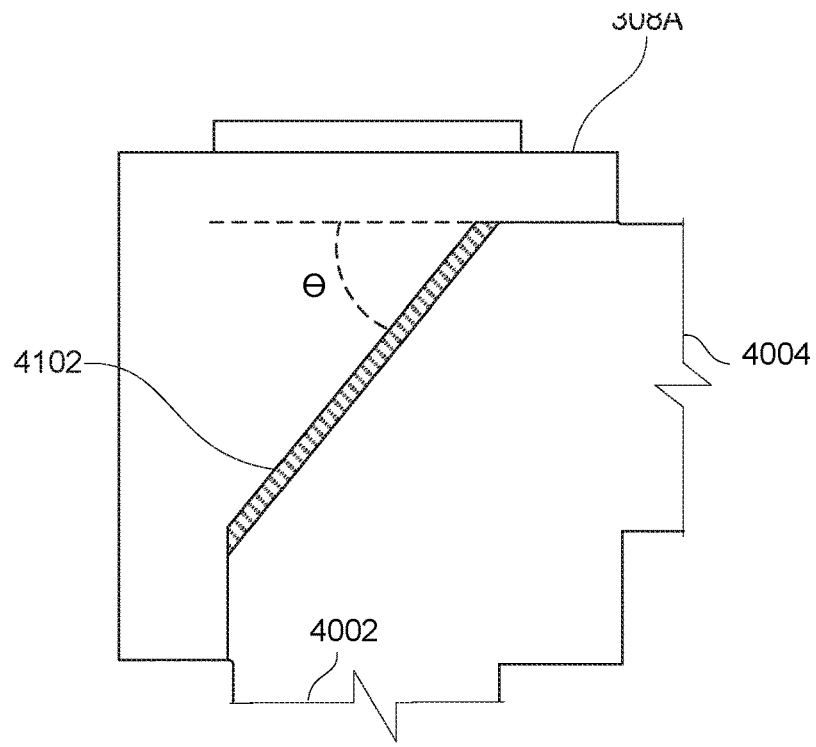
FIG. 39 illustrates a cross-sectional view of a tee block, according to one example.

FIG. 39 illustrates a cross-sectional view of a tee block 308A, according to one example. Tee block 308A includes an inlet port 4002 oriented toward a wellhead 18 and an exit opening, or "port," 4004 oriented toward a single straight-line connection to a flowback container or a zipper module used in pressure pumping. As shown, tee block 308A has an angled internal backwall 4102 for directing fluid. Angled backwall 4102 forms an angle (θ) with the inlet port of tee block 308A. Angle θ may be any angle between 0-90°, such as, for example but without limitation, 10°, 15°, 20°, 25°, 30° 35°, 40°, 45°, 50° 0°, 65°, 70°, 75°, 80°, 85°, or any angle therebetween, Additionally or alternatively, angled backwall 4102 may be wholly or partially lined with any of the previously described high-strength wear-resistant (e.g., tungsten carbide, tungsten nickel, tungsten cobalt, ceramic, or the like).

In some embodiments, the wear-resistant material is positioned within the internal cavity of the tee block 308A, or any other swivels or angled blocks referenced herein, to cover points where flowing frack fluid or flowback changes direction from flowing into the tee block 308A or to flowing out of the tee block 308A. For example, frack fluid flowing into opening 4004 (e.g., from a single straight-line connection connected to a zipper module) may be directed toward backwall 4102 where the frack fluid changes directions and is angled downward and out of opening 4002 (e.g., to flow down through a frac tree 22 and toward a wellhead 18). The term "angled block," as referenced herein, refers to a block, swivel, or other frac iron having an internal cavity that angles incoming fluid, gas, or debris (e.g., flowback or frack fluid) from one direction to another. The term is not meant to specifically connote any sort of angling on the outside of such iron, and instead refers to an internal angling of a fluid pathway.

Strategically lining backwall 4102 with wear-resistant material provides a layer of protection to the tee block 308A by dampening pressure from frack fluid or flowback that is constantly being directed to points of this backwall (e.g., the middle third) that are constantly being bombarded with pressurized fluid and/or debris. Put another way, the wear-resistant lining shown is strategically positioned to cover a portion of the backwall 4102 where frack fluid or flowback changes direction from flowing into the angled block (opening 4004, 4002) to flowing out of the angled block (4002, 4004).

Figure 40:
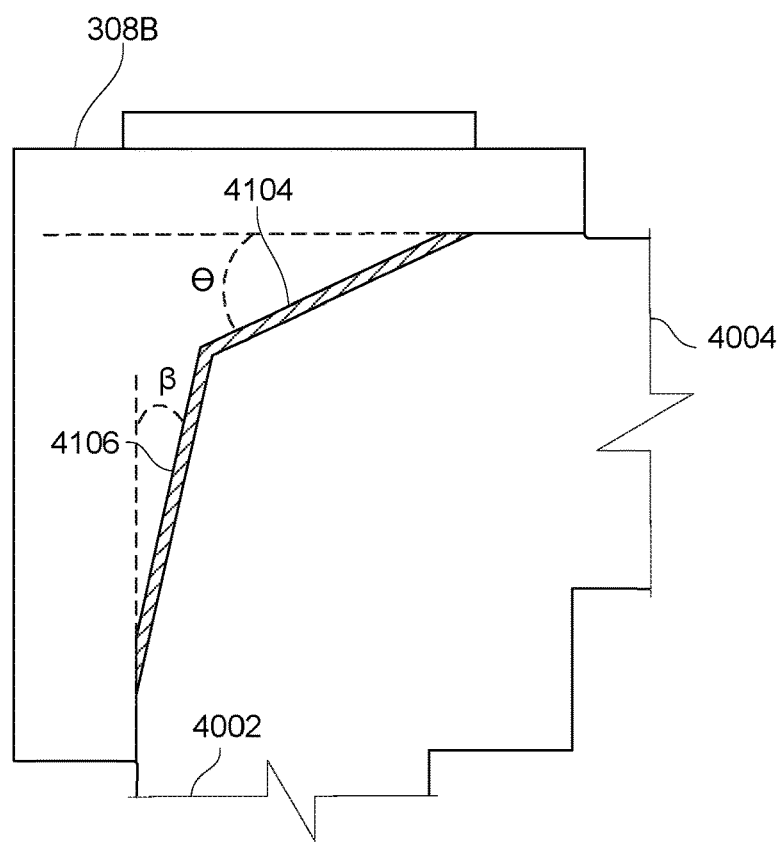
FIG. 40 illustrates a cross-sectional view of a tee block with multiple angled backwalls, according to one example.

FIG. 40 illustrates a cross-sectional view of a tee block 308B with multiple angled backwalls 4104 and 4106, according to one example. Tee block 308B includes an inlet port 4002 oriented toward a wellhead 18 and an exit port 4004 oriented toward a single straight-line connection to a flowback container or a zipper module used in pressure pumping. Either or both of angled backwalls 4104 and/or 4106 may be wholly or partially lined with one or more high-strength wear-resistant material(s), e.g., tungsten carbide, tungsten nickel, tungsten cobalt, ceramic, or the like. As shown, the angled backwalls 4104 and 4106 are angled at different angles, θ and β, respectively. Angle θ may be greater than, less than, or equal to (3 in different embodiments.

Figure 41:
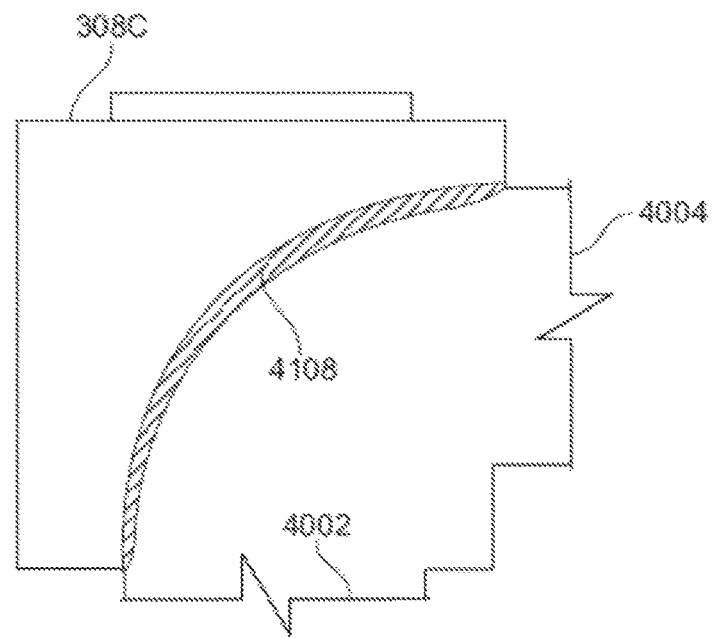
FIG. 41 illustrates a cross-sectional view of a tee block with a curved backwall, according to one example.

FIG. 41 illustrates a cross-sectional view of a tee block 308C with a curved backwall 4108, according to one example. Tee block 308C includes an inlet port 4002 oriented toward a wellhead 18 and an exit port 4004 oriented toward a single straight-line connection to a flowback container or a zipper module used in pressure pumping. The curved backwall 4108 may be wholly or partially lined with one or more high-strength wear-resistant material(s), e.g., tungsten carbide, tungsten nickel, tungsten cobalt, ceramic, or the like. In some embodiments, the curved backwall 4108 is curved at a continuous curvature from opening 4002 to opening 4004. Alternatively, different curvatures may be used. For example, the curvature between 4004 and the midpoint of backwall 4108 may have a greater or lesser radial curvature than from the midpoint to 4002.

Figure 42:
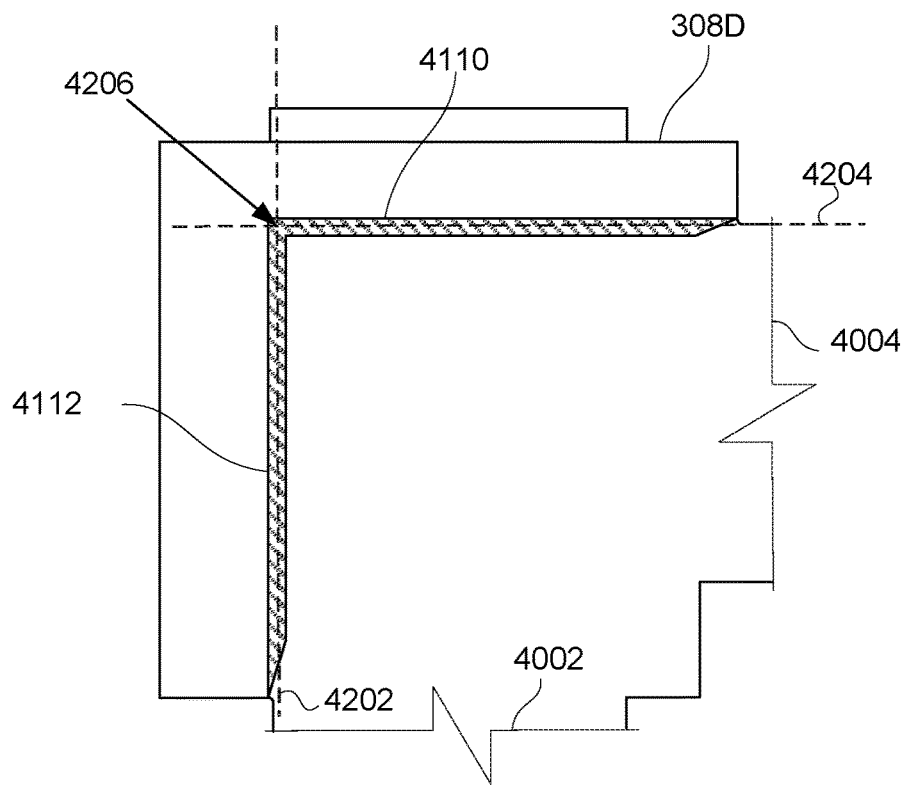
FIG. 42 illustrates a cross-sectional view of a tee block with an internal top wall and a perpendicular backwall, according to one example.

FIG. 42 illustrates a cross-sectional view of a tee block 3108D with two perpendicular backwalls: internal top backwall 4110 and a perpendicular side backwall 4112, according to one example. Tee block 308D includes an inlet port 4002 oriented toward a wellhead 18 and an exit port 4004 oriented toward a single straight-line connection to a flowback container or a zipper module used in pressure pumping. Walls 4110 and 4112 form a right angle for fluid to pass, and either wall 4110 or 4112 may be lined (partially or wholly) with a high-strength material. In some embodiments, walls 4110 and 4112 are reinforced such that a vertical axis 4202 running through the midpoint of wall 4112 is perpendicular, or substantially perpendicular, to a horizontal axis 4204 running through the midpoint of wall 4110.

Additionally or alternatively, any of the disclosed valves shown in the zipper modules, frac trees, large-bore iron fluid lines of the assembly manifolds (including the high- and low-pressure lines/manifolds), or the single straight-line connections may be electronically controlled and/or monitored (e.g., opened or closed) by a local or remote computer, either on the skids, trailers, or manifolds, or from a remote location. In this vein, one more computing devices (e.g., server, laptop, mobile phone, mobile tablet, personal computer, kiosk, or the like) may establish a connection with one or more processors, integrated circuits (ICs), application-specific ICs (ASICs), systems on a chip (SoC), microcontrollers, or other electronic processing logic to open and control the disclosed valves, which in some examples, are actuated through electrical circuitry and/or hydraulics.

Although described in connection with an exemplary computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, network PCs, minicomputers, mainframe computers, distributed computing environments that include any of the above systems or devices, and the like.

Aspects disclosed herein may be performed using computer-executable instructions, such as program modules, executed by one or more computers or other devices in software, firmware, hardware, or a combination thereof. The computer-executable instructions may be organized into one or more computer-executable components or modules embodied—either physically or virtually—on non-transitory computer-readable media, which include computer-storage memory and/or memory devices. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

Exemplary computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware, are non-transitory, and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

It is understood that variations may be made in the foregoing without departing from the scope of the disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, or one or more of the procedures may also be performed in different orders, simultaneously or sequentially. In several exemplary embodiments, the steps, processes or procedures may be merged into one or more steps, processes or procedures. In several exemplary embodiments, one or more of the operational steps in each embodiment may be omitted. Moreover, in some instances, some features of the present disclosure may be employed without a corresponding use of the other features. Moreover, one or more of the exemplary embodiments disclosed above, or variations thereof, may be combined in whole or in part with any one or more of the other exemplary embodiments described above, or variations thereof.

Although several "exemplary" embodiments have been disclosed in detail above, "exemplary," as used herein, means an example embodiment, not any sort of preferred embodiment the embodiments disclosed are exemplary only and are not limiting, and those skilled in the art will readily appreciate that many other modifications, changes, and substitutions are possible in the exemplary embodiments without materially departing from the novel teachings and advantages of the present disclosure. Accordingly, all such modifications, changes, and substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. An apparatus, comprising:
an angled block, made of a first material, for connection to a single straight-line connection between a frac tree and either a flowback container or a zipper module, the angled block comprising inlet and outlet ports for fluid to pass and defining an internal cavity having a single backwall connecting two adjacent sides of the angled block corresponding to the inlet and outlet ports; and
a liner of wear-resistant material positioned along the single backwall,
wherein the first material and the wear-resistant material are different materials, and the single backwall is angled at a constant angle of 45 degrees relative to the two adjacent sides of the angled block.

2. The apparatus of claim 1, wherein the first material comprises steel.

3. The apparatus of claim 1, wherein the wear-resistant material comprises at least one member of a group comprising tungsten carbide, tungsten cobalt, tungsten nickel, ceramic, metal-ceramics, or polyurethane.

4. The apparatus of claim 1, wherein the wear-resistant material comprises tungsten carbide.

5. The apparatus of claim 1, wherein the liner of wear-resistant material is positioned along the single backwall without being positioned along a wall of the angled block facing the single backwall.

6. A frac tree, comprising:
one or more valves or pipes defining a vertical fluid channel for either frack fluid or flowback;
an angled block, made of a first material, the angled block comprising inlet and outlet ports for fluid to pass and defining an internal cavity having a first backwall and a second backwall connected to the first backwall,
the first backwall being connected, at a first constant angle, to a first adjacent side of the angled block corresponding to the inlet port,
the second backwall being connected, at a second constant angle, to a second adjacent side of the angled block corresponding to the outlet port; and
a liner of wear-resistant material positioned along the first backwall and the second backwall,
wherein the first material and the wear-resistant material are different materials.

7. The frac tree of claim 6, wherein the position of the wear-resistant material covers the first backwall and the second backwall where frack fluid or flowback changes direction in the frac tree from flowing into the angled block to flowing out of the angled block.

8. The frac tree of claim 6, wherein the position of the wear-resistant material covers the first backwall and the second backwall where frack fluid or flowback changes from flowing along a vertical axis extending up through the vertical fluid channel to a horizontal axis defined by a single straight-line connection attached to the frac tree at the angled block.

9. The frac tree of claim 6, wherein the angled block comprises an elbow.

10. The frac tree of claim 6, further comprising a single straight-line connection between the frac tree, in which the angled block is connected, and a flowback container, wherein the angled block is positioned in the frac tree to redirect flowback received by the frac tree from a wellhead toward the single straight-line connection for delivery to the flowback container.

11. The frac tree of claim 10, wherein the single straight-line connection is connected between the frac tree and the flowback container along a single straight line and at a constant height.

12. The frac tree of claim 6, further comprising a single straight-line connection between the frac tree in which the angled block is connected, and a zipper module, wherein the angled block is positioned in the frac tree to redirect frack fluid received from the single straight-line connection, and supplied by the zipper module, toward a wellhead coupled to the frac tree.

13. The frac tree of claim 6, wherein the wear-resistant material comprises at least one member of a group comprising tungsten carbide, tungsten cobalt, tungsten nickel, ceramic, metal-ceramics, or polyurethane.

14. The frac tree of claim 6, wherein the first and second constant angles are different.

15. The frac tree of claim 6, wherein the first and second constant angles are between 0° and 90°.

16. A system, comprising:
a frac tree comprising one or more valves or pipes defining a vertical fluid channel for either frack fluid or flowback;
a single straight-line connection connected to the frac tree, the single straight-line connection defining a pathway for frack fluid or flowback to be respectively communicated toward or away from the frac tree, the single straight-line connection defining the pathway along only a single straight line with a constant height; and
an angled block, made of a first material, the angled block comprising inlet and outlet ports for fluid to pass and defining an internal cavity having a first backwall and a second backwall connected to the first backwall,
the first backwall being connected, at a first constant angle, to a first adjacent side of the angled block corresponding to the inlet port, the second backwall being connected, at a second constant angle, to a second adjacent side of the angled block corresponding to the outlet port; and a liner of wear-resistant material positioned along the first backwall and the second backwall.

17. The system of claim 16, wherein the first and second constant angles are different.

18. The system of claim 16, wherein the first and second constant angles are between 0° and 90°.

* * * * *